United States Patent [19]

Moll et al.

[11] Patent Number: 5,679,133
[45] Date of Patent: Oct. 21, 1997

[54] GAS SEPARATIONS UTILIZING GLASSY POLYMER MEMBRANES AT SUB-AMBIENT TEMPERATURES

[75] Inventors: David J. Moll; Alan F. Burmester, both of Midland, Mich.; Thomas C. Young, Walnut Creek, Calif.; Kent B. McReynolds; James E. Clark, both of Midland, Mich.; Charles Z. Hotz, Walnut Creek; Ritchie A. Wessling, Berkeley, both of Calif.; George J. Quarderer, Midland, Mich.; Ronald M. Lacher, Midland, Mich.; Stephen E. Bales, Midland, Mich.; Henry Nelson Beck, Walnut Creek; Thomas O. Jeanes, Antioch, both of Calif.; Bethanne L. Smith, Freeland, Mich.

[73] Assignee: Dow Chemical Co., Midland, Mich.

[21] Appl. No.: 292,771

[22] Filed: Aug. 18, 1994

Related U.S. Application Data

[63] Continuation of Ser. No. 930,059, Aug. 13, 1992, Pat. No. 5,352,272, which is a continuation-in-part of Ser. No. 803,921, Dec. 9, 1991, abandoned, which is a continuation-in-part of Ser. No. 647,960, Jan. 30, 1991, abandoned.

[51] Int. Cl.$^6$ .................................................. B01D 53/22
[52] U.S. Cl. ....................... 95/45; 95/47; 95/50; 95/52; 95/54
[58] Field of Search ............................ 55/267–269; 96/4, 96/7–14; 95/45, 47–55

[56] References Cited

U.S. PATENT DOCUMENTS

| | | | |
|---|---|---|---|
| 1,831,644 | 11/1931 | St. Adair et al. | 55/27 |
| 2,497,421 | 2/1950 | Shiras | 55/16 |
| 3,246,449 | 4/1966 | Stern et al. | 55/16 |
| 3,246,450 | 4/1966 | Stern et al. | 55/16 |
| 3,781,378 | 12/1973 | Kantor et al. | 55/16 |
| 3,899,309 | 8/1975 | Hoehn et al. | 55/16 |
| 3,989,478 | 11/1976 | Jones | 55/23 X |
| 4,285,917 | 8/1981 | Knight | 55/23 X |
| 4,392,871 | 7/1983 | Almlöf et al. | 55/23 |
| 4,522,636 | 6/1985 | Markbreiter et al. | 55/23 |

(List continued on next page.)

FOREIGN PATENT DOCUMENTS

| | | |
|---|---|---|
| 1188630 | 6/1985 | Canada . |
| 0060693 | 9/1982 | European Pat. Off. . |
| 0239235 | 9/1987 | European Pat. Off. . |
| 0266698 | 5/1988 | European Pat. Off. . |
| 0316960 | 5/1989 | European Pat. Off. . |
| 0334114 | 9/1989 | European Pat. Off. . |
| 2571270 | 10/1984 | France . |
| 63-215501 | 9/1988 | Japan . |
| 01-194904 | 11/1988 | Japan . |
| 01-194905 | 11/1988 | Japan . |
| 63-278524 | 11/1988 | Japan . |
| 3-007927 | 3/1991 | Japan . |
| 2181528 | 4/1987 | United Kingdom . |
| 2211193 | 6/1989 | United Kingdom . |
| WO89/04206 | 9/1988 | WIPO . |

OTHER PUBLICATIONS

S. Srinivasan, Gordon Research Conference On Synthetic Membranes, Jul. 10, 1990, "An Extraordinary Membrane That Rejects Light Gases".

Thorogood, International Gas Separation Meeting, Austin, Tex., Apr. 23, 1991.

S.R. Auvil et al, "Book of Abstracts, The Fourth Chemical Congress of North America", Aug. 25–30, 1991, Item 119.

K.K. Hsu et al., AIChE Conference, Nov. 18, 1991.

D.J. Moll et al., First Annual National Meeting of the North American Membrane Society, Jun. 3–5, 1987.

D.J. Moll et al., Gordon Research Conference on Reverse Osmosis, Ultrafiltration, and Gas Separation, Jul. 31, 1989.

D. Parro, *Energy Process*, vol. 5, No.1, pp. 51–54, 1985.

D. Parro, *Technology, Oil and Gas Journal,* pp. 85–88, Sep. 24, 1984.

G. Cutler et al., Laurance Reid Gas Conditioning Conference, Mar. 4–6, 1985.

"Membranes in Gas Separation and Enrichment", Fourth Priestley Conference, Royal Society of Chemistry, pp. 342–350 (1986).

S.P. Chen et al., *Polymer Engineering and Science,* vol. 20, No. 1, pp. 40–50 (1980).

S.G. Kimura et al., *Journal of Membrane Science,* vol. 29, pp. 69–77 (1986).

R.W. Roberts et al., *Journal of Applied Polymer Science,* vol. 7, No. 6, pp. 2183–2197, (1963).

D.W. Brubaker et al., *Industrial Engineering Chemistry,* vol. 46, pp. 1465–1473, (1953).

J.M.S. Henis et al., *Science,* vol. 220, 4592, pp. 11–17 (1983).

F.J. Norton, *Journal American Ceramic Society,* vol. 36, pp. 90–96 (1953).

S.A. Stern et al., *Journal Macromolecular Science/Physics,* pp. 41–70 (Mar. 1971).

W.H. Burgess et al., *Journal Macromolecular Science/Physics,* pp. 23–40 (Mar. 1971).

P. Meares, *Trans. Faraday Soc.,* vol. 53, pp. 101–106, (1957).

P. Meares, *J.A.C.S.,* vol. 76, pp. 3415–3422 (1954).

R.R. Light et al., *Polymer Engineering and Science,* vol. 22, No. 14, pp. 857–864 (1982).

B. Gebben et al., *Journal of Membrane Science,* vol. 46, pp. 29–41 (1989).

E.S. Perry and C.J. Van Oss, editors, *Progress in Separation and Purification,* pp. 154–189 (1970).

F.G. Kerry, "Front-Ends For Air Separation Plants—The Cold Facts", *Chemical Engineering Progress*.

Chen et al., Polymeric Materials Science & Engineering Meeting, San Francisco, Spring, 1992.

*Primary Examiner*—Robert Spitzer
*Attorney, Agent, or Firm*—Peters, Verny, Jones & Biksa, L.L.P.

[57] ABSTRACT

This invention relates to a method of and apparatus for separating component gases in a gas mixture employing a glassy polymer membrane at temperatures of 5° C. or less so as to achieve superior separation of gas components.

54 Claims, 16 Drawing Sheets

U.S. PATENT DOCUMENTS

| | | | |
|---|---|---|---|
| 4,545,787 | 10/1985 | Hegarty | 55/16 |
| 4,548,618 | 10/1985 | Linde et al. | 55/16 |
| 4,560,394 | 12/1985 | McDonald et al. | 55/16 |
| 4,589,896 | 5/1986 | Chen et al. | 62/18 |
| 4,595,405 | 6/1986 | Agrawal et al. | 62/18 |
| 4,598,137 | 7/1986 | Guiver et al. | 55/16 |
| 4,602,477 | 7/1986 | Lucadamo | 62/24 |
| 4,623,704 | 11/1986 | Dembicki et al. | 526/68 |
| 4,639,257 | 1/1987 | Duckett | 55/16 |
| 4,654,047 | 3/1987 | Hopkins et al. | 62/23 |
| 4,654,063 | 3/1987 | Auvil et al. | 62/18 |
| 4,687,498 | 8/1987 | Maclean et al. | 62/17 |
| 4,701,187 | 10/1987 | Choe et al. | 55/16 |
| 4,717,393 | 1/1988 | Hayes | 55/16 |
| 4,717,394 | 1/1988 | Hayes | 55/16 |
| 4,717,407 | 1/1988 | Choe et al. | 62/18 |
| 4,732,579 | 3/1988 | Veltman et al. | 55/23 |
| 4,732,583 | 3/1988 | DeLong et al. | 55/16 |
| 4,746,474 | 5/1988 | Kohn | 264/41 |
| 4,749,393 | 6/1988 | Rowles et al. | 62/24 |
| 4,781,907 | 11/1988 | McNeill | 55/16 X |
| 4,793,829 | 12/1988 | Pan et al. | 55/16 |
| 4,793,832 | 12/1988 | Veltman et al. | 55/23 |
| 4,817,392 | 4/1989 | Agrawal et al. | 62/18 |
| 4,818,254 | 4/1989 | Anand et al. | 55/316 |
| 4,840,646 | 6/1989 | Anand et al. | 55/16 |
| 4,851,014 | 7/1989 | Jeanes | 55/16 |
| 4,874,401 | 10/1989 | Jeanes | 55/16 |
| 4,880,699 | 11/1989 | Kohn | 428/333 |
| 4,881,953 | 11/1989 | Prasad et al. | 55/23 X |
| 4,892,564 | 1/1990 | Cooley | 55/16 |
| 4,897,092 | 1/1990 | Burgoyne et al. | 55/16 |
| 4,929,405 | 5/1990 | Kohn | 264/41 |
| 4,944,775 | 7/1990 | Hayes | 55/16 |
| 4,948,400 | 8/1990 | Yamada et al. | 55/16 |
| 4,952,219 | 8/1990 | DiMartino, Sr. | 55/16 |
| 4,968,331 | 11/1990 | Sakashita et al. | 55/16 |
| 4,971,695 | 11/1990 | Kawakami et al. | 210/500.23 |
| 4,978,573 | 12/1990 | Kohn | 428/333 |
| 4,994,095 | 2/1991 | Kawakami et al. | 55/16 |
| 5,000,763 | 3/1991 | Sanders, Jr. et al. | 55/16 |
| 5,007,945 | 4/1991 | Tien et al. | 55/16 |
| 5,009,679 | 4/1991 | Angus et al. | 55/16 |
| 5,013,332 | 5/1991 | Surnamer et al. | 55/16 |
| 5,015,269 | 5/1991 | Garrett et al. | 55/16 |
| 5,034,026 | 7/1991 | Summers | 55/16 |
| 5,034,027 | 7/1991 | Tien et al. | 55/16 |
| 5,035,727 | 7/1991 | Chen | 55/16 |
| 5,041,149 | 8/1991 | Handley | 62/27 |
| 5,042,992 | 8/1991 | Blinka et al. | 55/16 |
| 5,049,169 | 9/1991 | Teramoto et al. | 55/16 |
| 5,055,616 | 10/1991 | Burgoyne et al. | 55/16 |
| 5,082,481 | 1/1992 | Barchas et al. | 55/16 X |
| 5,086,623 | 2/1992 | Gauthier | 55/16 X |
| 5,116,504 | 5/1992 | Sakashita et al. | 55/16 |
| 5,151,022 | 9/1992 | Emerson et al. | 55/23 X |

GAS SEPARATIONS UTILIZING GLASSY POLYMER MEMBRANES AT SUB-AMBIENT TEMPERATURES

CROSS-REFERENCE TO RELATED APPLICATION

This is a continuation of application Ser. No. 07/930,059, filed on Aug. 13, 1992 now U.S. Pat. No. 5,352,272, which is a continuation-in-part of patent application Ser. No. 07/803,921, filed Dec. 9, 1991, now abandoned, which is a continuation-in-part of patent application Ser. No. 07/647,960, filed Jan. 30, 1991, now abandoned.

BACKGROUND OF THE INVENTION

This invention relates to a method or separating a gas mixture employing a membrane having a discriminating layer or region of a glassy polymer operated at sub-ambient temperatures. This invention also relates to apparatus for such method.

The use or membranes to separate various components or gas mixtures is known. Membranes have been used to separate, remove, purify, or partially recover a variety or gases, including hydrogen, helium, oxygen, nitrogen, argon, carbon monoxide, carbon dioxide, ammonia, water vapor, methane and other light hydrocarbons.

Membrane separations are based on the relative permeability or two or more component gases through the membrane. To separate a gas mixture into two portions, one richer and one leaner in at least one component gas, the gas mixture is brought into contact with one side of the membrane through which at least one of the component gases selectively permeates. A component gas which selectively permeates through the membrane passes through the membrane more readily than at least one other component gas of the gas mixture. The gas mixture is thereby separated into a stream which is enriched in the selectively permeating component gas or component gases and a stream which is depleted in the selectively permeating component gas or component gases. A relatively non-permeating component gas passes less readily through the membrane than at least one other component gas of the gas mixture. An appropriate membrane material is chosen so that some degree of separation of the gas mixture can be achieved. D. W. Brubaker et al., *Industrial and Engineering Chemistry*, Vol. 46, pp. 1465–1473 (1953), disclose gas permeation through various films and parameters which affect such permeation. R. W. Roberts, *Journal of Applied Polymer Science*, Vol. 7, No. 6, pp. 2183–2197 (1963), examined the effect of temperature on permeation through a variety of polymer films.

S. Srinivasan, at the Gordon Research Conference on Synthetic Membranes on Jul. 10, 1990, presented a paper entitled "An Extraordinary Polymeric Membrane That Rejects Light Gases" which reported permeability data on a polytrimethylsilyl propyne membrane at temperatures down to –40° C. for nitrogen and carbon dioxide. Anomalous mixed gas effects were observed. These effects were explained by suggesting that the transport in this material was dominated by diffusion in pores and on the surfaces of those pores, rather than the traditional solution-diffusion mechanism. Thorogood, at the International Gas Separation Meeting held in Austin, Tex. on Apr. 23, 1991, reported permeability data for oxygen and nitrogen at low temperatures using a modified dense glassy film of polytrimethylsilyl propyne. See also, S. R. Auvil et al., *Book of Abstracts, The Fourth Chemical Congress of North America*, Aug. 25–30, 1991, Item 119.

D. J. Moll et al., at the First Annual National Meeting of the North American Membrane Society on Jun. 3–5, 1987, disclosed permeation data for helium, argon, and xenon using films of tetramethyl bisphenol A polycarbonate over a wide temperature range.

D. J. Moll et al., at the Gordon Research Conference on Reverse Osmosis, Ultrafiltration, and Gas Separation on Jul. 31, 1989, disclosed permeability data for hydrogen and deuterium using a film of bisphenol A polycarbonate at temperatures down to –125° C.

In general, the gas permeability of known membrane materials decreases with decreasing temperature. Generally, the prior art has recommended that membrane separations be conducted at temperatures such that good physical properties of the membrane are maintained and condensation of the gaseous components to be separated is avoided. Typically, the temperature is maintained as high as possible without deleterious effects on the physical integrity or performance of the membrane, since higher temperatures generally increase the rate of gas permeation through the membrane. Temperatures in the range from 20° C. to 40° C. are generally employed in prior art separations. For separation of many gas mixtures employing membranes, conditions near the ambient temperature are conveniently used.

For specific process separations of certain gas mixtures, temperatures of less than zero degrees Celsius have occasionally been used. U.S. Pat. No. 4,793,829 describes the selective permeation of ammonia through a polysulfone amide membrane operating at a temperature in the range of zero degrees Celsius to –20° C. Canadian Patent 1,188,630 describes the separation of carbon dioxide from methane and other light hydrocarbons using a cellulose ester membrane at a temperature of less than 10° C., preferably between –15° C. and 5° C. See also D. Parro, *Energy Process*, Vol. 6, No. 1, pp. 51–54 (1985), D. Parro, *Technology, Oil & Gas Journal*, Sep. 24, 1984, pp. 85–88, and G. Cutler et al., Laurance Reid Gas Conditioning Conference, Mar. 4–6, 1985.

Research continues which is directed to the development of new membranes which possess high separation factors and high permeation rates for selected component gases of gas mixtures of interest. However, the use of temperatures below 20° C. in membrane separations is generally viewed with disfavor. Temperatures of zero degrees Celsius are in general deemed operable only with a limited number of specific gas mixtures and particular membranes.

A tradeoff is generally encountered between separation factor and permeability when using membranes to separate components of gas mixtures. Membranes having a high separation factor generally will have lower permeability than membranes which have a lower separation factor. This tradeoff is well established for separation of mixtures of oxygen and nitrogen and mixtures of carbon dioxide and methane.

Typically, permeability of gases through membranes declines rapidly with temperature. The separation factor in general increases as the temperature declines, but the rate of change in separation factor with temperature depends upon the specific properties of the membrane and the component gases of the gas mixture to be separated.

In the case of oxygen/nitrogen separations, both solubility in and diffusivity of the gases through the selected membrane influence separation performance. In general, oxygen dissolves in most polymers to a concentration of 50 percent to 100 percent greater than the concentration of nitrogen. While the solubility component of selectivity is important in the separation of oxygen and nitrogen, the diffusivity component of selectivity is the primary factor in determining the overall selectivity.

Diffusivity is dependent upon the dimension associated with the repulsive component of the interaction between gas molecules and the material forming the membrane. This is at a simplistic level related to the size of the molecules diffusing through the material such as a polymer. Smaller molecules of a gas can more easily penetrate and diffuse through a polymer matrix. Generally, molecules more easily diffuse through a polymer with a higher unoccupied volume, that is, "free volume". Accordingly, in a polymer with a relatively high free volume, the diffusivity of gases is generally greater than in a polymer with a lower free volume. However, this more open structure increases the diffusivity of both gases and results in a lower selectivity.

Although unoccupied volume in a polymer is important in determining membrane separation characteristics, other factors are very significant in achieving improvements in such characteristics. The dynamics of the motion of the polymer chains, the local motion of the recurring units, and the vibrations of smaller subunits can have a critical effect on separation characteristics. These motions prevent the polymer from maintaining optimum spacing between polymer subunits for the desired separation. Generally, lower temperatures will reduce the frequency and amplitude of motions by the polymer matrix.

While lower temperatures might restrict motion of the polymer matrix, temperatures substantially below 20° C. have not been generally utilized for membrane separation of gases. The reluctance in the art to consider sub-ambient temperatures for membrane separation of gases is due to problems associated with phase changes in components of the gas mixture, the higher operating costs resulting from cooling of feed gas mixtures, and the reduced permeation rate at lower temperatures.

A process for separating component gases of a gas mixture which achieves a higher separation factor than currently is attained and an acceptable permeability is still being sought. A method of operation which will improve the performance of existing membrane materials and potentially enhance performance of new membrane materials is desirable.

SUMMARY OF THE INVENTION

The invention is a method of separating a permeate gas stream and a non-permeate gas stream from a gas mixture. The gas mixture contacts a first side or a gas separation membrane. This gas separation membrane has a polymer discriminating layer or region, which is in a glassy state at the separation temperature. A chemical potential difference is maintained between the first side or the membrane and a second side or the membrane such that at least one first component gas present in the gas mixture will selectively permeate relative to at least one second component gas present in the gas mixture through the membrane from the first side to the second side or the membrane so that the permeating gas stream is enriched in the first component gas. The contact between the gas mixture and the membrane occurs at a temperature or 5° C. or less. The membrane is selected so that, when using a mixture or 80 mole percent nitrogen and 20 mole percent oxygen as a feed at 30° C. with a pressure or 30 psia on the first side or the membrane and a vacuum or less than 1 mm Hg on the second side or the membrane, the permeability or oxygen in barrers is less than 2000 and has the following relationship to selectivity for oxygen relative to nitrogen (referred to hereinafter as Equation I):

$$\text{Permeability} > \frac{2000}{(\text{Selectivity})^{7/2}}.$$

Selectivity for the purpose of Equation I is defined as the ratio of the oxygen permeability to the nitrogen permeability.

The first side and the second side of the membrane are separated and do not communicate, so that it is possible to recover the gas which does not permeate through the membrane, that is, the rejected or non-permeating gas, and/or the gas which does permeate the membrane, that is, the permeating gas.

Certain novel apparatus for conducting the method of the invention is also an embodiment of the invention.

This invention is an apparatus for separating components of a gas mixture comprising:

A. optionally, a means for compressing the gas mixture to a desired pressure, the means for compressing the gas having an inlet and an outlet;

B. optionally, a means for altering the temperature of the gas mixture to a temperature of 5° C. or less, the means for altering the temperature of the gas having an inlet and an outlet;

C. optionally, a means for conveying the gas mixture from the outlet of the means for compressing the gas to the inlet of the means for altering the temperature of the gas;

D. at least one membrane device operated at a temperature of 5° C. or less having an inlet for introducing a gas mixture to be separated, a membrane which divides the membrane device into a first side of the membrane non-permeate chamber and a second side of the membrane permeate chamber, a non-permeate gas outlet and a permeate gas outlet; and E. optionally, a means for conveying gas from the outlet of the means for altering the temperature of the gas to the inlet of the membrane device;

wherein the membrane employed satisfies the requirements of Equation I given hereinabove.

This invention is also an apparatus for separating components or a gas mixture comprising:

A. optionally, a means for compressing the gas mixture to a desired pressure, the means for compressing the gas having an inlet and outlet;

B. at least one heat exchange device having a first inlet and first outlet and a second inlet and a second outlet, a first conduit connecting the first inlet and outlet and a second conduit connecting the second inlet and outlet, with said first and second conduits being in thermal contact along a major portion of their respective lengths;

C. optionally, a means for conveying the gas mixture from the outlet of the means for compressing the gas to the first inlet of the heat exchange device;

D. at least one membrane device operated at a temperature of 5° C. or less having an inlet for introducing a gas mixture to be separated, a membrane which divides the membrane device into a first side of the membrane non-permeate chamber and a second side of the membrane permeate chamber, a non-permeate gas outlet and a permeate gas outlet;

E. a means for conveying gas from the first outlet of the heat exchange device to the inlet of the membrane device;

F. a means for altering the temperature of part or all of the gas which exits either the permeate gas outlet or the non-permeate gas outlet of the membrane device, or a combination thereof, the means for altering the temperature of the gas having an inlet and an outlet;

G. a means for conveying part or all of the gas from either the permeate gas outlet or non-permeate gas outlet of the membrane device, or a combination thereof, to the inlet of the means for altering the temperature of the gas; and H. a means for conveying gas from the outlet of the means for altering the temperature of the gas to the second inlet of the heat exchange device;

wherein the membrane employed satisfies the requirements of Equation I given hereinabove.

This invention is also an apparatus for separating components of a gas mixture comprising:

A. optionally, a means for compressing the gas mixture to a desired pressure, the means for compressing the gas having an inlet and outlet;

B. at least one heat exchange device having a first inlet and first outlet and a second inlet and a second outlet, a first conduit connecting the first inlet and outlet and a second conduit connecting the second inlet and outlet, with said first and second conduits being in thermal contact along a major portion of their respective lengths;

C. optionally, a means for conveying the gas mixture from the outlet of the means for compressing the gas to the first inlet of the heat exchange device;

D. a means for altering the temperature of the gas, the means for altering the temperature of the gas having an inlet and an outlet;

E. a means for conveying the gas mixture from the first outlet of the heat exchange device to the inlet of the means for altering the temperature of the gas;

F. at least one membrane device operated at a temperature of 5° C. or less having an inlet for introducing a gas mixture to be separated, a membrane which divides the membrane device into a first side of the membrane non-permeate chamber and a second side of the membrane permeate chamber, a non-permeate gas outlet and a permeate gas outlet;

G. a means for conveying gas from the outlet of the means for altering the temperature of the gas to the inlet of the membrane device; and H. a means for conveying part or all of the gas from either the permeate gas outlet or non-permeate gas outlet of the membrane device, or a combination thereof, to the second inlet of the heat exchange device;

wherein the membrane employed satisfies the requirements of Equation I given above.

This invention is also an apparatus for separating components of a gas mixture comprising:

A. optionally, a means for compressing the gas mixture to a desired pressure, the means for compressing the gas having an inlet and an outlet;

B. optionally, a means for altering the temperature of the gas mixture to a temperature of 5° C. or less, the means for altering the temperature of the gas having an inlet and an outlet;

C. optionally, a means for conveying the gas mixture from the outlet of the means for compressing the gas to the inlet of the means for altering the temperature of the gas;

D. at least one membrane device operated at a temperature of 5° C. or less having an inlet for introducing a gas mixture to be separated, a membrane which divides the membrane device into a first side of the membrane non-permeate chamber and a second side of the membrane permeate chamber, a non-permeate gas outlet and a permeate gas outlet;

E. optionally, a means for conveying gas from the outlet of the means for altering the temperature of the gas to the inlet of the membrane device; and F. a means for recovering the energy of compression from part or all of the gas from either the permeate gas outlet or non-permeate gas outlet of the membrane device, or a combination thereof, the energy recovered being used to drive a compression device or generate electrical power;

wherein the membrane employed satisfies the requirements of Equation I given above.

This invention is also an apparatus for separating components of a gas mixture comprising:

A. a means for compressing the gas mixture to a desired pressure, the means for compressing the gas having an inlet and an outlet;

B. a heat exchange device having a first inlet and first outlet and a second inlet and second outlet, a first conduit connecting the first inlet and outlet and a second conduit connecting the second inlet and outlet, with said first and second conduits being in thermal contact along a major portion of their respective lengths;

C. a means for conveying the gas mixture from the outlet of the means for compressing the gas to the first inlet of the heat exchange device;

D. at least one membrane device having an inlet for introducing a gas mixture to be separated, a membrane which divides the membrane device into a permeate chamber and a non-permeate chamber, a permeate gas outlet and a non-permeate gas outlet;

E. a means for conveying gas from the first outlet of the heat exchange device to the inlet of the membrane device;

F. a turbine expander for expanding part or all of either the permeate gas, non-permeate gas, or a combination thereof, which exits the membrane device so as to cool said gas, the turbine expander having an inlet and an outlet and being connected so as to at least partially power a second means for compressing gas;

G. a second means for compressing gas having an inlet and an outlet;

H. a means for conveying part or all of the gas from either the permeate gas outlet or non-permeate gas outlet of the membrane device, or a combination thereof, to the inlet of the turbine expander;

I. a means for conveying part or all of the gas from either the permeate gas outlet or non-permeate gas outlet of the membrane device, or a combination thereof, to the inlet of the second means for compressing gas; and J. a means for conveying gas from the outlet of the turbine expander to the second inlet of the heat exchange device.

This invention is also an apparatus for separating components of a gas mixture comprising:

A. a first means for compressing the gas mixture to a desired pressure, the first means for compressing the gas having an inlet and an outlet and optionally more than one stage with intermediate inlets;

B. a heat exchange device having a first inlet and first outlet, a second inlet and second outlet, and a third inlet and third outlet, a first conduit connecting the first inlet and outlet, a second conduit connecting the second inlet and outlet, and a third conduit connecting the third inlet and outlet, with said first, second, and third conduits being in thermal contact along a major portion of their respective lengths;

C. a means for conveying the gas mixture from the outlet of the first means for compressing the gas to the first inlet of the heat exchange device;

D. a first membrane device having an inlet for introducing a gas mixture to be separated, at least one membrane which divides the membrane device into at least one permeate chamber and at least one non-permeate chamber, a permeate gas outlet and a non-permeate gas outlet;

E. a means for conveying gas which connects the first outlet of the heat exchange device with the inlet of the membrane device;

F. a second membrane device having an inlet for introducing gas, at least one membrane which divides the membrane device into at least one permeate chamber and at least one non-permeate chamber, a permeate gas outlet and a non-permeate gas outlet;

G. a means for conveying gas from the first outlet of the first membrane device to the inlet of the second membrane device;

H. a turbine expander for expanding part or all of the gas which exits the non-permeate outlet of the first membrane device so as to cool said gas, the turbine expander having an inlet and an outlet and being connected so as to at least partially power a second means for compressing gas;

I. a second means for compressing gas having an inlet and an outlet;

J. a means for conveying gas from the non-permeate outlet of the first membrane device to the inlet of the means for expanding gas;

K. a means for conveying gas from the outlet of the turbine expander to the second inlet or the heat exchange device;

L. a means for conveying gas from the permeate outlet of the second membrane device to the inlet of the second means for compressing gas;

M. a means for conveying gas from the third outlet of the heat exchange device to either the inlet of the first means for compressing gas or an intermediate inlet for such means; and N. a means for conveying gas from the non-permeate outlet of the second membrane device to the third inlet of the heat exchange device.

The method of this invention is expected to achieve significantly improved performance compared to ambient temperature membrane separation processes. For air separation to produce nitrogen, this improved performance may be characterized by a significantly higher recovery of nitrogen, that is, production of nitrogen as a fraction of the feed air, at the same product purity, or production of a significantly higher purity product at the same recovery. Alternatively, it may be possible to produce nitrogen with similar purity and recovery and significantly increased productivity. For other separations such as the separation of carbon dioxide and a light hydrocarbon such as methane, improved performance might also be characterized by higher recovery, higher productivity, and/or higher purity of desired products. Improved performance may also be characterized by similar recovery and purity of product with less membrane surface area and/or lower power consumption.

Currently, cryogenic air separation is considered most economical for large-scale production of nitrogen, ambient temperature membrane separation is considered most economical for small-scale production, and pressure-swing adsorption (PSA) is considered most economical for medium-scale production. These different ranges of economic superiority are due to the varying importance of capital and operating costs for each conventional process at different scales of production; operating costs are more important for large-scale production than for small-scale production, and capital expenditures are more important for small-scale production than for large-scale production. Cryogenic air separation produces nitrogen with the lowest operating costs, but the capital costs for small-scale production are high. Ambient temperature membrane separation produces nitrogen with the lowest capital costs, but the operating costs for large-scale production are high. The sub-ambient temperature membrane process of this invention is expected to have lower operating costs, when compared with ambient temperature membrane separation. The capital costs may be higher due to the additional equipment required for cooling. It is possible in some circumstances, however, that the enhanced efficiency, that is, selectivity and/or productivity, of the membrane system may allow a significant reduction of compressor or membrane capital cost. This reduction may compensate for the additional capital required for cooling. In general, the inventive process is expected to be more economical at a larger production scale than the scale that ambient temperature membrane separations are currently used. For air separation, the process of this invention is expected to be competitive with larger-scale PSA separations and smaller-scale cryogenic separations. The invention is also expected to be competitive with other types of separations, for example, separations involving $CO_2$, $H_2S$, $SO_x$, or other gases. In particular, this invention is expected to compete with separation technology based on amine contactor processes employing monoethanolamine, diethanolamine, or other formulated amines. In some situations, it may be advantageous to combine this invention with absorption processes based on amines or other chemicals to form a hybrid system.

Figure 1:
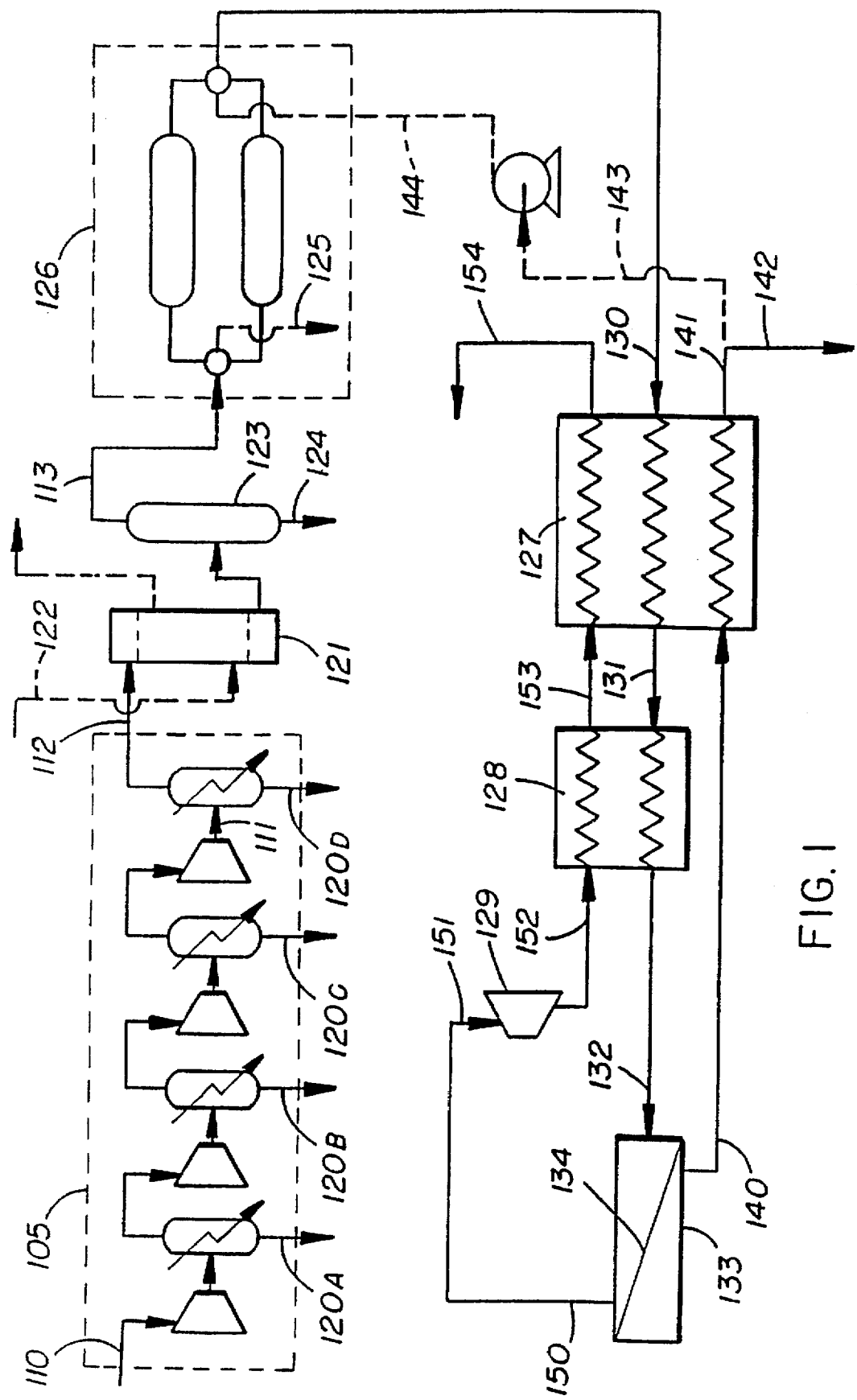
FIG. 1 illustrates in schematic form an apparatus useful for achieving the method of the subject invention which employs an expander on the non-permeate stream.

For simplicity, no operations for pretreatment of the feed gas mixture such as drying or filtering, are depicted in FIGS. 8, 9, 10, 14, 15, or 16. In some embodiments, the feed gas mixture prior to contacting with the membranes is advantageously dried so that water is not present in significant quantity which might otherwise condense and freeze at the operating temperature of the membrane separation. In some embodiments, other condensable fluids are also advantageously removed from the feed gas mixture prior to contacting with the membranes. Particulates, oil, and other contaminants which may deleteriously affect the physical integrity or performance of the membrane or other system components are also advantageously removed by conventional means.

DETAILED DESCRIPTION OF THE INVENTION

It has now been round that certain membranes comprising discriminating layers or regions prepared from glassy polymers show dramatic improvements in the separation factors for specific gas pairs with decreasing temperatures. At the same time, relatively little loss of gas permeability occurs with the decrease in temperature. In order to achieve the advantages of this method, both the membrane discriminating layer or region and the component gases to be separated must meet certain criteria set forth hereinafter.

It has been discovered that by selection of a suitable membrane and a suitable gas mixture, membrane separations at reduced temperature afford improved separation performance. Generally, with preferred membranes and gas pairs, operation at temperatures of preferably −5° C. or less, more preferably of about −25° C. or less, results in performance generally superior to membranes or known polymers operated at ambient temperature. This improved membrane performance is most commonly embodied in a higher selectivity with comparable or slightly reduced gas permeability at lower temperatures for the more permeable component gas of a gas mixture than is achieved with the same membrane at ambient temperature, that is, 20° C. to 40° C. This may also permit the advantageous use of membranes previously found to possess inferior separation characteristics at ambient temperature.

The membrane comprises a discriminating layer or region, which is in a glassy state at the conditions at which the separation is conducted. Glassy polymers as used herein refer to a class of materials well known in the art which are either non-crystalline or partially crystalline polymers, which possess a glass transition temperature above the temperature at which the membrane is to be employed. Polymers used in this invention must have a glass transition temperature ($T_g$) which is at least 1° C., preferably at least 10° C., above the operating temperature at which the membrane is employed. Polymers useful in this invention more preferably have a glass transition temperature of at least about 100° C., even more preferably of at least about 150° C.

Especially preferred membranes for use in this invention exhibit an increased separation factor for oxygen/nitrogen at a temperature of 5° C. or less for oxygen, that is, the more permeable gas, relative to nitrogen of at least about 25 percent, more preferably of at least about 50 percent, relative to the separation factor at 30° C. At the temperature at which the separation factor for oxygen/nitrogen has increased by 25 percent compared to the separation factor for oxygen/nitrogen at 30° C., the permeability of oxygen has decreased by preferably not more than about 50 percent, more preferably not more than about 40 percent, from the permeability at 30° C.

One criteria for the selection of a glassy polymer suitable for the discriminating layer or region of a membrane is to determine the change in separation factor or selectivity, α, with respect to temperature, T, that is, (dα/dT), and compare it to the change in gas permeability of the more permeable component gas, P, with respect to the separation factor. A useful formula for comparing membrane performance (referred to hereinafter as Equation II) is:

$$\text{Permselectivity Index} = \frac{\ln(P) * (d\alpha/dT)}{d\ln(P)/d\alpha}.$$

The values and derivatives of the gas permeability and separation factor in Equation II are evaluated at 30° C. For oxygen/nitrogen separation, the membranes useful in this invention possess a Permselectivity Index of preferably at least about 0.25, more preferably at least about 0.35, even more preferably at least about 0.40. Membranes which have the characteristics required by Equation I in general will possess a desirable Permselectivity Index.

Other sets of preferred membranes for use in this invention may be defined by the Figure of Merit. The Figure of Merit, as defined for a particular gas pair, takes into consideration the effect on membrane performance of a variety of factors, such as the permeability of the more permeable gas, the rate of change of permeability with respect to the rate of change in selectivity, and the rate of change of selectivity with respect to the rate of change in temperature. The Figure of Merit for oxygen/nitrogen separation is calculated by Equation III:

Figure of Merit (oxygen/nitrogen) =

$$1.4 \ln(P_{O_2} + 0.5) + \left( \frac{-30 \, d\alpha_{O_2/N_2}}{dT} \right) + \frac{\ln(P_{O_2})}{\ln(\alpha_{O_2/N_2})}$$

where $P_{O_2}$ is the permeability of oxygen and $\alpha_{O_2/N_2}$ is the selectivity of oxygen/nitrogen. The values and derivatives are evaluated at 30° C. The glassy polymers useful in this invention exhibit a Figure of Merit for oxygen/nitrogen separation for membranes prepared therefrom preferably of at least about 1.0, more preferably of at least about 3.0.

The Figure of Merit for carbon dioxide/methane separation is calculated by Equation IV:

Figure of Merit (carbon dioxide/methane) =

$$5 \ln(P_{CO_2}) + \left( \frac{-10 \, d\alpha_{CO_2/CH_4}}{dt} \right) + 2 \frac{\ln(P_{CO_2})}{\ln(\alpha_{CO_2/CH_4})}$$

where $P_{CO_2}$ is the permeability of carbon dioxide and $\alpha C_{O_2}/CH_4$ is the selectivity of carbon dioxide/methane. The values and derivatives are evaluated at 30° C. The glassy polymers useful in this invention exhibit a Figure of Merit for carbon dioxide/methane separation for membranes prepared therefrom preferably of at least about 20, more preferably of at least about 25.

The Figure of Merit for helium/methane separation is calculated by Equation V:

Figure of Merit (helium/methane) =

$$3 \ln(P_{He} + 0.5) + \left( \frac{-15 \, d\alpha_{He/CH_4}}{dt} \right) + 5 \frac{\ln(P_{He})}{\ln(\alpha_{He/CH_4})},$$

where $P_{He}$ is the permeability of helium and $\alpha_{He}/CH_4$ is the selectivity of helium/methane. The values and derivatives are evaluated at 30° C. The glassy polymers useful in this invention exhibit a Figure of Merit for helium/methane separation for membranes prepared therefrom preferably of at least about 5, more preferably of at least about 15.

The membranes useful in this invention preferably exhibit at a temperature of 5° C. or less a selectivity for oxygen/nitrogen of at least about 10, more preferably of at least about 12, and preferably an oxygen permeability of at least about 1 barrer, as measured using a mixture of 80 mole percent nitrogen and 20 mole percent oxygen as a feed with a pressure of 30 psia on the first side of the membrane and a vacuum of less than 1 mm Hg on the second side of the membrane.

The membranes useful in this invention preferably exhibit at a temperature of 5° C. or less a selectivity for carbon dioxide/methane of at least about 40, more preferably of at least about 80, and preferably a carbon dioxide permeability of at least about 10 barrers, as measured using a mixture of 5 mole percent carbon dioxide and 95 mole percent methane as a feed with a pressure of 30 psia on the first side of the membrane and a vacuum of less than 1 mm Hg on the second side of the membrane.

The membranes useful in this invention preferably exhibit at a temperature of 5° C. or less a selectivity for helium/methane of at least about 70, more preferably of at least about 100, and preferably a helium permeability of at least about 10 barrers, as measured using a mixture of 5 mole percent helium and 95 mole percent methane as feed with a pressure of 30 psia on the first side or the membrane and a vacuum of less than 1 mm Hg on the second side of the membrane.

The membranes of glassy polymers employed herein are preferably those which exhibit large increases in separation factor with a moderate decrease in gas permeability of the more permeable component gas for gas mixtures of interest. Illustrative glassy polymers include certain polyphenylene oxides, certain polyimides, certain polycarbonates, certain polyamides, certain polyethers, certain polyestercarbonates, certain polyarylates, certain polyesters, certain polyacetylenes, certain polytriazoles, certain polyoxadiazoles, certain polyolefins, certain polysulfones, certain polyethersulfones, certain polyamideimides, certain polyvinylsilanes, and certain polybenzoazoles, such as polybenzoxazoles, polybenzothiazoles, polybenzoimidazoles, polybenzobisoxazoles, polybenzobisthiazoles, and polybenzobisimidazoles, and copolymers and physical blends thereof. For oxygen/nitrogen separation, preferred glassy polymers include certain polycarbonates, certain polyestercarbonates, certain polyarylates, certain polyimides, certain polyesters, certain polyethers, certain polyphenylene oxides, certain polytriazoles, certain polyoxadiazoles, certain polyolefins, certain polysulfones, certain polyethersulfones, certain polybenzoazoles, and copolymers and physical blends thereof. For carbon dioxide/light hydrocarbon separation, preferred glassy polymers include certain polybenzoazoles, certain polycarbonates, certain polyesters, certain polyestercarbonates, certain polysulfones, certain polyethersulfones, certain polyimides, and copolymers and physical blends thereof. In general, more preferred organic polymers useful in this invention are those having in general a rigid structure, such as a polybenzoxazole, or a polymer containing 9,9-bis(3,5-dibromo-4-hydroxyphenyl)fluorene, 9,9-bis(3,5-dichloro-4-hydroxyphenyl)fluorene, hexafluoro bisphenol A, tetrahalohexafluoro bisphenol A, or tetraalkylhexafluoro bisphenol A moieties selected from the group consisting of polyimide, polyether, polysulfone, polyethersulfone, polyarylate, polyester, polyestercarbonate, polycarbonate, and copolymers and physical blends thereof. Hexafluoro bisphenol A as used herein refers to bisphenol A wherein all the hydrogens on the isopropylidene bridging group have been substituted with fluorine moieties. Tetrahalo or tetraalkyl as used herein with respect to bisphenol A refers to bisphenol A wherein 4 of the hydrogens on the aromatic rings are substituted with halo or alkyl moieties. Certain inorganic polymers are also believed operable. For example, carbon membranes, alumina membranes, and silicon-containing or other ceramic membranes can possess the desired properties.

Preferred glassy polymers include substituted polycarbonates, such as tetrachlorohexafluoro bisphenol A polycarbonate (TCHF BA PC) or tetrabromohexafluoro bisphenol A polycarbonate (TBHF BA PC), which have a recurring unit of the formula:

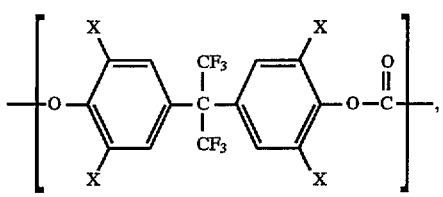

wherein X is either Cl or Br. The polycarbonate can be a copolymer containing bisphenols in addition to tetrahalohexafluoro bisphenol A, as well as ester moieties. Synthesis of such substituted polycarbonates and related polyestercarbonates is described in U.S. Pat. No. 4,874,401, which is incorporated herein by reference. See also U.S. Pat. Nos. 4,851,014 and 5,000,763, incorporated herein by reference. Preferred glassy polymers also include polycarbonates containing 9,9-bis(3,5-dibromo-4-hydroxyphenyl)fluorene (TBF PC) or 9,9-bis(3,5-dichloro-4-hydroxyphenyl)fluorene (TCF PC), which have a recurring unit of the formula:

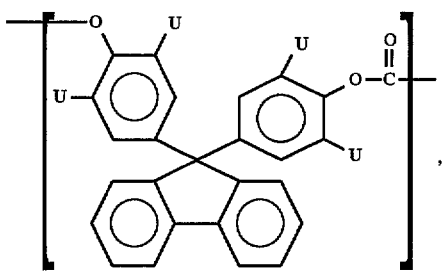

wherein U is either Br or Cl. The polycarbonate can be a copolymer containing bisphenols in addition to 9,9-bis(3,5-dibromo-4-hydroxyphenyl)fluorene or 9,9-bis(3,5-dichloro-4-hydroxyphenyl)fluorene, as well as ester moieties.

Such fluorene-containing polycarbonates may be obtained by the reaction of the fluorene-containing bisphenol with phosgene or another carbonate precursor using either solution or interfacial polycarbonate synthesis techniques: Examples of the syntheses of polycarbonates according to these techniques are set forth in U.S. Pat. Nos. 3,248,414; 3,153,008; 3,215,668; 3,187,065; 3,028,365; 2,999,846; 2,999,835; 2,964,974; 2,970,137; and 1,991,273; incorporated herein by reference. See also H. Schnell, *Chemistry and Physics of Polycarbonates*, Interscience Publishers, New York, 1964, pp. 9–61, incorporated herein by reference.

Such fluorene-containing polycarbonates can be cast from solution to form films or extruded from blends to form films and hollow fibers. The solutions or blends contain the polycarbonate, a solvent, and optionally a non-solvent. Preferred solvents for such fluorone-containing polycarbonates include methylene chloride, chloroform, trichloroethylene, ortho-dichlorobenzene, N,N-dimethylacetamide, N,N-dimethylformamide, tetrahydrofuran, cyclohexanone, 1,2,3,4-tetrahydronaphthalene, 1-formylpiperidine, 1-acetonaphthone, 1-acetylpiperidine, benzaldehyde, 1-chloronaphthalene, cyclopentanone, N,N-dimethyl propionamide, ethyl-1-pyrrolidinone-2, 1-oyclobenzyl-2-pyrrolidinone, 1,1,3,3-tetramethylurea, isophorone, 1,2,4-trichlorobenzene, N-formylmorpholine, N-methylsalicylate, N-methylcaprolactam, methyl benzoate, ethyl benzoate, diglyme, chlorobenzene, 4-ethylmorpholine, methoxy-1-naphthalene, phenetole, pyridine, pyrroildinone-2, styrene, styrene oxide, N-methyl-2-pyrrolidinone, acetophenone, anisole, and 1,4-dioxane. Preferred non-solvents for such fluorene-containing polycarbonates include acetone, acetonitrile, bis(2-ethoxyethyl)ether, diethylene glycol dibutyl ether, butyl stearate, n-butyl acetate, carbon tetrachloride, cyclohexane, decahydronaphthalene, decyl alcohol, diacetone alcohol, diethylene glycol, dimethyl carbonate, dimethyl malonate, dimethylsulfone, dioctyl phthalate, dipropyl carbonate, dodecane, ethanol, ethyl acetate, ethyl formate, ethylbenzene, ethylene carbonate, ethylene glycol, ethylene glycol diethyl ether, ethylene glycol dimethyl ether, 1-hexanol, isopropyl alcohol, methanol, methyl acetate, methyl caproate, methyl caprylate, methyl myristate, methyl valerate, methyl cyclohexane, nitromethane, polydimethylsiloxane, polyethylene glycol E600, propionitrile, 1,1,1-trichloroethane, triethylamine, triethylene glycol, tetraglyme, triglyme, diphenylether, polyethylene glycol 1500, propylene carbonate, N-methyl-acetamide, and xylene. The membrane is formed by casting the solution or extruding the blend and evaporating or washing out the solvent and optional non-solvent. The membrane may also be coagulated or leached after casting or extruding by contacting the membrane with a suitable non-solvent such as water. Membrane characteristics may be modified by subsequent stretching and/or heat treating of the membrane.

Another group of preferred glassy polymers are substituted polyesters, such as tetrabromohexafluoro bisphenol A isophthalate ester (TBHF BA IE) or tetrachlorohexafluoro bisphenol A isophthalate ester (TCHF BA IE), which have a recurring unit of the formula:

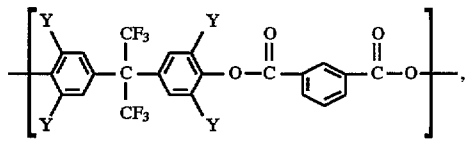

wherein Y is either Cl or Br. The polyester can also be a copolymer containing bisphenols in addition to tetrahalohexafluoro bisphenol A.

Certain polybenzoxazole (PBO) or polybenzothiazole (PST) materials are especially preferred for use as membranes. A PBO or PBT which is not a highly crystalline, rigid rod structure is preferred. For example, preferred polybenzoxazoles include those having recurring units of the formula:

PBO A

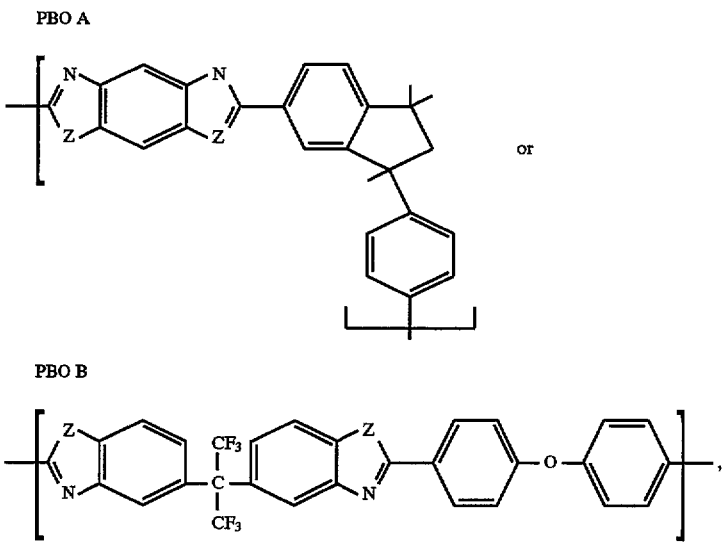

or

PBO B wherein Z is oxygen.

In preferred polybenzothiazoles, Z is sulfur in the aforementioned recurring units. Isomers of the PBO A and PBO B recurring units are also operable. For example, the recurring units:

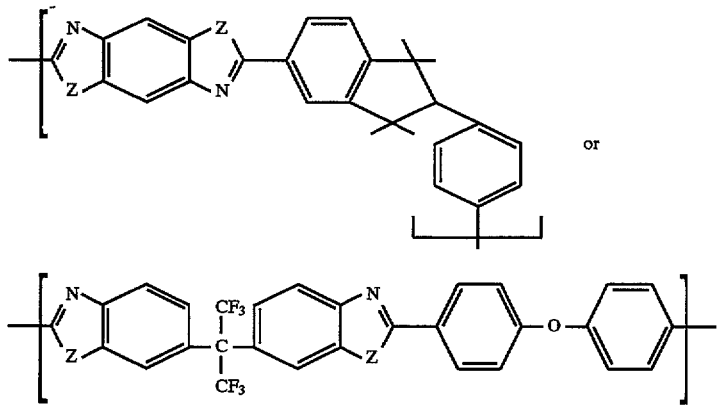

or are also operable.

The PBO and other polybenzoazoles materials can be prepared as described in U.S. Pat. Nos. 4,847,350; 4,772,668; and 4,533,693; as well as Japanese Kokai 62/207,322 and 01/159,024. U.S. patent application Ser. No. 513,345, filed Apr. 20, 1990, describes preparation of microporous PBO membranes. U.S. Pat. No. 5,034,026, issued Jul. 23, 1991, describes gas separation PBO membranes and Is. incorporated herein by reference. U.S. Pat. Nos. 4,939,235; 4,963,428; 4,487,735; and 4,898,924; as well as Japanese Kokai 61/28,530 describe preparation of films from polybenzoazoles. The polybenzoazoles are generally soluble in polyphosphoric acid, but certain PBO and PBT materials are more readily formed as gas separation membranes using more volatile solvents, such as methane sulfonic acid. Other groups may be introduced into the PBO or PBT to make the polymer more amenable to process steps and operations convenient to forming a membrane. The PBO or PBT, particularly an indan-containing PBO such as PBO A, can be cast from a solution of methane sulfonic acid to form films or extruded to form films. With an indan-containing PBO, m-cresol and certain ether organic solvents are operable to dissolve the polymer. Where m-cresol is the solvent, the solvent may be evaporated from the membrane or washed out with a non-solvent. The film may also be coagulated after it is east by contacting it with a suitable non-solvent.

Membrane characteristics may be modified by stretching and/or preferably heat-treating the membrane. Heat treatment is desirable to eliminate surface pores in the membrane. The membrane generally must be thoroughly dried, that is, the solvent and coagulating agents removed, before use to achieve the desired properties.

In one embodiment, an asymmetric PBO membrane can be prepared from a dope containing a solvent for the polymer and a non-solvent pore-forming compound. Advantageously, the dope is coagulated in a precipitant for the polymer, which leaches out some of the solvent as well as some of the pore-forming compound.

For the preparation of polyphenylene oxide membranes, see U.S. Pat. Nos. 3,350,844; 3,709,774; 3,852,388; 4,468,500; 4,468,501; 4,468,502; 4,468,503; and 4,949,775; the relevant portions incorporated herein by reference.

U.S. Pat. No. 4,971,695 describes sulfonated and/or hexafluoro bisphenol A containing polysulfone membranes and is incorporated herein by reference. U.S. Pat. No. 3,899,309 describes the synthesis and fabrication of aromatic polyimide, polyester, and polyamide separation membranes and is incorporated herein by reference. U.S. Pat. Nos. 4,717,393; 4,717,394; 5,009,679; 5,034,027; 5,042,992; and 5,042,993 describe certain polyimide membranes and are incorporated herein by reference. U.S. Pat. Nos. 5,007,945 and 5,013,332 describe certain polyarylate membranes and are incorporated herein by reference. While these membranes have not been evaluated in the method of this invention, operable membranes can be readily identified by experimentation.

Certain polyimide materials are especially preferred for use as membranes. Such polyimides include those containing indan moieties. Indan-containing as used herein refers to moieties based upon a cycloaliphatic ring and two aromatic rings, one of which is fused to a five-membered ring which is saturated, except for the two carbon atoms which are part of the aromatic group, while the remaining aromatic ring is attached by a single bond to the saturated five-membered ring and which are linked to the polymer by at least a single bond from each aromatic ring. Indan-containing polyimide as used herein refers to a polyimide containing at least a portion of diamine residues derived from indan-containing diamines. The polyimides may be derived from aliphatic, alicyclic, and/or aromatic dianhydrides and aliphatic, alicyclic, and/or aromatic diamines, with the proviso that at least a portion of the diamines contains indan moieties. Such polyimides include polyimides derived from mixed dianhydrides and/or mixed diamines, provided that at least a portion of the diamines contains indan moieties. Preferably at least 25 percent, more preferably at least 50 percent, even more preferably at least 75 percent, most preferably 100 percent of the diamine residues present in the polyimide contain indan moieties.

The indan-containing polyimides preferably comprise repeat units corresponding to the formula:

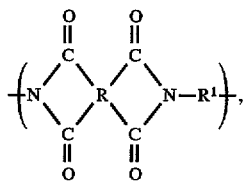

wherein

R is independently in each occurrence selected from the group consisting of:
A. a tetravalent phenylene, naphthalene, or perylene residue;
B. a tetravalent bisphenylene residue corresponding to the formula:

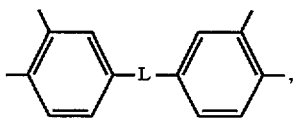

wherein

L is independently in each occurrence selected from the group consisting of a single bond, —O—, —CO—, —S—, —SO—, —SO$_2$—, —SS—, a divalent C$_{1-12}$ hydrocarbyl residue, and a divalent C$_{1-6}$ halohydrocarbyl residue; and C. a tetravalent bisphenylene residue corresponding to the formula:

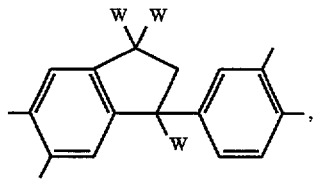

wherein

W is independently in each occurrence selected from the group consisting of hydrogen, a monovalent C$_{1-8}$ hydrocarbyl residue, and a monovalent halohydrocarbyl residue; and R$^1$ is independently in each occurrence a divalent residue corresponding to the formula:

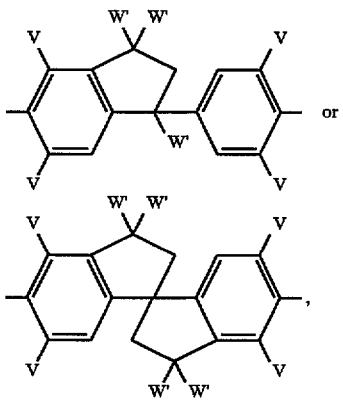

wherein

V is independently in each occurrence selected from the group consisting of hydrogen, a monovalent C$_{1-6}$ hydrocarbyl or halohydrocarbyl residue, a monovalent C$_{1-6}$ oxyhydrocarbyl or oxyhalohydrocarbyl residue, —OH, —Cl, —Br, —NO$_2$, and —SO$_3$H; and W' is independently in each occurrence selected from the group consisting of hydrogen, a monovalent C$_{1-8}$ hydrocarbyl residue, and a monovalent C$_{1-8}$ halohydrocarbyl residue.

Such indan-containing polyimides may be prepared by the reaction of an aliphatic, alicyclic, and/or aromatic dianhydride with an indan-containing diamine in the presence of a base, such as isoquinoline, and a solvent, such as m-cresol. The solution is sparged with an atmosphere of an inert gas such as dry nitrogen, refluxed for about 1 hour to about 30 hours, cooled to about 120° C. to about 50° C., precipitated in an alcohol such as methanol, and recovered by filtration. The recovered polymer is optionally washed or redissolved and reprecipitated to further purify the polymer and dried preferably under vacuum at about 80° C. to about 150° C. Such polyimides useful in this invention may also be prepared by methods disclosed in the art. See U.S. Pat. Nos. 4,366,304; 4,378,400; 4,454,310; 4,474,858; 4,639,485, 4,645,824; 4,687,611; 4,742,153; and 4,838,900; the relevant portions of each patent relating to polymer synthesis methods incorporated herein by reference.

Such indan-containing polyimides can be cast from solution to form films or extruded to form films and hollow fibers. See U.S. Pat. Nos. 4,746,474; 4,880,699; 4,929,405; and 4,978,573; incorporated herein by reference. Preferred solvents for such polyimides include m-cresol and dipolar aprotic solvents such as N-methyl-2-pyrrolidinone, N,N- dimethylacetamide, and dimethylformamide. The solvent is evaporated from the membrane or washed out with a non-solvent for the membrane such as water. The membrane may also be coagulated after casting or extrusion by contacting with a suitable non-solvent. Membrane characteristics may be modified by stretching and/or heat-treating the membrane.

Certain substituted polyethers are also believed to be preferred materials for membranes used in this invention, particularly polyethers containing hexafluoro bisphenol A moieties. The synthesis of such polyethers is known in the art. See Mercer, et al., International Publication Number WO 91/09081, incorporated herein by reference. Membranes may be formed from such polymers by casting a film from a solution of the polymer in a suitable solvent such as a chlorinated hydrocarbon.

Certain substituted polytriazoles and polyoxadiazoles are also believed to be preferred materials for membranes used in this invention. Polytriazoles and polyoxadiazoles, incorporating substituted alkyl, aryl, and halogen containing moieties, may be synthesized by condensation polymerization and formed into membranes by casting or extruding from suitable solutions or blends containing the polymer. For example, the fabrication of porous or liquid separation oxadiazole polymer membranes is discussed in Japanese Patent Reference 79/25,278, U.S.S.R. Patent References 1,033,510; 1,038,347; and 1,248,629; and WO 8200648; incorporated herein by reference. Gas separation membranes from such polymers may be cast or extruded from solutions or blends of the polymer in a suitable solvent such as sulfuric acid, methane sulfonic acid, trifluoroacetic acid, formic acid, polyphosphoric acid, and the like. For additional information regarding polytriazole membranes, see Gebben et al., "Gas Separation Properties of a Thermally Stable and Chemically Resistant Polytriazole Membrane," *Journal of Membrane Science*, Vol. 46, pp. 29–41 (1989), incorporated herein by reference.

In general, polymers useful for gas separation membranes exhibit relatively consistent and reproducible transport properties, in terms of gas permeability and selectivity, which are independent of the method of fabrication into membranes. With such polymers, the resulting membrane performance is essentially dependent only on the chemical composition of the membrane and its effective thickness. Some polymers, however, exhibit variable transport performance depending on the membrane preparation methodology and history. In particular, polymers with glass transition temperatures significantly above ambient temperature are sensitive to the method of membrane preparation and the membrane's history. This behavior is believed to be due to the non-equilibrium thermodynamic state of these polymers. The amount and distribution of free or unoccupied volume and degree of orientation and/or crystallinity can influence the gas transport properties in such polymers.

Such behavior has been observed in the art. For example, U.S. Pat. Nos. 4,880,441 and 4,871,494 disclose methods or influencing the amount of free volume in a membrane discriminating layer by altering the fabrication method. High concentrations of carbon dioxide dissolved in a membrane can be used to alter the free volume state of the membrane's discriminating layer, as described in U.S. Pat. No. 4,755,192. Procedures such as those described in these patents provide methods for altering the permeability and selectivity properties of a membrane material, either during the manufacture of the membrane or as a subsequent treatment. These procedures may be useful for producing membranes which meet the criteria of this invention. In some cases, a material which falls outside the scope of this invention using a particular membrane fabrication procedure can be made to fall within the scope of this invention by altering the fabrication procedure. It is also possible to employ a procedure after the fabrication or the membrane is complete, as for example, by swelling the membrane by exposure to carbon dioxide or some other gas or liquid, which alters the original performance of a membrane to bring it within the scope of this invention. In addition, other membrane modification methods such as surface modification, UV radiation, cross-linking, mono-axially or biaxially stretching or drawing, or addition of additives, which are well known to those skilled in the art, can be employed to produce membranes which meet the criteria of this invention.

Therefore, a polymeric material which can be fabricated into a membrane which falls outside the scope of this invention should not necessarily be considered outside the scope of this invention in all situations, since a number of fabrication or membrane modification procedures are available for altering the performance of the polymer in the final membrane form. These procedures can be used to produce membranes which have the properties which are desirable for this invention.

Figure 12:
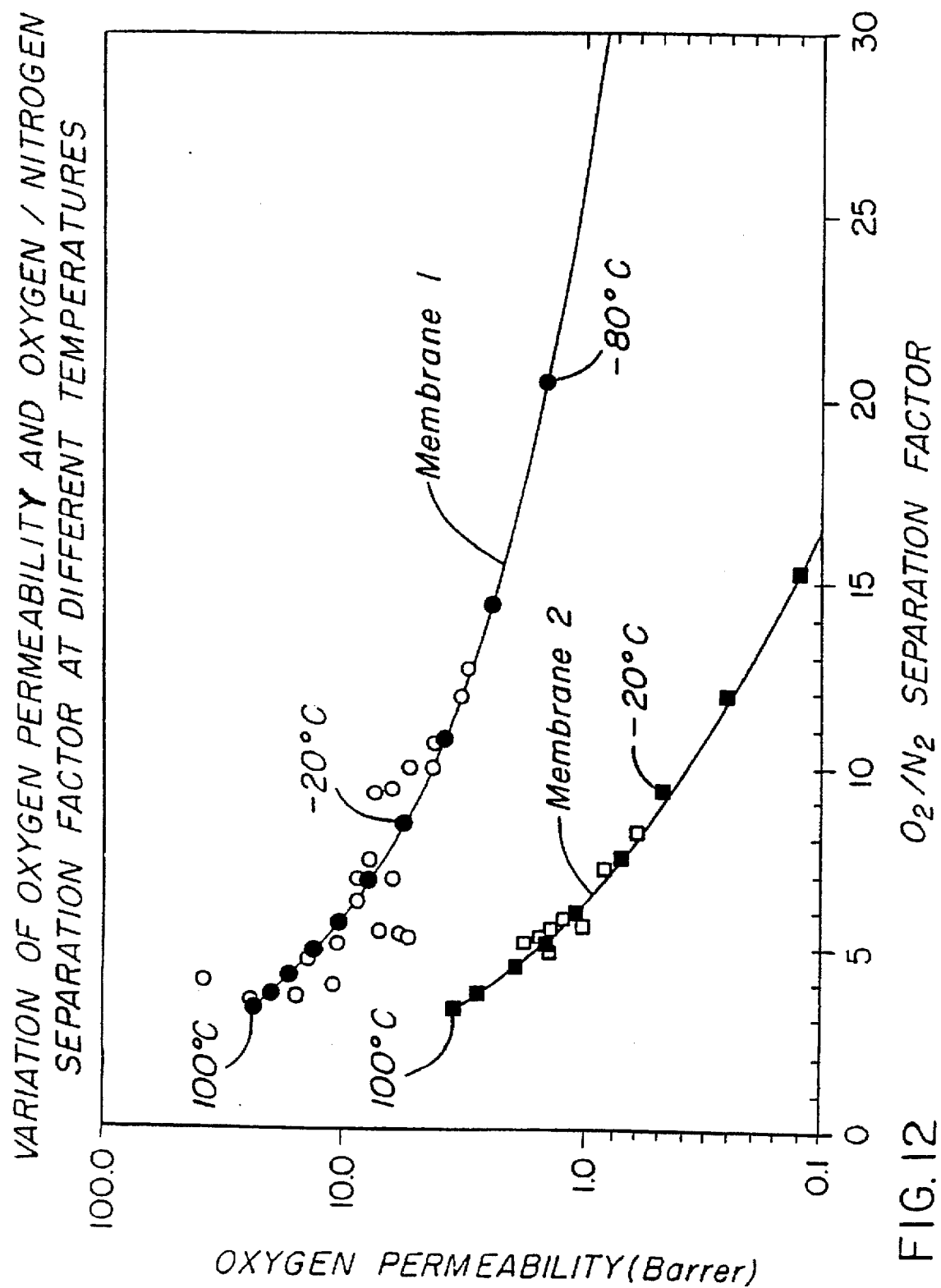
FIG. 12 illustrates a comparison at different temperatures of the oxygen/nitrogen separation factor and oxygen permeability for two specific membranes using air as the feed gas.. Membrane 1 is illustrative of the performance of a membrane suitable for the practice of the method of this invention, Membrane 2 is a comparison of the performance of a membrane which does not illustrate this invention.

FIG. 12 illustrates that only certain gas separation membranes meet the criteria set forth for this invention. FIG. 12 depicts actual performance data represented by open circles for a first membrane (Membrane 1) and open squares for a second membrane (Membrane 2). This data was generated by conducting separations at various temperatures for oxygen and nitrogen. Curves were generated employing Arrhenius interpolations and extrapolations from actual data of the performance of two different membranes in separating oxygen from nitrogen at various temperatures. The filled-in circles and squares indicate interpolated and extrapolated performance at 20° C. temperature intervals for the two different membranes. The curve for Membrane 1 represents a membrane performance curve fitted to actual data for a TCHF BA PC membrane. The curve for Membrane 2 depicts performance of cellulose triacetate, a commercial membrane material, which is presented as a comparative experiment not within the scope of the invention. It is clear that at −20° C., the first membrane achieves a separation factor of about 7.6 and an oxygen permeability of about 4.6 barrers. The second membrane, which is not used in the method of this invention, at −20° C. has a separation factor of about 9.2 and an oxygen permeability of about 0.4 barrers. Many prior art membranes, as is illustrated by Membrane 2 in FIG. 12, generally exhibit either too low a gas permeability at the reduced temperatures or relatively little improvement in selectivity. Other examples of membranes not having the desired properties are TRYCITE polystyrene, tetramethyl bisphenol A polycarbonate, unsubstituted polysulfone, and tetrabromo bisphenol A polycarbonate membranes.

The membranes useful in this invention may be in the form of flat sheets of films, or hollow fibers or tubes. The morphology or structure of the membranes may be homogeneous, composite, or asymmetric.

The structure or morphology of membranes operable in the method of this invention may be homogeneous. In the case of a homogeneous membrane, the entire thickness of the membrane may serve as the discriminating layer. Homogeneous membranes are prepared by forming a continuous thin discriminating layer which is dense and substantially free of voids and pores. Generally, homogeneous membranes will have relatively low flux through the membrane because of the thickness of the membrane discriminating layer.

The entire membrane does not need to be fabricated from the glassy polymer. In many embodiments it is preferable to utilize a composite membrane having a porous substrate on which the glassy polymer discriminating layer is formed or deposited. Such porous substrates may be isotropic or anisotropic. A composite membrane may be multi-layered and may include various support, intermediate, and collection layers An addition to the discriminating layer. The substrate may be any suitable material having the requisite strength and permeability. Polysulfones, polyethersulfones, aromatic polyimides, polycarbonates, polyestercarbonates, polyesters, polyetherketones, polyamides, polyolefins, polytetrafluoroethylenes, and polydenzoazoles are preferred as porous substrate materials. Porous inorganic supports such as porous ceramics are also operable. The discriminating layer may be cast on the substrate, plasma polymerized on the substrate, laminated, or formed by any other convenient technique so long as the discriminating layer is substantially defect-free, that is, substantially free of pinholes or other discontinuities which adversely affect membrane performance. It is also desirable that the discriminating layer be as thin as possible to maximize the flux of gas permeating through the membrane.

Asymmetric or anisotropic membranes can also be employed. Such membranes will have at least one dense discriminating region and at least one generally porous or less dense region which offers additional mechanical support and is formed from the same polymer. In the embodiments wherein the membrane is a hollow fiber, the discriminating region may occur at or in the vicinity of the outside external surface, at or in the vicinity of the inside internal surface, at some region between both the external and internal surfaces, or a combination thereof. In one embodiment, the hollow fiber membrane comprises a discriminating region at or near the internal surface of the hollow fiber membrane and a generally porous region extending from the discriminating region to the external surface of the hollow fiber membrane. In another embodiment, the hollow fiber membrane comprises a generally porous region at or near the external surface of the hollow fiber membrane, a generally porous region at or near the internal surface of the hollow fiber membrane, and a discriminating region generally situated between the two porous surface regions. The discriminating region in the hollow fiber membranes of this invention functions to selectively separate at least one component gas from at least one other component gas in the feed gas mixture. The discriminating region in such membranes may be a dense region, a region of non-continuous porosity, a region resembling a closed cell foam, or a region with an enhanced free-volume state. Anisotropic or asymmetric membranes are conveniently formed by casting or extruding the polymer in blends of solvent and optional non-solvent for the polymer in the general manner described in the prior art. Illustrative patents describing preparation of asymmetric membranes from glassy polymers include U.S. Pat. Nos. 4,955,993; 4,772,392; 4,486,202; and 4,329,157, incorporated herein by reference. The choice of solvent and preferred concentration of polymer will vary depending upon the solvent, polymer, method of formation, and other factors. Subsequent treatments with heat or by stretching may be used to modify properties of the membranes. Optionally, the membranes may subsequently be subjected to other treatments described in the art, including surface treating by methods such as solvent annealing, etching, irradiating, cross-linking, fluorinating, sulfonating, plasma treating, and the like.

Flat sheet or film membranes useful in this invention preferably possess a thickness of between about 25 microns and about 500 microns. The hollow fiber membranes useful in this invention preferably possess an outer diameter in the range of from about 40 microns to about 750 microns, more preferably in the range of from about 75 microns to about 500 microns. The ratio of outside to inside diameter of such hollow fiber membranes is preferably between about 1.15, and about 2.50, more preferably between about 1.25 and about 1.70. In the case of asymmetric or composite membranes, the discriminating layer is preferably less than about 10 microns, more preferably less than about 1 micron, even more preferably less than about 0.5 microns. The discriminating layer in asymmetric or composite membranes may be on the outside or the inside of the hollow fiber membranes.

The membrane may be incorporated into a variety of configurations. Flat sheet or film membranes may be used in either a plate and frame or a spiral wound device. Hollow fiber and tubular devices may also be used. In the case of hollow fiber devices, the mixture to be separated can be introduced into the bores of the hollow fibers or external to the hollow fibers. Generally, such hollow fiber membranes will be formed into bundles of hollow fibers, such as those described in U.S. Pat. Nos. 3,228,876; 3,422,008; and 4,881, 955; incorporated herein by reference. The hollow fibers may be bias or helically wound around a central core or assembled in parallel fashion in the hollow fiber bundle with or without a core. The core may be perforated, enabling the core to be used for collection or distribution of gas external to the hollow fibers. The cope may be flexible or collapsible to accommodate changes in the fiber length with temperature. See, for example, U.S. Pat. No. 5,026,479, incorporated herein by reference. Preferably, each of the hollow fibers possess wall thickness, outside and inside diameters, lengths, discriminating layer thickness, and other characteristics within a close tolerance, since significant variation in fiber characteristics can reduce overall performance. Variations of less than 5 percent of such characteristics are preferred. A tubesheet is typically present at each end of the hollow fiber bundle, but other configurations are possible, such as a single central tubesheet. The tubesheet may be fabricated from any resin which can maintain the desired physical strength at the operating temperatures. Epoxy resins, polyurethane resins, or elastomers are generally preferred as tubesheet materials.

If the membrane module will be subjected to repeated cooling and heating cycles, provision must be made for the different rates of thermal expansion of component parts. Alternatively, the materials used in constructing the module can be chosen so that the dimensional changes in cooling and heating do not unduly stress and damage the membrane elements. Compressive and tensile forces or stresses on the components of a membrane device may be created by low temperature operation and/or low/high temperature cycling. The cause of such forces and stresses may be the large difference in coefficients of linear thermal expansion (CLTE) of the various materials used in the fabrication of a membrane device. Traditionally, in the fabrication of membrane devices, metals have been used for the containment vessel or housing and optional core tube, while thermoset resins such as epoxies have been used for the tubesheets, and thermoplastic materials have been typically used for the membranes. The seals used in such devices are usually butadiene elastomers such as nitrile rubbers. The CLTE values of most metals are typically less than $2.5 \times 10^{-5}$ cm/cm°C. The rubbers, thermosets, and thermoplastics used in membrane devices have CLTE values typically ranging from 3.0 to $10.0 \times 10^{-5}$ cm/cm°C.

When large differences in CLTE values exist between component parts, low temperature operation may cause circumferential cracks at the core tube/tubesheet interface, as well as the membrane/tubesheet interface. In extreme cases, the membranes may actually debond from the tubesheet due to the thermoplastic membranes shrinking faster than the metal core tube. Use of a plastic core tube with a CLTE value similar to the CLTE value of the thermoplastic membranes or use of a collapsible core tube will significantly reduce or eliminate this problem. Alternatively, leaving the membrane length greater than the distance between the tubesheets allows the membrane to shrink without creating tension.

Typically, the seal between the membrane module and the containment vessel or housing is usually an O-ring or gasket formed from an elastomeric material such as nitrile rubber. The operational limit for most butadiene based elastomers is −40° C. Below −40° C., seals from alternate materials should preferably be used, such as O-rings or gaskets made from silicone rubber, derivatives of silicone rubber such as phenyl substituted silicone rubber, or metal such as aluminum or aluminum alloy. Alternative designs, such as an integrated containment vessel/tubesheet, which would eliminate the need for O-rings or gaskets, may also be used.

Cooling of the device from ambient temperature to the low operating temperature may cause leakage between the containment vessel and the tubesheet due to the tubesheet shrinking faster than the containment vessel. Many solutions to this problem are possible, including proper sizing of the O-ring or gasket, or using a vessel made from a material with a closer match or CLTE to the tubesheet. In some instances, the standard materials or construction or the tubesheet, that is, epoxy or urethane resins, may need to be modified. Blends with materials more suited to low temperature operation may be needed. Silicone rubber or silicone rubber derivatives may be blended with the epoxy or urethane. In extreme cases, the standard epoxy or urethane tubesheet may be totally replaced with improved low temperature materials like silicone or silicone derivative elastomers.

In one embodiment, the feed gas mixture to be separated is introduced into the bores of hollow fibers and gas permeating through the fiber walls generally flows substantially countercurrent to the gas mixture in the fibers. U.S. Pat. Nos. 4,871,379; 4,929,259; 4,961,760; and 5,013,437 describe illustrative devices and are incorporated herein by reference. See also U.S. patent application Ser. No. 07/769,040, filed Sep. 30, 1991, incorporated herein by reference. Countercurrent flow of the permeating gas may be promoted by concentric impermeable wraps in the bundle. Such wraps may extend from the tubesheet through which the non-permeating gas in the bores of the hollow fibers exits the fiber. If the end of the wraps are embedded in the tubesheet, the wrap material should be chosen so that there is good adhesion between the wrap and the tubesheet at the low temperatures of operation; otherwise, debonding may occur. For epoxy tubesheet materials, suitable wrap materials may include polyvinylchloride and acetate films. The wraps preferably terminate in proximity to but not in contact with the opposite tubesheet through which feed gas is introduced. Gas permeating through the walls of the hollow fibers may enter a hollow tube or core in the bundle through a hole or holes in said tube in proximity to the tubesheet through which feed gas is introduced.

In some embodiments, it may be desirable to utilize a membrane device adapted to accommodate a sweep fluid. See U.S. Pat. Nos. 4,961,760; 5,013,437; and 5,026,479; incorporated herein by reference, for examples of such devices. Such membrane devices have an inlet for the sweep fluid, which preferably is a gas. In some embodiments, part or all of the permeate gas or the non-permeate gas may be used as the sweep gas. The sweep fluid preferably flows in a substantially countercurrent direction with respect to the direction of flow of the feed gas mixture within the device.

Single or multiple membrane elements may be arranged in series, parallel, cascade, or recycle configurations. Multiple membrane devices may be arranged in parallel, so that the feed gas mixture is split and a portion of the feed gas mixture is sent to each membrane device. Permeate and non-permeate streams from each device may be combined with similar streams from the other devices. Multiple membrane devices may also be arranged in series, so that the higher pressure non-permeate stream from one device provides the higher pressure feed stream for another device. Alternatively, multiple membrane devices may be arranged in a cascaded fashion, so that the lower pressure permeate stream from one device is the higher pressure feed stream for another device. Single or multiple devices may be arranged fop recycle operation so that a portion of the permeate or non-permeate stream from one device may be recycled for use as a portion of a feed stream for the same device or another device. For example, S. T. Hwang and J. M. Thorman, *AIChE Journal*, Vol. 26, No. pp. 558–566 (1980), describe the use of multiple membrane devices arranged in a continuous membrane column configuration. S. A. Stern, J. E. Perrin, and E. J. Naimon, *Journal of Membrane Science*, Vol. 20, pp. 25–43 (1984), describe the use or recycle and multiple permeator systems. J. E. Perrin and S. A. Stern, *AIChE Journal*, Vol. 32, pp. 1889–1901 (1986), describe the use of membrane systems using two different membrane materials to enhance separation performance. It is also possible to use a variety configurations within a membrane module. For example, M. Sidhoum, S. Majumdar, and K. K. Sirkar, *AIChe Journal*, Vol. 35, pp. 764–774 (1989), describe an internally staged hollow fiber module which uses two membranes in the same device. Other arrangements of membrane devices, as well as combinations of the foregoing arrangements of multiple membrane devices are possible. The membrane material or composition used in one element, device, or stage may differ from the membrane material or composition used in another element, device, or stage. U.S. Pat. No. 4,894,068 describes one system employing membrane elements in series. A single membrane element may be divided by baffles to provide a plurality of separation sections, which can be configured in series to provide for higher purity or in parallel to provide variable flow. For examples of such devices, see U.S. Pat. Nos. 5,013,437 and 5,013,331, incorporated herein by reference.

The preferred glassy polymer membranes do not necessarily exhibit selective separations with all components of gas mixtures. In order to simplify the description of component gases to be separated, it is convenient to look at pairs of gases. Minor components and contaminants which do not deleteriously affect the physical integrity or performance of the membrane may also be present in such gas mixtures, but for simplicity the principal component gas pairs are discussed hereafter. The membranes ape useful for separating preferably at least one of the following component gases from a gas mixture: hydrogen, helium, oxygen, nitrogen, argon, carbon monoxide, carbon dioxide, water vapor, ammonia, hydrogen sulfide, nitrogen oxides, sulfur oxides, or light hydrocarbons. Light hydrocarbons as used herein refers to gaseous saturated and unsaturated $C_{1-5}$ hydrocarbons such as methane, ethane, ethene, ethyne, propane, propene, propyne, propadiene, n-butane, 2-methylpropane, 2-butene, 1-butene, 2-butyne, 1-butyne, 1,3-butadiene, 1,2-butadiene, n-pentane, cyclopentane, 2-methyl-2-butene, 3-methyl-1-butene, 2-methyl-1-butene, 2-pentene, 1-pentene, 2-methyl-1,3-butadiene, 3-methyl-1,2-butadiene, 2,3-pentadiene, 1,4-pentadiene, 1,3-pentadiene, 1,2-pentadiene, 3-methyl-1-butyne, 2-pentyne, 1-pentyne, and 2-methylpropane.

It is believed that the glassy polymer membrane is most effective in separating gas pairs when one gas of the pair has both higher solubility in the glassy polymer and higher diffusivity through the glassy polymer. This is the case with mixtures of oxygen and nitrogen, and carbon dioxide and a light hydrocarbon. Other gas pairs are operable even though they do not possess this desired relationship. For example, hydrogen or helium and a light hydrocarbon, which can be advantageously separated by the method of this invention, do not possess this desired relationship between solubility and diffusivity. Generally, the more soluble component gases will be more polarizable or polar, as may be demonstrated by boiling point, critical temperature measurements, of other conventional techniques. Diffusivity is related to the size of the gas molecule, with smaller gas molecules generally diffusing more rapidly than larger gas molecules. Preferred gas pairs which may be readily separated using glassy polymer membranes at low temperatures include: (1) oxygen and nitrogen, as for example, present in air, (2) carbon dioxide, optionally including other acid gases, such as $H_2S$, $SO_x$, or $NO_x$, and a light hydrocarbon, (3) oxygen and argon, (4) nitrogen and methane, and (5) hydrogen and methane. Separation of mixtures of oxygen and nitrogen and mixtures of carbon dioxide and a light hydrocarbon are particularly preferred.

Other gas pairs which have not been fully evaluated but are believed to be suitable for separation by the method of this invention include: (1) hydrogen or helium and one or more gases selected from nitrogen, ammonia, carbon dioxide, and a light hydrocarbon; (2) nitrogen and one or more gases selected from argon, methane, or a mixture of light hydrocarbons; (3) hydrogen chloride and chlorine; (4) methane and $C_2$ or $C_3$ alkanes or alkenes; and (5) ethane and ethylene.

The feed gas mixture should advantageously be free of contaminants which adversely affect the physical integrity or performance of the membrane, other parts of the membrane device, or system apparatus. For example, certain contaminants may deleteriously affect membrane performance or system components over time. Contaminants or impurities present in the feed gas stream to a membrane device can produce a variety of performance loss effects. For example, H. Finken, *Material Science of Synthetic Membranes*, ACS Symposium Series #269, American Chemical Society, Washington, D.C., p. 229 (1984), describes the effects of high concentrations of carbon dioxide dissolved in a membrane on the membrane's performance. E. Sanders, *Journal of Membrane Science*, Vol. 37, pp. 63–80 (1988), provides additional information on carbon dioxide exposure. These effects are generally referred to as transport plasticization. Typically, a membrane which has been transport plasticized will exhibit decreased selectivity and increased permeability of one or more gases. At low temperature, the concentration of dissolved gas (which can induce transport plasticization in a membrane) is generally higher for a given gas phase partial pressure of that gas. This leads to an increased susceptibility to transport plasticization effects at low temperatures. These effects can be induced by contaminants or impurities in the feed gas stream, or in some cases by one of the primary stream component gases to be separated.

An additional class of contamination problems arises from pore blockage effects, or competitive sorption and diffusion effects. These effects generally result in a decrease in the permeability of the membrane. These effects are also generally larger at lower temperatures. For example, K. H. Lee and S. T. Hwang, *Journal of Colloid and Interface Science*, Vol. 110, pp. 544–554 (1986), report examples of pore blockage by condensable vapors. These pores may be located in the porous supporting layer of a membrane. This mechanism may also be operable in the larger free volume elements in a glassy polymer. This effect typically produces a reduction in permeability through the membrane.

It is important, therefore, to provide adequate pretreatment of gas feed streams to membranes which are operated at low temperatures. This pretreatment should preferably include removal of contaminants or impurities which deleteriously affect the selectivity or gas permeability of the membrane.

It is believed that certain hydrocarbons, compressor oils, glycols, oil field additives, surfactants, mercury, and solid particulates or liquid droplets larger than 1 micron may contaminate some membranes used in separating gases. Water, or other condensables if present, may freeze and plug passages and compartments or reduce the effective membrane area or affect heat exchange capabilities. It may be necessary or desirable in some applications to remove from the feed gas mixture hydrogen sulfide, hydrogen chloride, nitrogen oxides, sulfur oxides, chlorine, mercaptans, carbonyl sulfide, and other acid or corrosive contaminants prior to contacting the mixture with the membrane device. The components of the gas mixture should not significantly plasticize or swell the glassy polymer to a deleterious degree. Consequently, certain gas components such as carbon dioxide should not be present in amounts which excessively plasticize or otherwise deleteriously affect the membrane. Different membranes will be more or less tolerant to plasticizing agents and contaminants.

Therefore, the process and apparatus optionally includes a means of reducing contaminants, particularly those contaminants having a deleterious impact on the physical integrity or performance of the membrane, from the feed gas stream to the process. Such contaminants can be categorized as corrosives, particulates, or condensables. Corrosives are compounds which harm process equipment by reacting with it. Some equipment may be fabricated from corrosion-resistant material. However, parts of some equipment must be made of certain materials and corrosives that attack such materials should be removed. Such corrosive contaminants can include carbon dioxide, sulfur oxides, nitrogen oxides, hydrogen sulfide, chlorine, hydrogen chloride, acetylene, mercaptans, carbonyl sulfide, and the like. Particulates or fine particles entrained in a gas stream which may plug heat exchanger passages, plug fibers in a hollow fiber membrane device, or plug pores in the membrane material. Particulates may also cause mechanical erosion or abrasion in process equipment with moving parts, such as compressors, expanders, and blowers. Preferably particulates having a size larger than 1 micron are removed by pretreatment. Condensables are compounds which may condense from or freeze out of a gas stream at the desired temperature of operation. Condensables also reduce heat exchanger heat transfer efficiently. Processes may be able to tolerate a certain amount of liquid condensation, particularly if equipment is orientated and outlets provided so that such liquids will drain out of the equipment. However, solid condensed compounds will cause the same problems as particulates, and are likely to accumulate more rapidly. Such condensables can include water vapor, carbon dioxide hydrates, hydrocarbons, and any other component which is present in an amount that exceeds its vapor pressure at any point in the process Contaminants may be removed from the process by any conventional means. Condensable substances may be removed by condensation in process equipment specifically designed therefore. For example, water vapor can be condensed from air by cooling the air, then introducing the cooled air into a separation vessel. Other equipment can remove condensables while cooling a stream; reversing heat exchangers used in cryogenic air separation plants cool air, while allowing carbon dioxide and water to freeze on the walls and process streams periodically switch passages in the exchangers to allow the accumulated solids to evaporate. Physical or chemical adsorption is also often used to remove undesirable contaminants from a gas stream. Adsorption in beds of activated carbon, activated alumina, or zeolite molecular sieves is commonly used to remove contaminants. Physical filtration is often used to remove particulates larger than 1 micron. Contaminants of a gas stream such as water vapor and other condensables may also be removed by permeation through a membrane device. Contaminants may be extracted by contact with a liquid stream that preferentially absorbs or reacts with the contaminant. Other known separation techniques, as well as combinations of any of the foregoing techniques, may be used.

In the separation of the component gases present in the gas mixture, the gas mixture is brought into contact with the first side of the membrane under conditions such that a chemical potential difference exists across the membrane, causing permeation through the membrane from the feed gas mixture first side of the membrane at a first chemical potential to the opposite non-feed second side of the membrane at a second chemical potential which is less than the first chemical potential. Conveniently, a partial pressure difference is employed to provide the necessary chemical potential difference. The partial pressure of the feed gas components will conveniently be higher than that of the permeate gas components, resulting in a total transmembrane pressure in the range from about 5 to about 2000 pounds per square inch (psi) (about 34.5 to about 13,800 kPa), preferably from about 50 to about 1,200 psi (about 345 to about 8,270 kPa). The gas which does not permeate through the membrane, that is, the non-permeate gas, generally is somewhat lower in pressure than the feed gas mixture because of diffusion of some of the component gases through the membrane and the accompanying drop in pressure as the gas passes through the membrane device. Desirably, this pressure drop is kept to a minimum. The partial pressure differential may be provided by a feed gas stream that is available at high pressure, feed stream compressor or blower, permeate stream vacuum pump, an intermediate stream booster compressor, other type of compressive equipment, or combinations thereof. A temperature or concentration difference may also be used to generate the required difference in chemical potential across the membrane.

In some applications, depending upon the gases to be separated, the membrane used, the volume of gas to be processed, desired purity of product, and other factors, the separation takes place preferably at a temperature of between about −30° C. and about 5° C. In other embodiments, the gas in contact with the membrane is preferably of at a temperature of about −5° C. or less, more preferably about −25° C. or less. The temperature may vary over a wide range depending upon the components of the feed gas mixture and the properties of the membrane employed at the desired product purity. Advantageously, a temperature is selected which achieves a high separation factor without excessive loss of permeability. The temperature also must be selected such that the physical properties of the membrane or the membrane device are not deleteriously affected. The selection of an operating temperature may also be limited by the energy required to conveniently cool the feed gas mixture to a lower temperature and other pragmatic considerations.

If the gas mixture is not provided at the desired temperature, any conventional means or combination of means for altering the temperature of the gas mixture to achieve the desired temperature is operable, such as an external, adsorptive, or evaporative refrigeration system, an expansion device, or the self-refrigerating capacity utilizing the Joule-Thomson effect of the permeated gas. External refrigeration system as used herein refers to the use of a separate process or apparatus to cool one or more process streams that contact the membrane through indirect heat exchange, thus providing refrigeration to the process Indirect heat exchange as used herein refers to the bringing of two or more fluid streams into heat exchange relation without any physical contact or intermixing of the fluids with each other. In one embodiment, a cold liquid refrigerant stream may be used to cool one of the process streams in a heat exchanger. The cold liquid refrigerant stream may be obtained by expansion of a high pressure gas stream. The refrigerant may be any fluid, such as Freon gas, with favorable thermodynamic properties. Such external refrigeration systems are well known and readily designed by one skilled in the art. The temperature of the gas mixture may also be altered by heat exchange with other process fluids, such as part or al of the feed gas, non-permeate gas, or permeate gas which has been cooled by expansion such as in a turbine expander.

Alternatively, the self-refrigerating capacity of the permeated gas may be used for cooling. Most gases are known to cool significantly when the pressure is decreased without extracting work from the gas. This is known as the Joule-Thomson effect. The magnitude of this effect depends upon the thermodynamic properties of the gas. For some gases, such as carbon dioxide at about −50° C. to 20° C., the decrease in temperature associated with the pressure drop across a membrane may be enough to maintain a membrane device at a fairly low operating temperature. This effect is referred to hereinafter as the soil-refrigerating properties of a gas. Membrane devices, such as those containing hollow fibers, generally contain a high membrane surface area to facilitate mass transfer between the streams in contact with the membrane. This high surface area also facilitates heat transfer between streams. Thus, membrane devices may be advantageously used as combined mass and heat transfer units. In one embodiment, such as demonstrated in Example 10, a gas mixture entering a hollow fiber membrane module cools because of the expansion of the permeating gas across the membrane. High heat transfer in a countercurrent flow arrangement results in cooling along the length of the membrane device, and the non-permeate product gas leaves the device significantly cooler than the permeate product gas. In other embodiments, introduction of a sweep stream with a different temperature than the feed gas stream can improve the mass-transfer performance of the device and control the temperature of the non-permeate product gas leaving the device.

In certain embodiments, the feed gas may be available at a temperature which is colder than the desired operating temperature. In such embodiments, it may be necessary to warm the feed gas to the desired operating temperature. This may be accomplished using any conventional means of heating, such as using an electrical heater, heat exchange with a warmer fluid, heat exchange with a warmer environment, and the like.

Generally, the preferred temperature for the feed gas mixture for the separation of oxygen and nitrogen will be in the range from about $-150°$ C. to about $-5°$ C., more preferably about $-125°$ C. to about $-25°$ C., and most preferably about $-100°$ C. to about $-30°$ C. Generally, the preferred temperature for the separation of carbon dioxide and a light hydrocarbon will be in the range from about $-40°$ C. to about $5°$ C.

During continuous operation, the temperature of particular streams in the process is advantageously controlled to maintain a stable operating temperature for the membrane device and other process equipment, preferably to within at least $\pm 5°$ C. The temperature of the gas may be monitored with in-line thermocouples or other temperature monitoring devices. Conventional methods of temperature control are generally available to one skilled in the art and are appropriate for most processes. For processes with turboexpanders, adjustable vanes provide some control. Fine control for these processes may be obtained by passing a portion of a process stream through a control valve, bypassing either the turboexpander or a heat exchanger.

The membrane device, piping, and/or other equipment of the apparatus or system are preferably insulated with an insulating material such as expanded perlite to minimize energy losses and operating costs associated with cooling requirements for the process. Such provisions are particularly important where the system may operate on a non-continuous or intermittent on-demand basis, or when quick start up of the system is desired. In some embodiments, it may be desirable to initially pass more of the feed gas mixture through the turbo expander or to expand the gas mixture further to facilitate rapid cooling of the membrane device and/or system to the desired operating temperature. In such embodiments, the lower initial productivity of the membrane device may be adequate for providing small amounts of product gas. This lower initial productivity can be compensated for by the addition of a product surge tank.

In some embodiments, recycle of part or all of the permeate gas or non-permeate gas is desirable. For example, an intermediate product stream from a membrane device may be recompressed and used as a portion of the feed stream to the same or another membrane device. In one preferred embodiment, an intermediate stream from a set of series or cascaded membrane devices may be recycled. In such embodiments, a higher recovery of a desired product or a higher purity might be achieved.

In other embodiments, a turboexpander is used for cooling or as a means to recover some of the compressive energy of a product gas. The terms turboexpander and turbine expander are used interchangeably herein. A turboexpander is an apparatus in which gas is expanded through a turbine, extracting energy in the form of work from the gas stream, while lowering the pressure of the gas stream. When energy is extracted in this fashion from a gas stream, the gas stream cools considerably, thus providing particularly efficient refrigeration for the process. The turboexpander may be used to power a blower, compressor, pump, generator, or other equipment through a mechanical, hydraulic, or other connection. However, in many small plants, it may not be economical to recover the energy, and the turboexpander may simply drive a braking device. Even in this case, turboexpanders are a particularly efficient cooling device.

In some embodiments, the minimization of energy requirements is desirable through the use of an integrated process design. Energy can be conserved by using one or more cold streams to cool a warmer stream in a heat exchanger. In one embodiment, cold product streams leaving the membrane device are used to partially cool the feed gas mixture and an external supply of refrigeration is used to further cool the feed gas mixture. In another embodiment, a product from a membrane device is cooled by passing it through an expander, and the cold product gases are used to cool the feed gas mixture in a heat exchanger.

Optionally, the process and apparatus may include means or altering the temperature and/or pressure of part or all of the permeate and/or non-permeate streams leaving the membrane device to a temperature and/or pressure at which the streams will be useful. For example, a permeate or non-permeate stream may be too cold to be effectively utilized, or it may be desirable to recover the refrigeration potential of the cold stream by using it to cool a warmer stream. Or it may be desirable to compress part or all of the permeate or non-permeate stream prior to recycling the stream to a prior point in the process. Heat exchangers, compressors, and the like may be employed for such purposes.

In some embodiments of the invention, it may be desirable to use membranes in combination with other separation operations such as pressure-swing adsorption, temperature-swing adsorption, fractionation, distillation, rectification, chemical reaction, absorption, or extraction. For example, membranes may be used to enrich either oxygen or nitrogen in a gas mixture prior to feeding the gas to or from a cryogenic distillation operation. Alternatively, a reaction or other process can be used to remove residual contaminants from an enriched gas produced via a membrane process.

Figure 11:
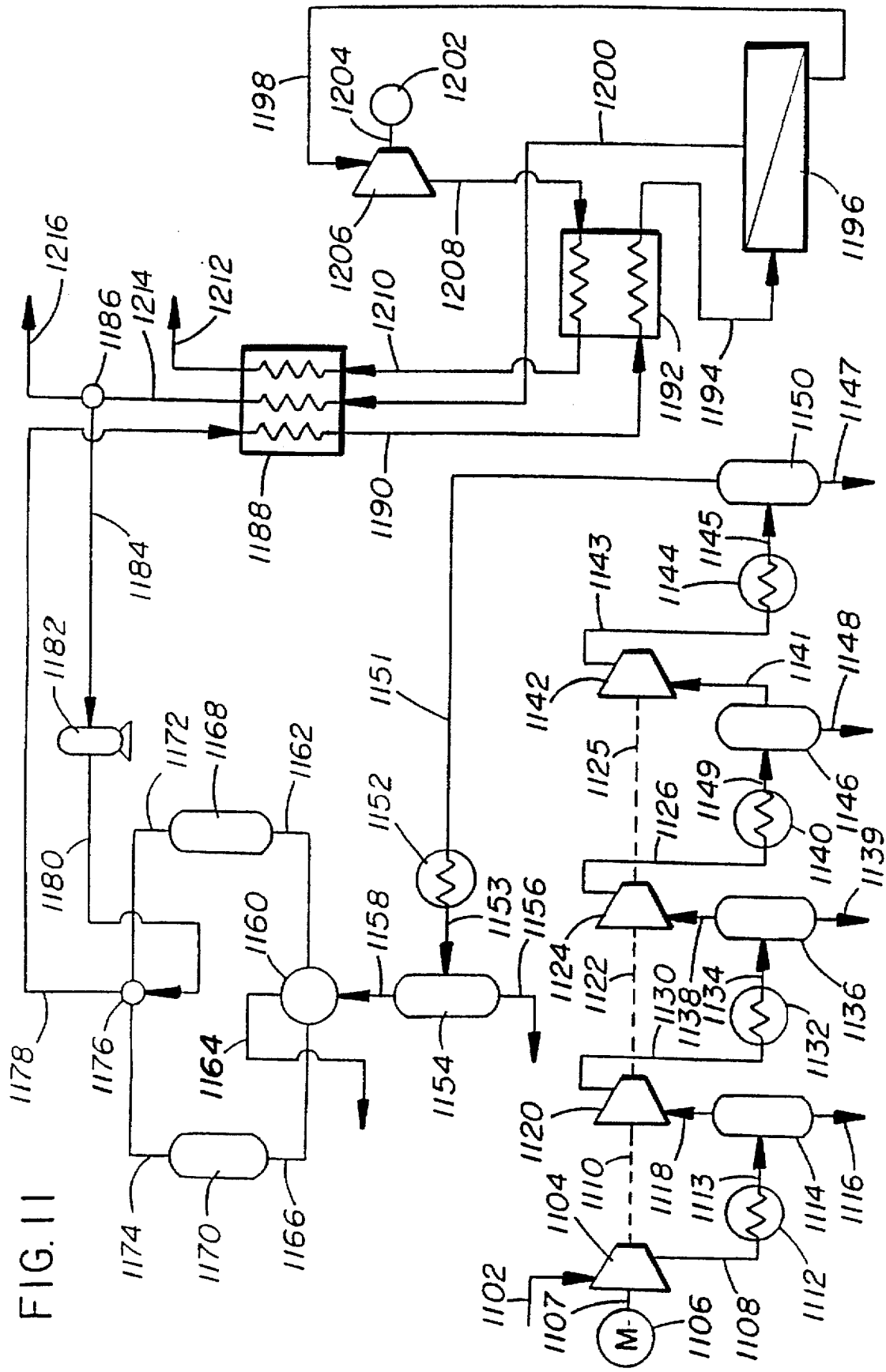
FIG. 11 depicts an illustrative embodiment of an apparatus in schematic form which is useful for achieving the method of the subject invention.

FIG. 11 illustrates an apparatus for separation or a gas mixture. A feed gas mixture is introduced through conduit 1102 into a first compressor 1104. In the illustrated embodiment, four compressor stages are utilized. Additional compressor stages or fewer compressor stages can be employed as is desired to achieve the desired pressure for the feed gas mixture into the separation operations. The gas in conduit 1102 should preferably be pretreated to remove particulate matter and undesirable contaminants with a coalescer or other filtering media. The first compressor 1104 is driven through a shaft 1107 by a motor 1106. A single motor can be used to drive a series of compressors represented by a second compressor 1120, a third compressor 1124, and a fourth compressor 1142, which are driven by shafts 1110, 1122, and 1125 respectively. The gas exits the first compressor 1104 through conduit 1108 into a chiller 1112 and then exits through conduit 1113 into a water separator or "knock-out" 1114. Condensed water exits the knock-out 1114 through conduit 1116 and gas exits through conduit 1118.

The gas from conduit 1118 enters the second compressor 1120 and exits through conduit 1130 into chiller 1132. The gas exits the chiller 1132 through conduit 1134 and then enters water knock-out vessel 1136. Water exits the knock-out 1136 through conduit 1139 and relatively dry gas exits through conduit 1138 into a third compressor 1124. The gas exiting the third compressor 1124 passes through conduit 1126 into a chiller 1140. The gas is then conveyed through conduit 1149 into water knock-out 1146 with liquid water passing through conduit 1148 and relatively dry gas through conduit 1141. The gas from conduit 1141 enters the fourth compressor 1142 and exits through conduit 1143, which conveys gas into chiller 1144. The gas exits chiller 1144 via conduit 1145 and enters water knock-out 1150. Liquid water exits the knock-out 1150 through conduit 1147. Compressed gas exits the knock-out 1150 through conduit 1151. Additional drying stages can be employed as necessary depending upon the quantity of water in the feed gas mixture and the dew point desired.

From conduit 1151, the feed gas mixture passes into a refrigerated chiller 1152 and then through conduit 1153 into a water knock-out 1154. (Alternatively, the feed gas mixture may be cooled using an external refrigeration system or by heat exchange with part or all of the permeate gas.) Prior to entering the chiller 1152, the feed gas mixture is preferably filtered to remove oil picked up from the compressor. Liquid water exits through conduit 1156 and almost dry gas passes through conduit 1158. To achieve additional drying, either an air dryer employing a molecular sieve or a reversing heat exchanger can be used. A molecular sieve is illustrated in FIG. 11 with two sieve beds 1168 and 1170, which are alternately regenerated or operated. The sieve beds may be regenerated using part or all of the permeate gas as a dry sweep, and/or heat regeneration of the sieve beds may also be used. Use of a reversing heat exchanger would require some modifications to the illustrated apparatus, but the required modifications would be apparent to one skilled in the art.

Switching valves 1176 and 1160 are employed to switch between the different gas flows required for drying and regeneration. Gas from conduit 1158 passes into switching valve 1160 and then is routed to one of the molecular sieve beds 1168 or 1170. For purposes of illustration, the apparatus will be described with bed 1168 being the active drying bed while bed 1170 is being regenerated. In this instance, the dry feed gas mixture is passed through valve 1160 into conduit 1162 and then into molecular sieve bed 1168. The gas exits through conduit 1172 into switching valve 1176, where the gas is routed into conduit 1178.

The sieve bed 1170 is regenerated by means of gas being introduced through conduit 1180 which is dry relative to the bed. This dry gas from conduit 1180 passes through switching valve 1176 into line 1174 and is conducted through sieve bed 1170. The moisture purge gas then exits through line 1166 into switching valve 1160, where the gas is removed through line 1164.

The feed gas mixture passes through conduit 1178 into a heat exchanger 1188, which serves to further cool the relatively dry gas by contacting it countercurrently with cooler gases in conduits 1200 and 1210. The heat exchanger is conveniently of conventional design with multiple passages connecting each associated inlet and outlet to maximize heat transfer. The cooled feed gas mixture passes into conduit 1190, where it is conveyed to a second cooler 1192, where heat exchange occurs with gas from conduit 1208. Alternatively, heat exchange capability may be provided by a single heat exchanger rather than the two heat exchangers 1188 and 1192. The feed gas mixture is then introduced from conduit 1194 into a membrane unit 1196. The membrane unit 1196 may comprise one or more membrane elements. Some heat exchange occurs in the membrane unit 1196 as the permeate gas is at lower pressure and cools through expansion and cools the non-permeate gas stream which exits the membrane unit 1196 through conduit 1198. The non-permeate reject gas stream in conduit 1198 is still at relatively high pressure and the gas is cooled by passage into a turboexpander 1206. The energy from the gas expanding is conveyed through shaft 1204 to an energy consuming device 1202, which permits the use of this energy elsewhere or may simply dissipate the energy.

The expanded non-permeate gas is conveyed through conduit 1208 into heat exchanger 1192 where it is used to cool the feed gas mixture introduced through conduit 1190. The gas permeating through membrane 1196 is conveyed by conduit 1200 into heat exchanger 1188, where this gas together with the gas emerging from heat exchanger 1192 through conduit 1210 is used to cool the feed gas mixture in heat exchanger 1188. All conduit lines are preferably insulated to conserve the cooling value of the gas contained in the conduits where these gases are below ambient temperature.

The gas from conduit 1200 exits heat exchanger 1188 through conduit 1214 and a portion of this gas is diverted through valve 1186 to conduit 1184. The gas not diverted to conduit 1184 is conveyed to conduit 1216. The gas through conduit 1184 enters a blower, fan, or other low pressure means of providing gas 1182, and then is conveyed into line 1180 where this gas is used to purge moisture from the molecular sieve bed being regenerated, either 1168 or 1170. The gas in conduit 1180 optionally may be heated to aid in regeneration of the molecular sieve bed. The gas from conduit 1210 exits heat exchanger 1188 through conduit 1212.

In FIG. 11, the size and preferred design of the compression stages, drying stages, heat exchangers, and membrane units will all depend upon the exact composition of the feed gas mixture, the type of membrane used, the desired operating temperature, and other separation conditions. Aluminum or aluminum alloys are preferred materials of construction for many of the system components operated at low temperatures. It is within the skill of one knowledgeable in the art to determine optimum conditions depending upon the composition of the gas mixture and the desired separation.

Figure 14:
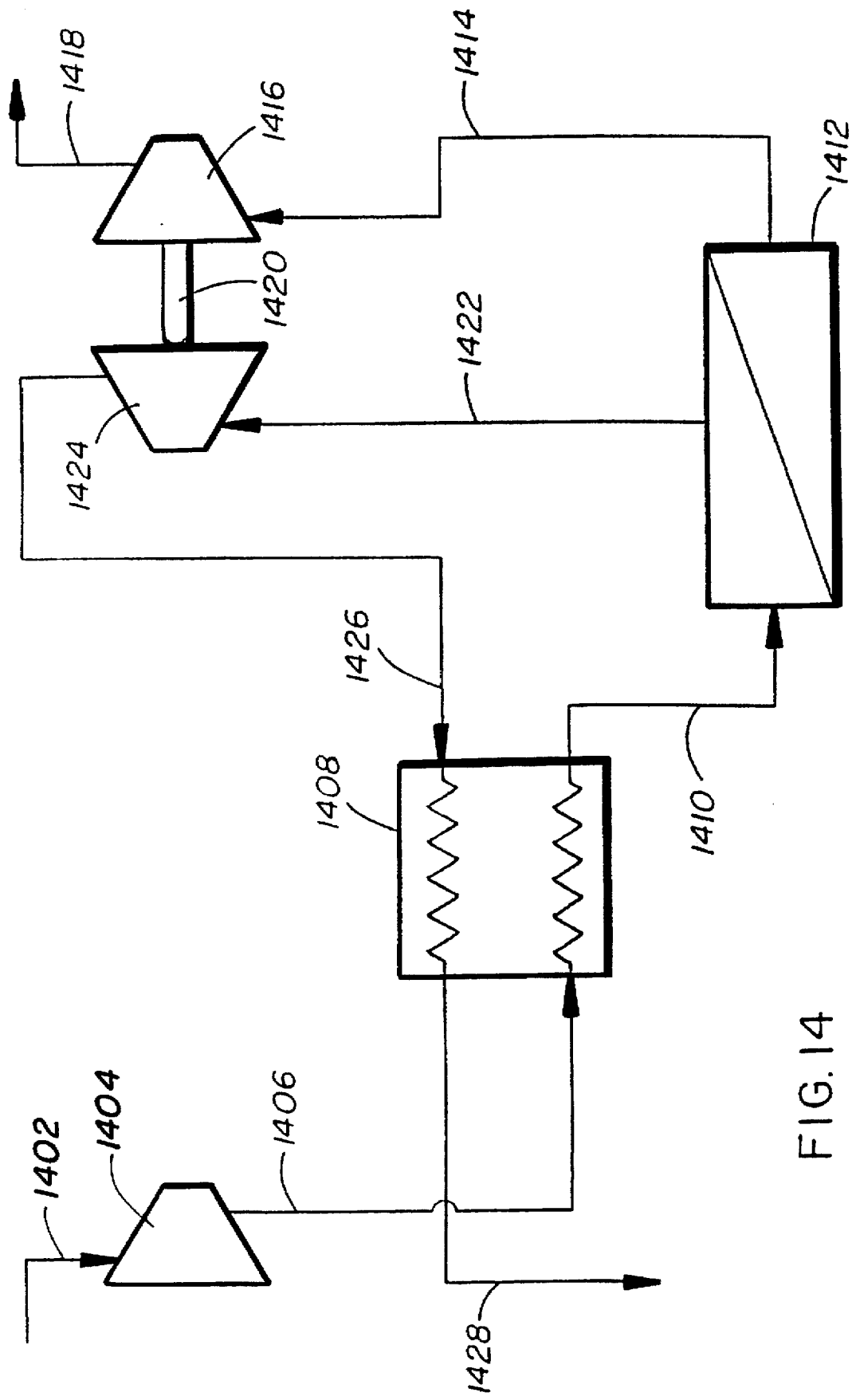
FIG. 14 illustrates in schematic form an alternative apparatus which is useful for achieving the method of the subject invention when a high pressure permeate is desired.

FIG. 11 illustrates another apparatus operable for conducting the method of this invention in a simplified schematic. A gas mixture to be separated is conveyed in conduit 1402 to a compressor 1404, which compresses the gas. The compressed gas exits the compressor 1404 through conduit 1406 and is conveyed into a heat exchanger 1408. The compressed gas exits the heat exchanger 1408 via conduit 1410 and is introduced into membrane unit 1412. The non-permeate gas exits the membrane unit 1412 through conduit 1422 and the permeate gas exits through conduit 1414. Conduit 1422 conveys non-permeate gas into a turbine expander 1424 and the expanded and cooled gas exits through conduit 1426. The cooled gas passes from conduit 1426 into the heat exchanger 1408 and then exits through conduit 1428. The turbine expander is mechanically or otherwise connected through an energy transfer means 1420 with a compressor 1416. The energy transfer means 1420 may be a drive shaft. Permeate gas in conduit 1414 enters the compressor 1416 and exits as a compressed gas through conduit 1418. The apparatus depicted in FIG. 14 is an efficient means for producing a relatively high pressure product from the permeate gas in a membrane system to be operated at low temperatures. The power from the turbine expander may also be used for pulling a vacuum on the permeate side of the membrane device, compressing the feed gas mixture or non-permeate gas to a higher pressure, and the like.

Figure 15:
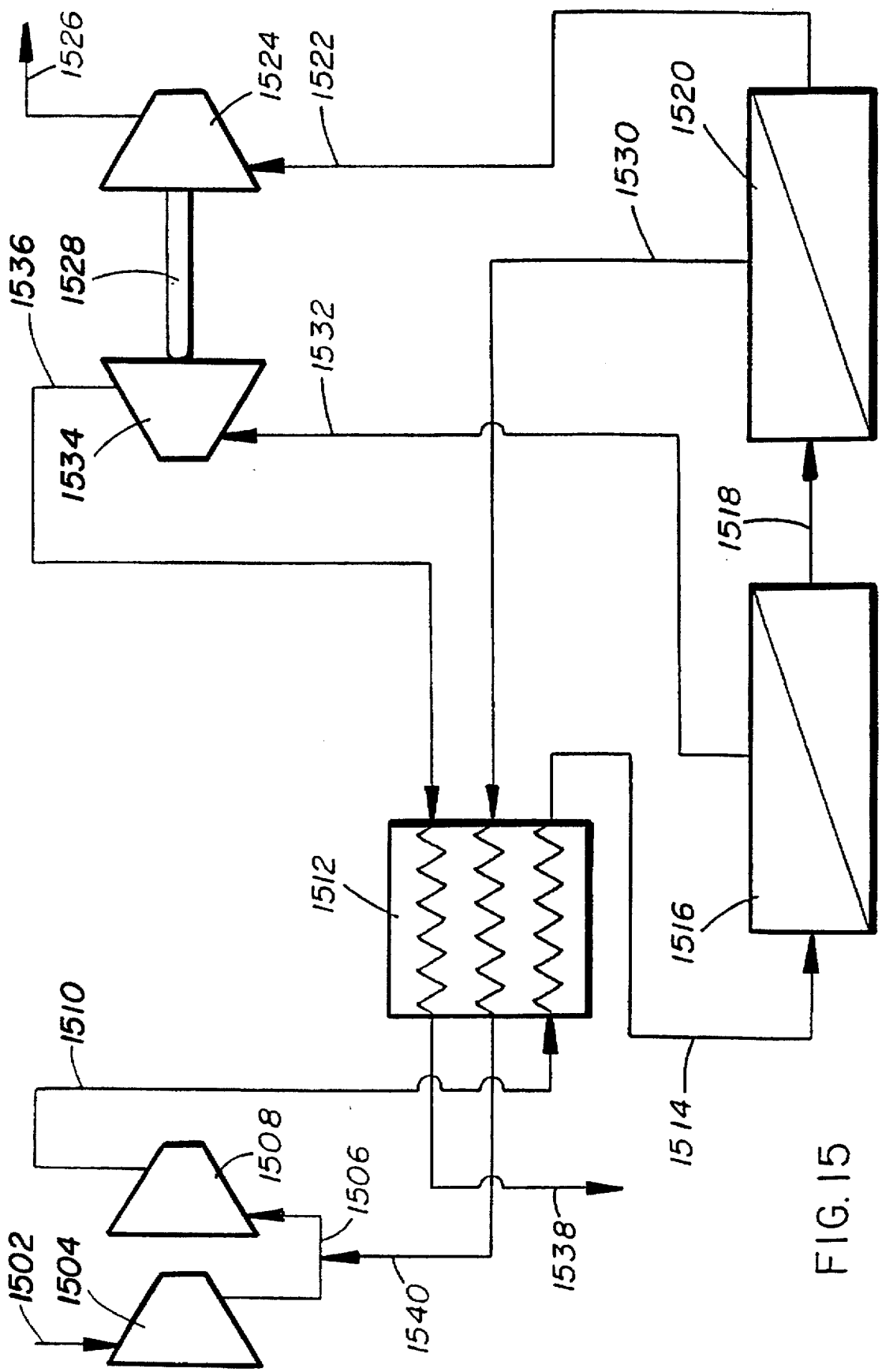
FIG. 15 illustrates in schematic form an alternative apparatus for producing a high pressure permeate of higher purity.

FIG. 15 illustrates in simplified schematic another apparatus for separating a gas mixture to produce a permeate gas of relatively high purity and high pressure. The feed gas mixture is introduced through conduit 1502 into a first compressor means 1504 and then exits through conduit 1506. Conduit 1506 conveys the compressed gas into a second compressor means or a second stage compressor 1508. The compressed gas exits compressor stage 1508 through conduit 1510 and is conveyed into a heat exchanger 1512. The cooled gas emerges from the heat exchanger 1512 through conduit 1514 and is conveyed to a first membrane device 1516. The non-permeate gas from the first membrane device 1516 exits through conduit 1532 and is conveyed to a turbine expander 1534. The turbine expander 1534 expands and cools the gas and the gas emerges through conduit 1536 and is conveyed to the heat exchanger 1512 and finally exits through conduit 1538. If a high pressure stream of the non-permeate gas is not desired, the gas may be further expanded to achieve significant cooling and provides significant work. The permeate gas from the first membrane device 1516 exits through conduit 1518 and is conveyed to a second membrane device 1520. Gas not permeating the second membrane device 1520 exits through conduit 1530 and is conveyed to the heat exchanger 1512. The non-permeate gas from the second membrane device 1520 is conveyed from the heat exchanger 1512 through conduit 1540 into conduit 1506 and then into the second compressor stage 1508. This permits additional recovery of the desired permeate gas through recycle. In the second membrane device 1520, the permeate gas exits through conduit 1522 and is conveyed to a compressor 1524, which is connected by an energy transfer means 1528 with turboexpander 1534. The turboexpander 1534 can thereby provide part or all of the power needed for compressor 1524. The permeate gas from the second membrane device 1520, after being compressed in compressor means 1524, is conveyed through conduit 1526. The resulting product gas in conduit 1526 is relatively high pressure and purity.

Figure 16:
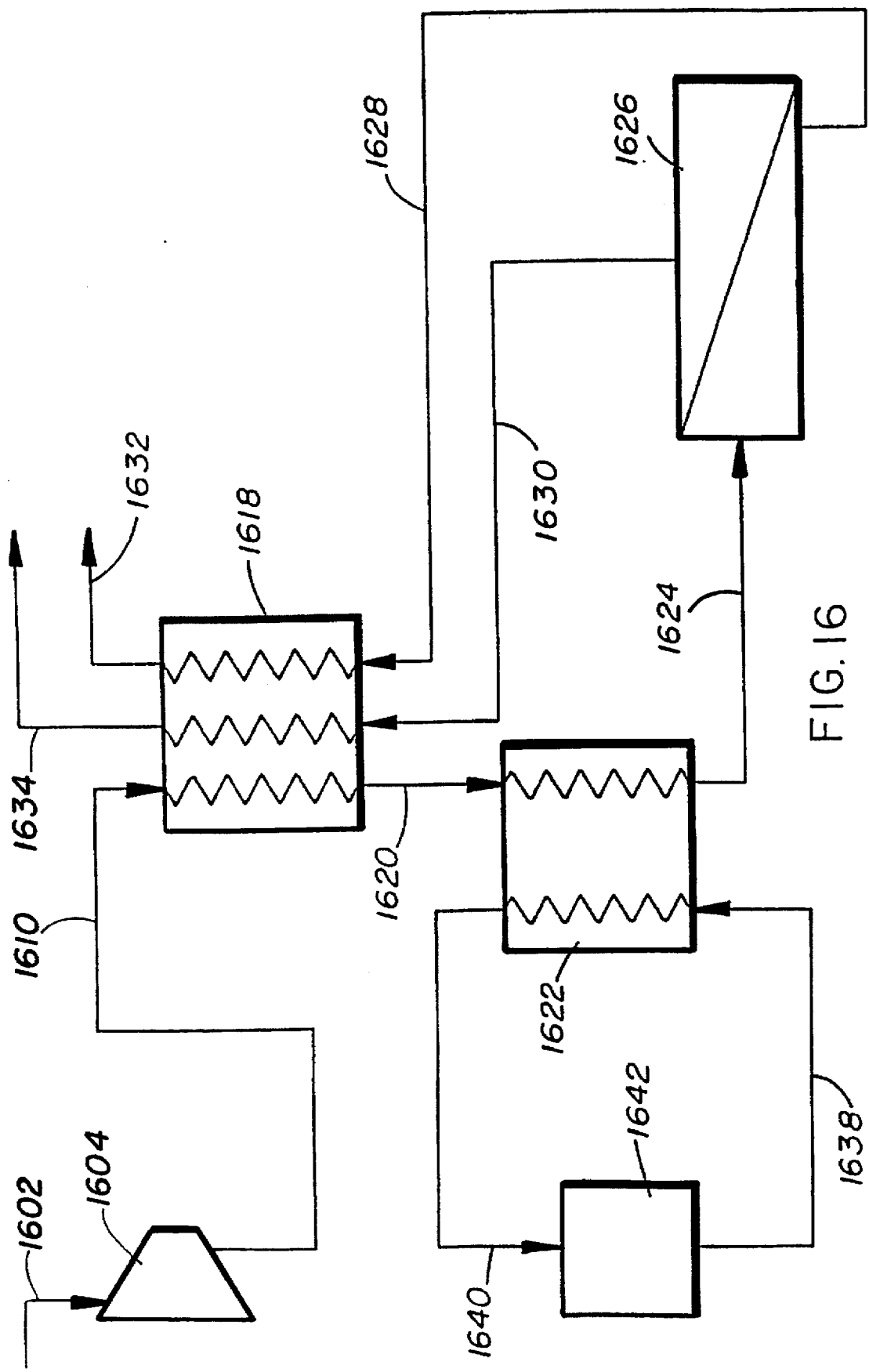
FIG. 16 illustrates in schematic form an alternative apparatus for producing a high pressure non-permeate stream, where cooling is provided by an external cooling means.

FIG. 16 illustrates in schematic form another embodiment of the invention which employs conventional cooling rather than a turbine expander to achieve the desired temperature for the feed gas mixture to the membrane. In FIG. 16, feed gas mixture is introduced by conduit 1602 into a compressor means 1604. Gas exits the compressor means 1604 via conduit 1610. Conduit 1610 conveys gas into a first heat exchanger 1618 and the gas after being cooled is conveyed via conduit 1620 into a second heat exchanger 1622. The feed gas from conduit 1620 emerges from heat exchanger 1622 via conduit 1624 and is introduced into a membrane unit 1626. The non-permeate gas emerges from the membrane unit 1626 via conduit 1628 and is Introduced into the first heat exchanger 1618 and ultimately exits through conduit 1632. The gas permeate the membrane device 1626 is conveyed via conduit 1630 into the first heat exchanger 1618 and then exits through conduit 1634. The second heat exchanger 1622 is cooled via a heat transfer fluid introduced through conduit 1638 to heat exchanger 1622. The heat transfer fluid exits the second heat exchanger 1622 through conduit 1640 and is then introduced into a refrigeration means 1642, where the heat transfer fluid is cooled and then recirculated through conduit 1638. Heat exchange capability may alternatively be provided by a single heat exchanger rather than the two heat exchangers 1618 and 1622 shown.

One of ordinary skill in the art would recognize that a variety of alternatives may be employed in altering the temperature of the gas mixture to the operating temperature, removing contaminants, configuring membranes, and compressing or expanding gases. For example, a reversing heat exchanger can be employed to remove certain condensable contaminants from a feed gas mixture. The term membrane unit or device as used herein may refer to multiple membranes arranged in a series, parallel, cascade, and/or recycle configuration to increase product purity or productivity of the system. The various apparatus described herein in FIGS. 11, 14, 15, and 16 are presented for illustrative purposes and are not intended to unnecessarily limit the means which can be used in the various steps of the subject method.

The membrane, gas mixture to be separated, temperature of separation, and transmembrane pressure should be selected so as to achieve an economically efficient separation of component gases in the feed gas mixture. Desirably, the permeability of the component gas selectively permeating through the membrane is sufficiently great at the selected conditions so that the membrane device does not require an excessive membrane surface area. Preferably, for separation or oxygen and nitrogen, the permeability of oxygen at the selected conditions is at least 0.1 barrer, more preferably at least 1 barrer. The permeability of oxygen is preferably less than 2000 barrers at 30° C., since transport through membranes having higher permeability generally exhibit anomalies which are not believed directly attributable to a solution-diffusion mechanism and therefore such membranes are not relevant to the subject method.

Figure 13:
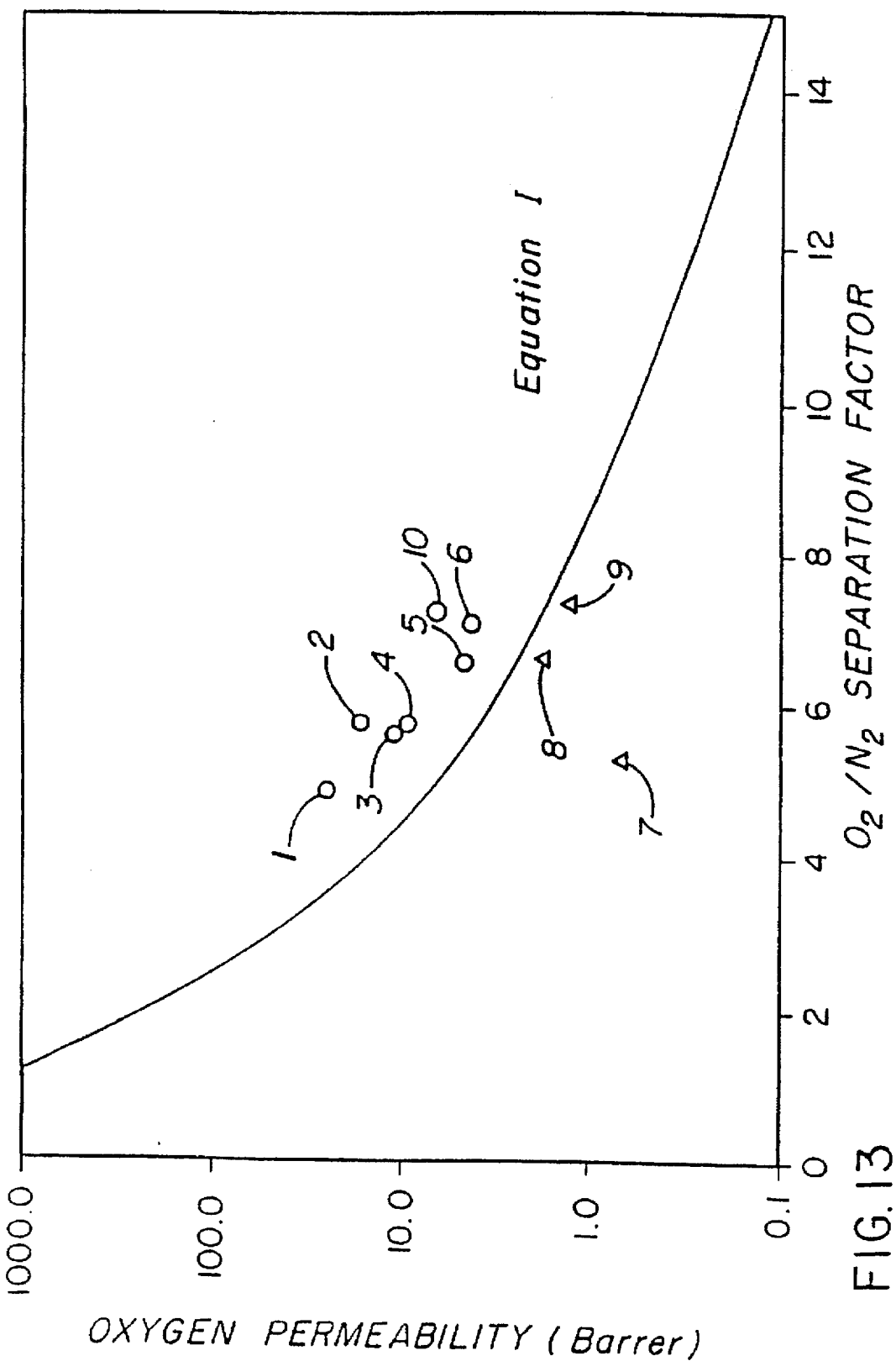
FIG. 13 illustrates certain polymeric membrane materials having the separation characteristics inherent in Equation I (materials designated 1 through 6 and 10) and other polymeric membrane materials which do not meet this criteria (materials designated 7 through 9)

FIG. 13 illustrates the performance of membranes of certain polymers having the separation characteristics inherent in Equation I and the performance of other polymers which do not meet this criteria. The membranes corresponding to Points 1 through 10 are made from the following polymers: Point 1 is poly-4-methylpentene-1 (PMP), Point 2 is a polymer derived from 4,6-diaminoresorcinol dihydro-_chloride and 1,1,3-trimethyl-3-phenylindan-4,5'-dicarboxylic acid (PBO A), Point 3 is polyphenylene oxide (PPO), Point 4 is tetrachlorohexafluoro bisphenol A polycarbonate (TCHF BA PC), Point 5 is a polymer derived from 2,2-bis(3-amino-4-hydroxyphenyl)-1,1,1,3,3,3-hexafluoropropane and diphenylether-4,4'-dicarboxylic acid (PBO B), Point 6 is tetrabromohexafluoro bisphenol A isophthalate ester (TBHF BA IE), Point 7 is cellulose triacetate (CTA), Point 8 is TRYCITE polystyrene (PST), Point 9 is tetrabromo bisphenol A polycarbonate (TBBA PC), and Point 10 is 9,9-bis(3,5-dibromo-4-hydroxy phenyl) fluorene polycarbonate.

SPECIFIC EMBODIMENTS

The subject invention is further illustrated but not otherwise limited by the following examples.

Process Simulations Examples 1–10.

Ten examples describing low temperature membrane processes are presented to demonstrate the scope of the invention. These examples summarize process simulations based on commercially available computer software for process engineering and well known membrane device parameter relationships, using hollow fiber membrane devices and assuming ideal countercurrent fluid flow patterns and adiabatic behavior with ideal heat transfer between the permeate and non-permeate gas streams. Mass transfer across the membrane was described using the standard partial pressure-driven permeability equations for gas separation, with temperature dependent permeabilities derived from the data given in Tables 13 and 15. Recovery as used herein refers to the fraction or percentage of the volume of product gas (permeate or non-permeate) to the volume of feed gas. The examples include a process flowsheet, a major stream summary, and a description of major process equipment. Each example describes a process that is expected to be operable.

The examples are:
1. Nitrogen process with an expander on the non-permeate product stream.
2. Nitrogen process with an expander on the permeate product stream.
3. Nitrogen process with an external refrigeration system.
4. Nitrogen process with an external refrigeration system and dehydration membranes for air drying.

5. Oxygen process with an expander-driven oxygen compressor.
6. Oxygen process with a vacuum pump on the permeate product stream.
7. Oxygen process with cascaded membrane devices and a recycle stream.
8. Methane purification process with an expander on the non-permeate product stream.
9. Methane purification process with an external refrigeration system.
10. Carbon dioxide recovery process without expander or external refrigeration.

Examples 1–7 are for the separation or oxygen and nitrogen from air using PBO A membranes, and Examples 8–10 are for the separation or methane and carbon dioxide mixtures using tetrachlorohexafluoro bisphenol A polycarbonate (TCHF BA PC) membranes. Examples 1–3 demonstrate the use or a low temperature membrane process to produce a nitrogen-enriched non-permeate product, using three different methods for removing heat from the process to maintain a low temperature. Example 4 is similar to Example 3, except that a membrane device selectively permeable to water is used to remove water vapor from the feed gas air stream, thus preventing condensation in the process. This Example also demonstrates the use of membranes operating at ambient temperatures in conjunction with low temperature membranes. Examples 5–7 demonstrate the use of low temperature membrane processes to produce an oxygen-enriched permeate product. Example 5 demonstrates the use of a compressor to maintain the pressure difference across the membrane device and use of an expander to drive a product compressor. Example 6 demonstrates the use of a vacuum pump in conjunction with a blower to maintain a pressure difference across the membrane device. Example 7 is similar to Example 5, except cascaded membrane devices and a recycle stream are used to achieve a higher product purity. Examples 8–10 demonstrate the use of a low temperature membrane carbon dioxide/methane separation process when a contaminant-free feed gas stream is available at high pressures and ambient temperatures. Example 8 uses heat exchangers and an expander to alter the temperature of the streams and maintain the membrane device at a low temperature, where a higher pressure non-permeate product stream is desired. Example 9 is similar to Example 8, except that the expander is replaced with an external refrigeration system. Example 10 demonstrates how the self-refrigerative capacity of a gas may be utilized For cooling, eliminating the need for an expander or external refrigeration system to remove heat from the process.

EXAMPLE 1

Nitrogen Process With An Expander On The Non-Permeate Product Stream.

Example 1 is a process to produce an enriched nitrogen product stream from air. The nitrogen stream specifications are a 40,000 standard cubic feet per hour (SCFH) (1,130 cubic meters per hour) flowrate at 125 psig (863 kPa) pressure with a maximum 1 percent oxygen concentration on a molar basis. A simplified flowsheet for this process is shown in FIG. 1. A summary of the major process streams is given in Table 1A, and a summary description list of the major process equipment is given in Table 1B. Definitions of the abbreviations used are given in Table 1C.

With reference to FIG. 1, feed air 110 to the process is available from the atmosphere at ambient pressure, temperature, and humidity, and must be compressed. A four-stage centrifugal compressor 105 with intercoolers and aftercoolers is illustrated. Some water condensation may take place in the coolers, so the coolers must be equipped with automatic drains 120 A–D to remove the condensed liquid. Air 110 entering the compressor 105 would normally be filtered to remove particulates that might erode or abrade the compressor elements. Air stream 111 flows through the components of compressor 105. Air 112 leaving the compressor 105 is passed through a small heat exchanger 121, where it is cooled to between 4° C. and 10° C. against an evaporating refrigerant 122 from an external refrigeration source. This causes additional condensation of water from the air, which is separated in vessel 123 equipped with automatic drain 124. If the compressor is an oiled type, entrained or vaporized oil would also be separated from the air in vessel 123. Further drying of the air 113 takes place in an adsorptive air dryer 126. In this example, a twin-bed molecular sieve type 3A adsorber available from Union Carbide is employed, with one bed being used while the other bed is being regenerated. This adsorber 126 would dry the incoming air 113 to a dewpoint below the lowest temperature expected to be reached in the process, typically a dewpoint of less than –100° C. Not shown on the flowsheet are additional purification equipment that would be used to remove other contaminants from the air stream. Such equipment may include coalescing filters to remove entrained liquid droplets after the water separation vessel 123, an activated carbon filter to remove hydrocarbons that might have a deleterious impact on the membrane, and/or fine particulate filters to remove carbon powder or dust from the air after the adsorber 126.

The compressed and purified air 130 enters a main heat exchanger 127, where it is cooled against warming product streams 153 and 140. The air 131 is further cooled in a small heat exchanger 128 against the warming product gas 152 leaving the expander 129. The cooled air 132 then enters the high pressure passages of the membrane device 133, and the oxygen in the air preferentially permeates through the membrane 134 to the low pressure passages of the membrane device. This results in the high pressure non-permeate stream 150 exiting the membrane device 133 enriched in nitrogen, while the low pressure permeate stream 140 exits the membrane device 133 enriched in oxygen. The non-permeate product stream 151 enters the expander 129, which extracts some power from the stream, lowering its pressure and temperature. The exiting stream from the expander 129 is 152. This removal of energy compensates for the heat entering the cold equipment through heat transfer with the surroundings and other sources, thus maintaining the equipment and process streams at the desired low temperature. The product streams 152 and 153 then enter the heat exchangers 128 and 127 respectively, where the streams are warmed against the cooling feed air streams 131 and 130 respectively. The high pressure non-permeate nitrogen product stream 154 then enters a pipeline, while most of the low pressure permeate oxygen product stream 141 is simply vented to the atmosphere through conduit 142. Some of the dry low pressure oxygen product 143 may be compressed and heated and then used to regenerate the inactive bed of the adsorptive air drier 126 via conduits 143 and 144.

This Example demonstrates many of the characteristics of a low temperature membrane process. A number of membrane modules are arranged in parallel to achieve the desired separation at the given pressures. A compressor is used to maintain the pressure differential across the membrane. The cold process equipment and piping would be well insulated to minimize heat leakage into the system. An expander is used to supply refrigeration and maintain the cold process equipment at the desired temperature. A refrigerated air dryer, an adsorptive air dryer, an activated carbon filter, a coalescing filter, and particulate filters are used to remove contaminants from the air. Heat exchangers are used to cool the feed gas stream and warm the product gas streams. By exchanging heat between these streams, the refrigeration required from the expander can be minimized, thus saving energy. No product recompression is necessary in this process, since the air compressor is designed to compensate for the pressure drop through the system so that the nitrogen product leaving the main heat exchanger will be at the specified pressure.

TABLE 1A

STREAM SUMMARY FOR LOW-TEMPERATURE NITROGEN PROCESS WITH AN EXPANDER ON THE NON-PERMEATE STREAM

| Stream ID | | 110 | 111 | 112 | 113 | 120A | 120B | 120C | 120D |
|---|---|---|---|---|---|---|---|---|---|
| From: | | — | COMPRESS | AFT-COOL | CHILLER | COMPRESS | COMPRESS | COMPRESS | AFT-COOL |
| To: | | COMPRESS | AFT-COOL | CHILLER | DRYER | — | — | — | — |
| Temperature | K | 293.15 | 393.9628 | 316.15 | 277.5944 | n.a. | n.a. | 313.15 | 316.15 |
| | C | 20 | 120.8128 | 43 | 4.4444 | n.a. | n.a. | 40 | 43 |
| Pressure | Pa | 101330 | 1297200 | 1283400 | 1269700 | n.a. | n.a. | 672000 | 1283400 |
| | psia | 14.6959 | 188.1481 | 186.1481 | 184.1481 | n.a. | n.a. | 97.4659 | 186.1481 |
| Vapor Fraction | | 1 | 1 | 1 | 1 | n.a. | n.a. | 0 | 0 |
| Total Flow: | | | | | | | | | |
| | kg mol/s | 0.025216 | 0.025165 | 0.025061 | 0.0249 | 0 | 0 | 5.0602E-05 | 0.00010385 |
| | kg/s | 0.7267 | 0.7258 | 0.7239 | 0.721 | 0 | 0 | 0.00091162 | 0.0018709 |
| | lb mol/hr | 200.127 | 199.7254 | 198.9012 | 197.6191 | 0 | 0 | 0.4016 | 0.8242 |
| | lb/hr | 5767.7 | 5760.465 | 5745.616 | 5722.519 | 0 | 0 | 7.2352 | 14.849 |
| | cu m/s | 0.6065 | 0.06392 | 0.051462 | 0.045214 | 0 | 0 | 1.2205E-06 | 2.5102E-06 |
| Mole Fraction | | | | | | | | | |
| H2O | | 0.013223 | 0.011239 | 0.007141 | 0.0007 | 0 | 0 | 1 | 1 |
| N2 | | 0.7705 | 0.7721 | 0.7753 | 0.7803 | 0 | 0 | 3.6785E-07 | 7.8284E-07 |
| AR | | 0.009217 | 0.009235 | 0.009273 | 0.009334 | 0 | 0 | 1.2616E-07 | 2.5693E-07 |
| O2 | | 0.2067 | 0.2071 | 0.208 | 0.2093 | 0 | 0 | 2.4335E-06 | 4.9329E-06 |
| CO2 | | 0.000326 | 0.000326 | 0.000328 | 0.00033 | 0 | 0 | 1.753E-07 | 3.3224E-07 |

| Stream ID | | 124 | 125 | 130 | 131 | 132 | 140 | 141 | 150 |
|---|---|---|---|---|---|---|---|---|---|
| From: | | CHILLER | DRYER | DRYER | HTEX | SUBC | MEMBRANE | HTEX | MEMBRANE |
| To: | | — | — | HTEX | SUBC | MEMBRANE | HTEX | — | HLEAK |
| Temperature | K | 277.5944 | 277.428 | 277.428 | 217.15 | 213.15 | 213.15 | 272.7985 | 208.87 |
| | C | 4.4444 | 4.278 | 4.278 | −56 | −60 | −60 | −0.3515 | −64.28 |
| Pressure | Pa | 1269700 | 1200700 | 1200700 | 1180000 | 1159300 | 120660 | 99978 | 1142800 |
| | psia | 184.1481 | 174.1481 | 174.1481 | 171.1481 | 168.1481 | 17.5006 | 14.5006 | 165.749 |
| Vapor Fraction | | 0 | 0 | 0.9674 | 1 | 1 | 1 | 1 | 1 |
| Total Flow: | | | | | | | | | |
| | kg mol/s | 0.00016154 | 0.0005231 | 0.024376 | 0.024376 | 0.024376 | 0.011276 | 0.011276 | 0.013101 |
| | kg/s | 0.0029102 | 0.015082 | 0.7059 | 0.7059 | 0.7059 | 0.3383 | 0.3383 | 0.3676 |
| | lb mol/hr | 1.2821 | 4.1518 | 193.4673 | 193.4673 | 193.4673 | 89.4916 | 89.4916 | 103.9761 |
| | lb/hr | 23.0976 | 119.7026 | 5602.816 | 5602.816 | 5602.816 | 2685.184 | 2685.184 | 2917.644 |
| | cu m/s | 3.8013E-06 | 0.0009709 | 0.046782 | 0.036719 | 0.036634 | 0.1653 | 0.2557 | 0.019589 |
| Mole Fraction | | | | | | | | | |
| H2O | | 1 | 0.033309 | 0 | 0 | 0 | 0 | 0 | 0 |
| N2 | | 1.6147E-07 | 0.7428 | 0.7811 | 0.7811 | 0.7811 | 0.5392 | 0.5392 | 0.9893 |
| AR | | 9.558E-08 | 0.0088852 | 0.009343 | 0.009343 | 0.009343 | 0.0195 | 0.0195 | 0.000601 |
| O2 | | 2.0025E-06 | 0.1993 | 0.2095 | 0.2095 | 0.2095 | 0.4413 | 0.4413 | 0.010055 |
| CO2 | | 2.8742E-07 | 0.015696 | 0 | 0 | 0 | 0 | 0 | 0 |

| Stream ID | | 151 | 152 | 153 | 154 |
|---|---|---|---|---|---|
| From: | | HLEAK | EXPAND | SUBC | HTEX |
| To: | | EXPAND | SUBC | HTEX | — |
| Temperature | K | 209.4529 | 202.95 | 210.138 | 272.7985 |
| | C | −63.6971 | −70.2 | −63.012 | −0.3515 |
| Pressure | Pa | 1142800 | 1003200 | 982500 | 961820 |
| | psia | 165.749 | 145.5 | 142.5 | 139.5 |
| Vapor Fraction | | 1 | 1 | 1 | 1 |
| Total Flow: | | | | | |
| | kg mol/s | 0.013101 | 0.013101 | 0.013101 | 0.013101 |
| | kg/s | 0.3676 | 0.3676 | 0.3676 | 0.3676 |
| | lb mol/hr | 103.9761 | 103.9761 | 103.9761 | 103.9761 |
| | lb/hr | 2917.644 | 2917.644 | 2917.644 | 2917.644 |
| | cu m/s | 0.019648 | 0.021671 | 0.022984 | 0.03089 |

TABLE 1A-continued

STREAM SUMMARY FOR LOW-TEMPERATURE NITROGEN PROCESS
WITH AN EXPANDER ON THE NON-PERMEATE STREAM

| Mole Fraction | | | | |
|---|---|---|---|---|
| H2O | 0 | 0 | 0 | 0 |
| N2 | 0.9893 | 0.9893 | 0.9893 | 0.9893 |
| AR | 0.000601 | 0.000601 | 0.000601 | 0.000601 |
| O2 | 0.010055 | 0.010055 | 0.010055 | 0.010055 |
| CO2 | 0 | 0 | 0 | 0 |

TABLE 1B

Low-Temperature Nitrogen Process with
Expander on Non-Permeate Stream: Major Equipment
Summary

MAIN AIR COMPRESSOR

4-Stage compressor with intercoolers and aftercooler.
Capacity: 0.73 kg/s air at 1284000 Pa discharge pressure.
Minimum stage efficiency: 80 percent isentropic.
Motor capacity: 242 kW brake power.
Cooler capacity: maximum 40° C. outlet at 20° C. ambient temperature.

MEMBRANE MODULES

13.8 Parallel modules containing $1.4 \times 10^6$ PBO A fibers.
Fiber ID (m): $9.5 \times 10^{-5}$
Fiber OD (m): $1.35 \times 10^{-4}$
Fiber Dense Region Thickness (m): $7.4 \times 10^{-8}$
Fiber Active Length (m): 1.5748
Tubesheet Length (m): 0.2032

MAIN HEAT EXCHANGER

Brazed aluminum plate-and-fin heat exchanger with
extended-surface area fins. Three sets of passages in
counter-current arrangement.
Capacity, stream 1: 0.71 kg/s at 1200700 Pa from 4.3° C. to −56° C.
stream 2: 0.37 kg/s at 982500 Pa from −63° C. to −0.4° C.
stream 3: 0.34 kg/s at 120700 Pa from −60° C. to −0.4° C.
Duty: 44.4 kW, maximum 4.7° C. warm-end temperature difference.
Maximum pressure drop: 20700 Pa each stream.

SUBCOOLER HEAT EXCHANGER

Brazed aluminum plate-and-fin heat exchanger with
extended-surface area fins. Two sets of passages in
counter-current arrangement.
Capacity, stream 1: 0.71 kg/s at 1180000 Pa from −56° C. to −60° C.
stream 2: 0.37 kg/s at 1032000 Pa from −70° C. to −63° C.
Duty: 2.9 kW, maximum 3.0° C. warm-end temperature difference.
Maximum pressure drop: 20700 Pa each stream.

EXPANDER

Brake-loaded turbo-expander for extraction of 2.35 kW work.
Capacity: 0.37 kg/sec, 99 percent nitrogen at 1143000 Pa, −64° C.
Pressure reduction to 1003000 Pa.
Minimum efficiency: 80 percent isentropic.

CHILLER/DRYER

Heat exchanger with external freon refrigeration system
and water-separation vessel.
Capacity: 0.73 kg/s at 1283000 Pa from 40° C. to 4.4° C.
Expected refrigeration duty: 36 kW.

TABLE 1B-continued

Low-Temperature Nitrogen Process with
Expander on Non-Permeate Stream: Major Equipment
Summary Maximum overall pressure drop: 13800 Pa.

AIR DRYER

Twin-vessel molecular-sieve adsorptive air dryer with
regeneration blower and heater.
Capacity: 0.73 kg/s saturated air at 1270000 Pa, 4.4° C.
Dewpoint requirement: −70° C. at pressure.
Maximum pressure drop: 69000 Pa.

TABLE 1C

Equipment List Key For TABLE 1A

| | |
|---|---|
| COMPRESS | Main Air Compressor |
| AFT-COOL | Compressor Aftercooler |
| CHILLER | Refrigerated Air Chiller |
| DRYER | Mol-sieve Adsorptive Air Dryer |
| HTEX | Main Heat Exchanger |
| SUBC | Small Heat Exchanger |
| MEMBRANE | Parallel Membrane Modules |
| HLEAK | Heat Leak Simulation |
| EXPAND | Expander |

EXAMPLE 2

Nitrogen Process With An Expander On The Permeate Product Stream.

Figure 2:
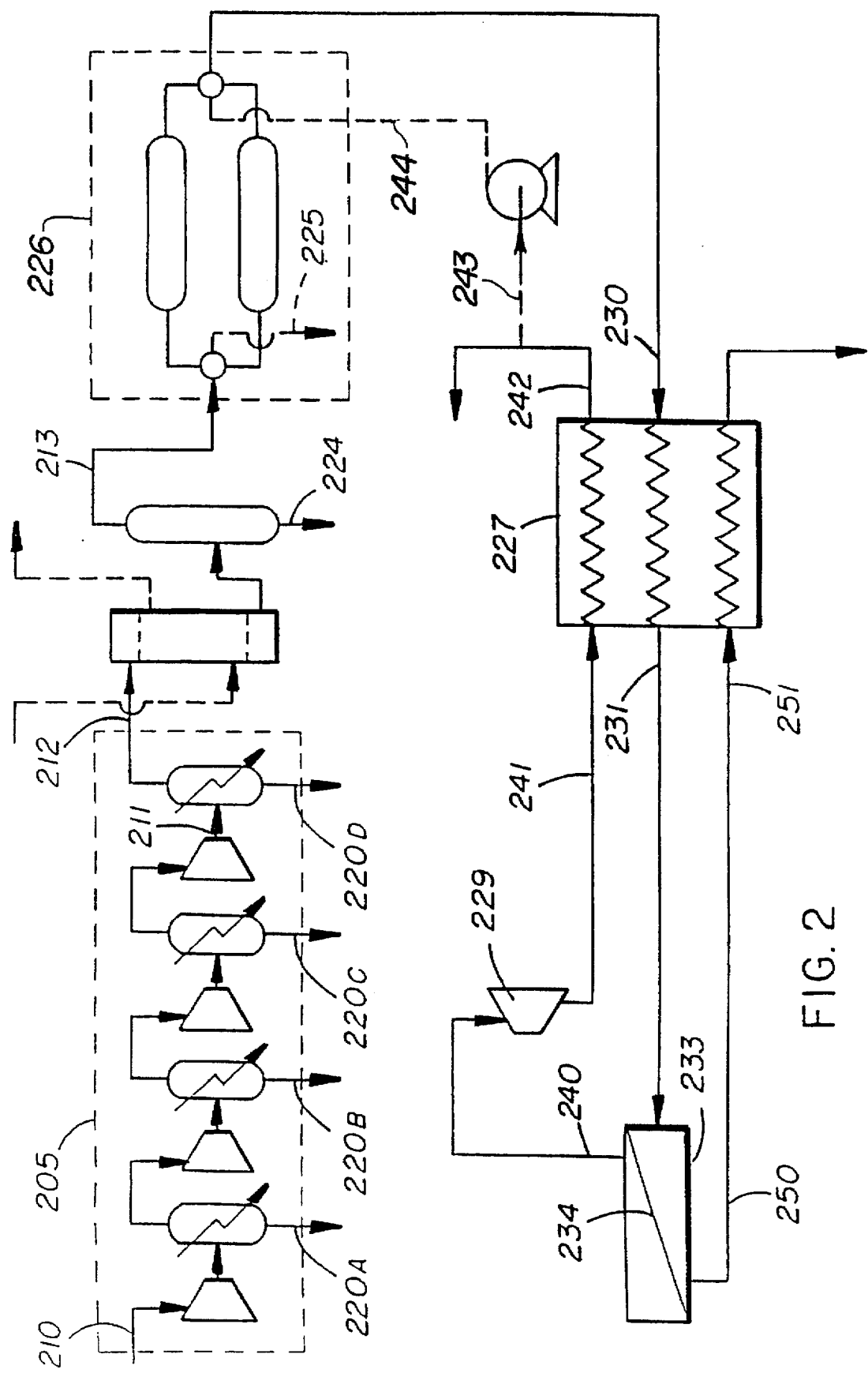
FIG. 2 illustrates in schematic form an apparatus useful for achieving the method of the subject invention which employs an expander on the permeate stream.

Example 2 is also a process to produce an enriched nitrogen product stream from air. The nitrogen stream specifications are the same as for Example 1. A simplified flowsheet for this process is shown in FIG. 2. A summary of the major process streams is given in Table 2A, and a summary description last of the major process equipment is given in Table 2B. Definitions of the abbreviations used are given in Table 2C.

This process is similar to that described in Example 1; however, the expander 229 is on the low pressure oxygen-enriched permeate product stream 240 leaving the membrane device 233, rather than on the high pressure nitrogen-enriched non-permeate product stream 250. The small heat exchanger between the main heat exchanger 227 and the membrane device 233 has also been eliminated. Because of these changes, the pressure difference across the membrane 234 will be smaller, so more parallel membrane modules will be required. Some of the dry low pressure oxygen product 243 may be compressed and heated and then used to regenerate the inactive bed of adsorptive air drier 226 via conduits 243 and 244. The expander 229 would have to be larger to accommodate a lower pressure product stream. The size of other process equipment may also change to accommodate different stream conditions. Consequently, capital costs for this process will be higher than those for Example 1. The recovery of the process will be lower, so more air must be fed to the membrane device 233 to produce the same amount of nitrogen. However, the total pressure of air leaving the compressor 205 is lower, so power costs for this process are slightly lower than for Example 1.

This process demonstrates the same characteristics as Example 1. It also demonstrates flexibility in selecting the location of process equipment and the arrangement of process streams. This Example also demonstrates how the relocation of a piece of process equipment can affect the size and power requirements of other process equipment, and thus the economics of the process.

TABLE 2A

STREAM SUMMARY FOR LOW-TEMPERATURE NITROGEN PROCESS
WITH AN EXPANDER ON THE PERMEATE PRODUCT STREAM

| Stream ID | | 210 | 211 | 212 | 213 | 220A | 220B |
|---|---|---|---|---|---|---|---|
| From: | | — | COMPRESS | AFT-COOL | CHILLER | COMPRESS | COMPRESS |
| To: | | COMPRESS | AFT-COOL | CHILLER | DRYER | — | — |
| Temperature | K | 293.15 | 388.1425 | 313.15 | 277.5944 | n.a. | n.a. |
| | C | 20 | 114.9925 | 40 | 4.4444 | n.a. | n.a. |
| Pressure | Pa | 101330 | 1114400 | 1100600 | 1086800 | n.a. | n.a. |
| | psia | 14.6959 | 161.6293 | 159.6293 | 157.6293 | n.a. | n.a. |
| Vapor Fraction | | 1 | 1 | 1 | 1 | n.a. | n.a. |
| Total Flow: | | | | | | | |
| | kg mol/s | 0.026304 | 0.026304 | 0.02614 | 0.025977 | 0 | 0 |
| | kg/s | 0.7581 | 0.7581 | 0.7551 | 0.7522 | 0 | 0 |
| | lb mol/hr | 208.7633 | 208.7633 | 207.4626 | 206.1688 | 0 | 0 |
| | lb/hr | 6016.599 | 6016.599 | 5993.166 | 5969.859 | 0 | 0 |
| | cu m/s | 0.6327 | 0.076547 | 0.061962 | 0.055111 | 0 | 0 |
| Mole Fraction | | | | | | | |
| $H_2O$ | | 0.013223 | 0.013223 | 0.007036 | 0.000805 | 0 | 0 |
| $N_2$ | | 0.7705 | 0.7705 | 0.7754 | 0.7802 | 0 | 0 |
| AR | | 0.009217 | 0.009217 | 0.009274 | 0.009333 | 0 | 0 |
| $O_2$ | | 0.2067 | 0.2067 | 0.208 | 0.2093 | 0 | 0 |
| $CO_2$ | | 0.000326 | 0.000326 | 0.000328 | 0.00033 | 0 | 0 |
| Stream ID | | 220C | 220D | 224 | 225 | 230 | 231 |
| From: | | COMPRESS | AFT-COOL | CHILLER | DRYER | DRYER | HTEX |
| To: | | — | — | — | — | HTEX | MEMBRANE |
| Temperature | K | n.a. | 313.15 | 277.5944 | 277.4263 | 277.4263 | 213.15 |
| | C | n.a. | 40 | 4.4444 | 4.2763 | 4.2763 | −60 |
| Pressure | Pa | n.a. | 1100600 | 1086800 | 1017900 | 1017900 | 997180 |
| | psia | n.a. | 159.6293 | 157.6293 | 147.6293 | 147.6293 | 144.6293 |
| Vapor Fraction | | n.a. | 0 | 0 | 0.9627 | 1 | 1 |
| Total Flow: | | | | | | | |
| | kg mol/s | 0 | 0.00016389 | 0.00016301 | 0.00054843 | 0.025428 | 0.025428 |
| | kg/s | 0 | 0.0029525 | 0.0029366 | 0.015782 | 0.7364 | 0.7364 |
| | lb mol/hr | 0 | 1.3007 | 1.2937 | 4.3527 | 201.8162 | 201.8162 |
| | lb/hr | 0 | 23.433 | 23.3067 | 125.2599 | 5844.599 | 5844.599 |
| | cu m/s | 0 | 3.9526E-06 | 3.8358E-06 | 0.0011951 | 0.057572 | 0.044533 |
| Mole Fraction | | | | | | | |
| $H_2O$ | | 0 | 1 | 1 | 0.038138 | 0 | 0 |
| $N_2$ | | 0 | 6.0218E-07 | 1.3857E-07 | 0.7391 | 0.7811 | 0.7811 |
| AR | | 0 | 2.0622E-07 | 8.2095E-08 | 0.0088408 | 0.009343 | 0.009343 |
| $O_2$ | | 0 | 3.9795E-06 | 1.7196E-06 | 0.1983 | 0.2095 | 0.2095 |
| $CO_2$ | | 0 | 2.8392E-07 | 2.4828E-07 | 0.015618 | 0 | 0 |
| Stream ID | | 240 | 241 | 242 | 243 | 250 | 251 |
| From: | | MEMBRANE | HLEAK | EXPAND | HTEX | MEMBRANE | HTEX |
| To: | | HLEAK | EXPAND | HTEX | — | HTEX | — |
| Temperature | K | 213.15 | 213.8093 | 209.4807 | 274.421 | 209.2418 | 274.421 |
| | C | −60 | −59.3407 | −63.6693 | 1.271 | −63.9082 | 1.271 |
| Pressure | Pa | 131590 | 131590 | 120660 | 99974 | 982500 | 961820 |
| | psia | 19.0848 | 19.0848 | 17.5 | 14.5 | 142.5001 | 139.5001 |
| Vapor Fraction | | 1 | 1 | 1 | 1 | 1 | 1 |
| Total Flow: | | | | | | | |
| | kg mol/s | 0.012326 | 0.012326 | 0.012326 | 0.012326 | 0.013102 | 0.013102 |
| | kg/s | 0.3687 | 0.3687 | 0.3687 | 0.3687 | 0.3677 | 0.3677 |
| | lb mol/hr | 97.8266 | 97.8266 | 97.8266 | 97.8266 | 103.9895 | 103.9895 |
| | lb/hr | 2926.61 | 2926.61 | 2926.61 | 2926.61 | 2917.986 | 2917.986 |
| | cu m/s | 0.1656 | 0.1662 | 0.1775 | 0.2812 | 0.022882 | 0.031083 |

TABLE 2A-continued

STREAM SUMMARY FOR LOW-TEMPERATURE NITROGEN PROCESS
WITH AN EXPANDER ON THE PERMEATE PRODUCT STREAM

Mole Fraction

| | | | | | | |
|---|---|---|---|---|---|---|
| H2O | 0 | 0 | 0 | 0 | 0 | 0 |
| N2 | 0.5597 | 0.5597 | 0.5597 | 0.5597 | 0.9894 | 0.9894 |
| AR | 0.018644 | 0.018644 | 0.018644 | 0.018644 | 0.000594 | 0.000594 |
| O2 | 0.4216 | 0.4216 | 0.4216 | 0.4216 | 0.009997 | 0.009997 |
| CO2 | 0 | 0 | 0 | 0 | 0 | 0 |

TABLE 2B

Low-Temperature Nitrogen Process with
Expander on Permeate Stream: Major Equipment Summary

MAIN AIR COMPRESSOR

4-Stage compressor with intercoolers and aftercooler.
Capacity: 0.76 kg/s air at 1100600 Pa discharge
pressure.
Minimum stage efficiency: 80 percent isentropic.
Motor capacity: 237 kW brake power.
Cooler capacity: maximum 40° C. outlet at 20° C. ambient
temperature.

MEMBRANE MODULES

| | |
|---|---|
| 18.5 Parallel modules containing | $1.4 \times 10^6$ PBO A fibers. |
| Fiber ID (m): | $9.5 \times 10^{-5}$ |
| Fiber OD (m): | $1.35 \times 10^{-4}$ |
| Fiber Dense Region Thickness (m): | $7.4 \times 10^{-8}$ |
| Fiber Active Length (m): | 1.5748 |
| Tdbesheet Length (m): | 0.2032 |

HEAT EXCHANGER

Brazed aluminum plate-and-fin heat exchanger with
extended-surface area fins. Three sets of passages in
counter-current arrangement.

| | |
|---|---|
| Capacity, stream 1: | 0.74 kg/s at 1087000 Pa from 4.4° C. to −60° C. |
| stream 2: | 0.37 kg/s at 982500 Pa from −64° C. to 1.4° C. |
| stream 3: | 0.37 kg/s at 120700 Pa from −64° C. to 1.4° C. |

Duty: 49.1 kW, maximum 3.0° C. warm-end temperature
difference.
Maximum pressure drop: 20700 Pa each stream.

EXPANDER

Brake-loaded turbo-expander for extraction of 1.53 kW
work.
Capacity: 0.37 kg/sec, 42 percent oxygen at 131600 Pa,
−60° C.
Pressure reduction to 120700 Pa.
Minimum efficiency: 80 percent isentropic.

CHILLER/DRYER

Heat exchanger with external freon refrigeration system
and water-separation vessel.
Capacity: 0.76 kg/s at 110060 Pa from 40° C. to 4.4° C.
Expected refrigeration duty: 35 kW.
Maximum overall pressure drop: 13800 Pa.

AIR DRYER

Twin-vessel molecular-sieve adsorptive air dryer with
regeneration blower and heater.
Capacity: 0.75 kg/s saturated air at 109000 Pa, 4.4° C.
Dewpoint requirement: −70° C. at pressure.
Maximum pressure drop: 69000 Pa.

TABLE 2C

Equipment List Key For TABLE 2A

| | |
|---|---|
| COMPRESS | Main Air Compressor |
| AFT-COOL | Compressor Aftercooler |
| CHILLER | Refrigerated Air Chiller |
| DRYER | Mol-sieve Adsorptive Air Dryer |
| HTEX | Main Heat Exchanger |
| MEMBRANE | Parallel Membrane Modules |
| HLEAK | Heat Leak Simulation |
| EXPAND | Expander |

EXAMPLE 3

Nitrogen Process With An External Refrigeration System.

Figure 3:
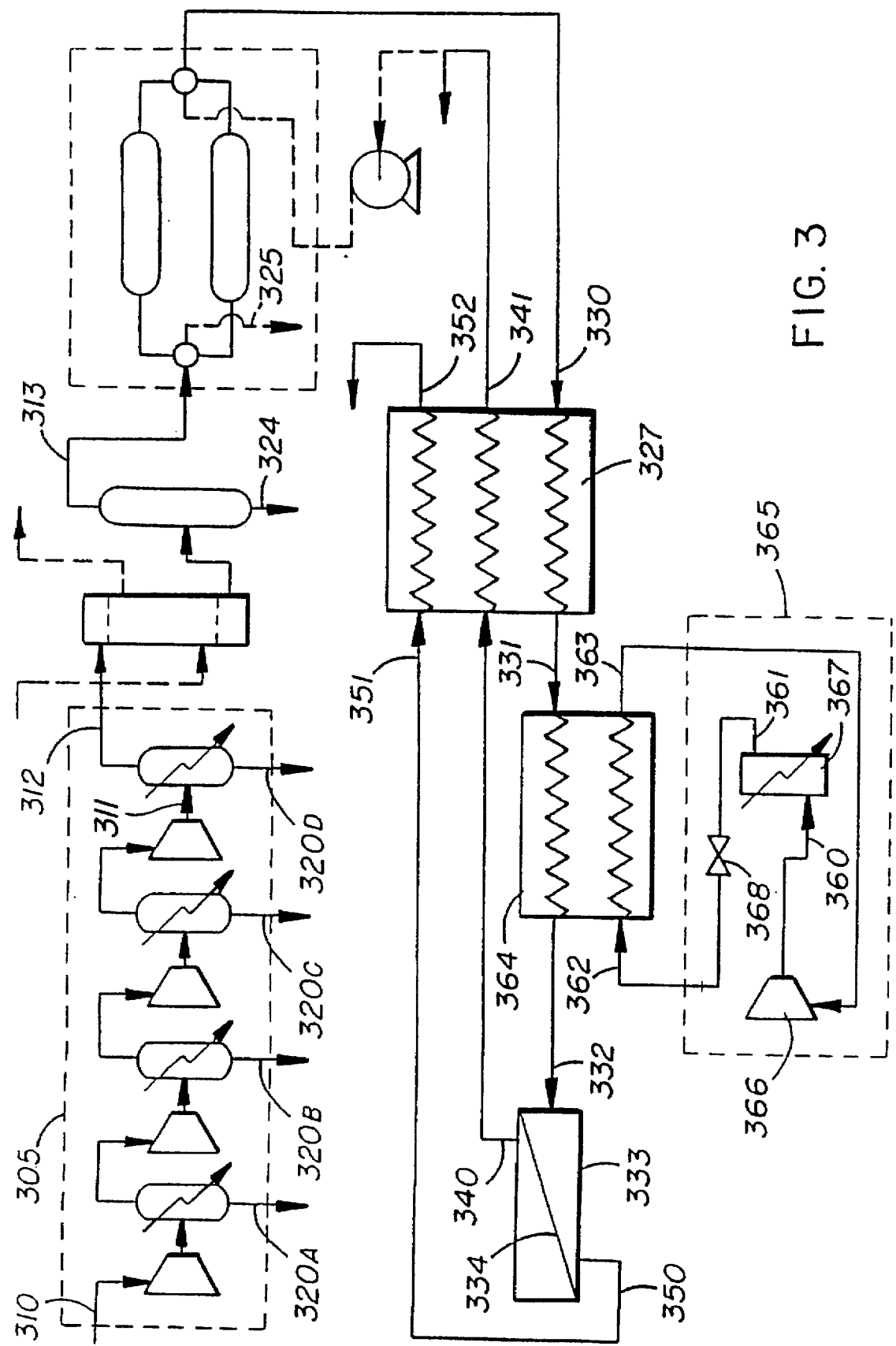
FIG. 3 illustrates in schematic form an apparatus useful for achieving the method of the subject invention which employs an external Freon refrigeration system for cooling the feed gas mixture.

Example 3 is also a process to produce an enriched nitrogen product stream from air. The nitrogen stream specifications are the same as for Example 1. A simplified flowsheet for this process is shown in FIG. 3. A summary of the major process streams is given in Table 3A and a summary description list of the major process equipment is given in Table 3B. Definitions of abbreviations used are given in Table 3C.

This process is similar to that described in Example 1. Feed gas 310 passes through the components of condenser 305 as stream 311. However, the expander is removed, and the small heat exchanger between the main heat exchanger 327 and the membrane device 333 is replaced with an evaporative condenser 364, where the incoming air 331 is cooled in one set or passages against an incoming boiling refrigerant in conduit 362 in the other set or passages. Cold liquid refrigerant is supplied by an external refrigeration system 365, which is demonstrated here by a simple single-stage arrangement. In this arrangement, the refrigerant in conduit 363 is compressed by compressor 366 to a high pressure in conduit 360, then condensed in a heat exchanger 367 and exchanged with ambient air. The condensed refrigerant in conduit 361 is expanded to low pressure through throttling valve 368. The partially vaporized refrigerant is conveyed through conduit 362 into evaporator 364, where it is exchanged with feed gas in conduit 331. The vapor refrigerant in conduit 363 leaving the evaporator 364 is returned to the refrigerant compressor 366.

Because of these changes, the pressure difference across the membrane 334 will be smaller than Example 1, so more parallel membrane modules will be required, but not as many as in Example 2. Because of changes in the process recovery and air compressor pressure, the main air compressor 305 power costs for this process are lower than for Examples 1 and 2. However, there will be additional power costs for the refrigeration compressor 366.

This process demonstrates most of the same characteristics as Example 1. It also demonstrates how the expander may be replaced with an external refrigeration system to maintain the process equipment at the desired temperature. External refrigeration systems are well known, and many options are available. For example, the simple single-stage refrigeration system shown could be replaced with a multiple-stage system. Such variations in external refrigeration systems are within the scope of Example 3.

Table 3D summaries the simulated data generated by Examples 1–3, as described in Tables 1A to 3C. Published literature performance data on pressure-swing adsorption (PSA) typically reports power/100 SCF of 99 percent nitrogen product (discharge pressure of 120 psig (827 kPa)) of between 0.75 and 1.2 kWh/100 SCF of product, depending upon system size. The data reported in Table 3D indicates a clear performance improvement over current PSA technology in terms of power requirements.

TABLE 3A

STREAM SUMMARY FOR LOW-TEMPERATURE NITROGEN PROCESS
WITH AN EXTERNAL REFRIGERATION SYSTEM

| Stream ID | 310 | 311 | 312 | 313 | 320A | 320B |
|---|---|---|---|---|---|---|
| From: | — | COMPRESS | AFT-COOL | CHILLER | COMPRESS | COMPRESS |
| To: | COMPRESS | AFT-COOL | CHILLER | SEPARAT | — | — |
| Temperature | | | | | | |
| K. | 293.15 | 393.2726 | 313.15 | 277.5944 | n.a. | n.a. |
| C. | 20 | 120.1226 | 40 | 4.4444 | n.a. | n.a. |
| Pressure | | | | | | |
| Pa | 101330 | 1128900 | 1115100 | 1101300 | n.a. | n.a. |
| psia | 14.6959 | 163.734 | 161.734 | 159.734 | n.a. | n.a. |
| Vapor Fraction | 1 | 1 | 1 | 1 | n.a. | n.a. |
| Total Flow: | | | | | | |
| kgmol/s | 0.025871 | 0.025871 | 0.025708 | 0.025549 | 0 | 0 |
| kg/s | 0.7456 | 0.7456 | 0.7427 | 0.7398 | 0 | 0 |
| lbmol/hr | 205.33 | 205.33 | 204.0331 | 202.7763 | 0 | 0 |
| lb/hr | 5917.651 | 5917.651 | 5894.286 | 5871.645 | 0 | 0 |
| cu m/s | 0.6223 | 0.075316 | 0.060147 | 0.053489 | 0 | 0 |
| Mole Fraction | | | | | | |
| H2O | 0.013223 | 0.013223 | 0.00695 | 0.000796 | 0 | 0 |
| N2 | 0.7705 | 0.7705 | 0.7754 | 0.7802 | 0 | 0 |
| AR | 0.009217 | 0.009217 | 0.009275 | 0.009333 | 0 | 0 |
| O2 | 0.2067 | 0.2067 | 0.208 | 0.2093 | 0 | 0 |
| CO2 | 0.000326 | 0.000326 | 0.000328 | 0.00033 | 0 | 0 |
| CCLF3 | 0 | 0 | 0 | 0 | 0 | 0 |

| Stream ID | 320C | 320D | 324 | 325 | 330 |
|---|---|---|---|---|---|
| From: | COMPRESS | AFT-COOL | CHILLER | SEPARAT | SEPARAT |
| To: | — | — | — | — | HTEX |
| Temperature | | | | | |
| K. | n.a. | 313.15 | 277.5944 | 277.4264 | 277.4264 |
| C. | n.a. | 40 | 4.4444 | 4.2764 | 4.2764 |
| Pressure | | | | | |
| Pa | n.a. | 1115100 | 1101300 | 1032400 | 1032400 |
| psia | n.a. | 161.734 | 159.734 | 149.734 | 149.734 |
| Vapor Fraction | n.a. | 0 | 0 | 0.9631 | 1 |
| Total Flow: | | | | | |
| kgmol/s | 0 | 0.00016341 | 0.00015835 | 0.00053916 | 0.02501 |
| kg/s | 0 | 0.0029439 | 0.0028528 | 0.015518 | 0.7243 |
| lbmol/hr | 0 | 1.2969 | 1.2568 | 4.2791 | 198.4971 |
| lb/hr | 0 | 23.3649 | 22.6415 | 123.1647 | 5748.48 |
| cu m/s | 0 | 3.9411E-06 | 3.7263E-06 | 0.0011589 | 0.055829 |
| Mole Fraction | | | | | |
| H2O | 0 | 1 | 1 | 0.037698 | 0 |
| N2 | 0 | 6.1007E-07 | 1.4039E-07 | 0.7395 | 0.7811 |
| AR | 0 | 2.0891E-07 | 8.3169E-08 | 0.0088449 | 0.009343 |
| O2 | 0 | 4.0315E-06 | 1.7421E-06 | 0.1984 | 0.2095 |
| CO2 | 0 | 2.8754E-07 | 2.5142E-07 | 0.015625 | 0 |
| CCLF3 | 0 | 0 | 0 | 0 | 0 |

| Stream ID | 331 | 332 | 340 | 341 | 350 | 351 |
|---|---|---|---|---|---|---|
| From: | HTEX | EVAP | MEMBRANE | HTEX | MEMBRANE | HLEAK |
| To: | EVAP | MEMBRANE | HTEX | — | HLEAK | HTEX |

TABLE 3A-continued

STREAM SUMMARY FOR LOW-TEMPERATURE NITROGEN PROCESS WITH AN EXTERNAL REFRIGERATION SYSTEM

| Temperature | | | | | | |
|---|---|---|---|---|---|---|
| K. | 215.1872 | 213.15 | 213.15 | 274.4161 | 209.3062 | 209.8941 |
| C. | −57.9628 | −60 | −60 | 1.2661 | −63.8438 | −63.2559 |
| Pressure | | | | | | |
| Pa | 1011700 | 997910 | 120660 | 99978 | 982480 | 982480 |
| psia | 146.734 | 144.734 | 17.5006 | 14.5006 | 142.4962 | 142.4962 |
| Vapor Fraction | 1 | 1 | 1 | 1 | 1 | 1 |
| Total Flow: | | | | | | |
| kgmol/s | 0.02501 | 0.02501 | 0.01192 | 0.01192 | 0.01309 | 0.01309 |
| kg/s | 0.7243 | 0.7243 | 0.357 | 0.357 | 0.3673 | 0.3673 |
| lbmol/hr | 198.4971 | 198.4971 | 94.606 | 94.606 | 103.891 | 103.891 |
| lb/hr | 5748.48 | 5748.48 | 2833.266 | 2833.266 | 2915.212 | 2915.212 |
| cu m/s | 0.043608 | 0.043768 | 0.1747 | 0.2719 | 0.022868 | 0.022937 |
| Mole Fraction | | | | | | |
| H2O | 0 | 0 | 0 | 0 | 0 | 0 |
| N2 | 0.7811 | 0.7811 | 0.5524 | 0.5524 | 0.9894 | 0.9894 |
| AR | 0.009343 | 0.009343 | 0.018951 | 0.018951 | 0.000594 | 0.000594 |
| O2 | 0.2095 | 0.2095 | 0.4287 | 0.4287 | 0.009968 | 0.009968 |
| CO2 | 0 | 0 | 0 | 0 | 0 | 0 |
| CCLF3 | 0 | 0 | 0 | 0 | 0 | 0 |

| Stream ID | 352 | 360 | 361 | 362 | 363 |
|---|---|---|---|---|---|
| From: | HTEX | RCOMPR | RCNDNS | RJT | EVAP |
| To: | — | RCNDNS | RJT | EVAP | RCOMPR |
| Temperature | | | | | |
| K. | 274.4161 | 369.9813 | 299.8111 | 207.1504 | 210.1494 |
| C. | 1.2661 | 96.8313 | 26.6611 | −65.9996 | −63.0006 |
| Pressure | | | | | |
| Pa | 961790 | 3744400 | 3730600 | 216220 | 202430 |
| psia | 139.4962 | 543.0833 | 541.0833 | 31.3603 | 29.3603 |
| Vapor Fraction | 1 | 1 | 0 | 0.8315 | 1 |
| Total Flow: | | | | | |
| kgmol/s | 0.01309 | 0.00055533 | 0.00055533 | 0.00055533 | 0.00055533 |
| kg/s | 0.3673 | 0.05801 | 0.05801 | 0.05801 | 0.05801 |
| lbmol/hr | 103.891 | 4.4075 | 4.4075 | 4.4075 | 4.4075 |
| lb/hr | 2915.212 | 460.404 | 460.404 | 460.404 | 460.404 |
| cu m/s | 0.031054 | 0.00038473 | 0.0000928 | 0.0034642 | 0.0045358 |
| Mole Fraction | | | | | |
| H2O | 0 | 0 | 0 | 0 | 0 |
| N2 | 0.9894 | 0 | 0 | 0 | 0 |
| AR | 0.000594 | 0 | 0 | 0 | 0 |
| O2 | 0.009968 | 0 | 0 | 0 | 0 |
| CO2 | 0 | 0 | 0 | 0 | 0 |
| CCLF3 | 0 | 1 | 1 | 1 | 1 |

TABLE 3B

Low-Temerature Nitrogen Process with External Refrigeration: Major Equipment Summary

MAIN AIR COMPRESSOR

4-Stage compressor with intercoolers and aftercooler.
Capacity: 0.75 kg/s air at 1115000 Pa discharge pressure.
Minimum stage efficiency: 80 percent isentropic.
Motor capacity: 236 kW brake power.
Cooler capacity: maximum 40° C. outlet at 20° C. ambient temperature.

MEMBRANE MODULES

17.4 parallel modules containing $1.4 \times 10^6$ PBO A fibers.
Fiber ID (m): $9.5 \times 10^{-5}$
Fiber OD (m): $1.35 \times 10^{-4}$
Fiber Dense Region Thickness (m): $7.4 \times 10^{-8}$
Fiber Active Length (m): 1.5748
Tubesheet Length (m): 0.2032

MAIN HEAT EXCHANGER

Brazed aluminum plate-and-fin heat exchanger with extended-surface-area fins. Three sets of passages in counter-current arrangement.

Capacity, stream 1: 0.73 kg/s at 1032000 Pa from 4.4° C. to −58° C.
stream 2: 0.37 kg/s at 982500 Pa from −64° C.

TABLE 3B-continued

Low-Temperature Nitrogen Process with External Refrigeration: Major Equipment Summary to 1.4° C.
stream 3: 0.36 kg/s at 120700 Pa from −60° C. to 1.4° C.
Duty: 46.7 kW, maximum 3.0° C. warm-end temperature difference.
Maximum pressure drop: 20700 Pa each stream.
CHILLER/DRYER

Heat exchanger with external freon refrigeration system and water-separation vessel.
capacity: 0.74 kg/s at 1115000 Pa from 40° C. to 4.4° C.
Expected refrigeration duty: 34 kW.
Maximum overall pressure drop: 13800 Pa.
AIR DRYER

Twin-vessel molecular-sieve adsorptive air dryer with regeneration blower and heater.
Capacity: 0.74 kg/s saturated air at 1101000 Pa, 4.4° C.
Dewpoint requirement: −70° C. at pressure.
Maximum pressure drop: 69000 Pa.
EXTERNAL REFRIGERATOR COMPRESSOR

Reciprocating Freon-13 compressor with capacity to compress 0.058 kg/s from 202430 Pa to 3745000 Pa discharge pressure.
Motor capacity: 4.8 kw brake power.
EXTERNAL REFRIGERATOR CONDENSER

Heat Exchanger with capacity to condense 0.058 kg/s Freon-13 vapor at 3745000 Pa, 97° C. to liquid at 27° C. against 20° C. ambient air.
Expected duty: 6.28 kW.
EXTERNAL REFRIGERATOR EVAPORATOR

Evaporative heat exchanger with capacity to cool 0.73 kg/s air at
12000 Pa from −58° C. to −60° C. against −66° C. boiling Freon-13.
Expected duty: 1.5 kW.

TABLE 3C

Equipment List Key For Table 3A

| | |
|---|---|
| COMPRESS | Main Air Compressor |
| AFT-COOL | Compressor Aftercooler |
| CHILLER | Refrigerated Air Chiller |
| SEPARAT | Mol-sieve Adsorptive Air Dryer |
| HTEX | Main Heat Exchanger |
| EVAP | External Refrigerator Evaporator |
| MEMBRANE | Parallel Membrane Modules |
| HLEAK | Heat Leak Simulation |
| RCOMPR | External Refrigerator Compressor |
| RCNDNS | External Refrigerator Condensor |
| RJT | External Refrigerator Expansion Valve |

TABLE 3D

SUMMARY OF NITROGEN MEMBRANE PROCESSES

| | Example 1 | Example 2 | Example 3 |
|---|---|---|---|
| Number of Modules Required | 13.8 | 18.5 | 17.4 |
| Recovery (Percent of feed air) | 52.0 | 49.8 | 50.6 |
| Productivity (SCFH Product/ module) | 2930 | 2180 | 2320 |
| Power (kWh/100 SCF Product) | 0.595 | 0.582 | 0.597 |

EXAMPLE 4

Nitrogen Process With An External Refrigeration System And Dehydration Membranes For Air Drying.

Figure 4:
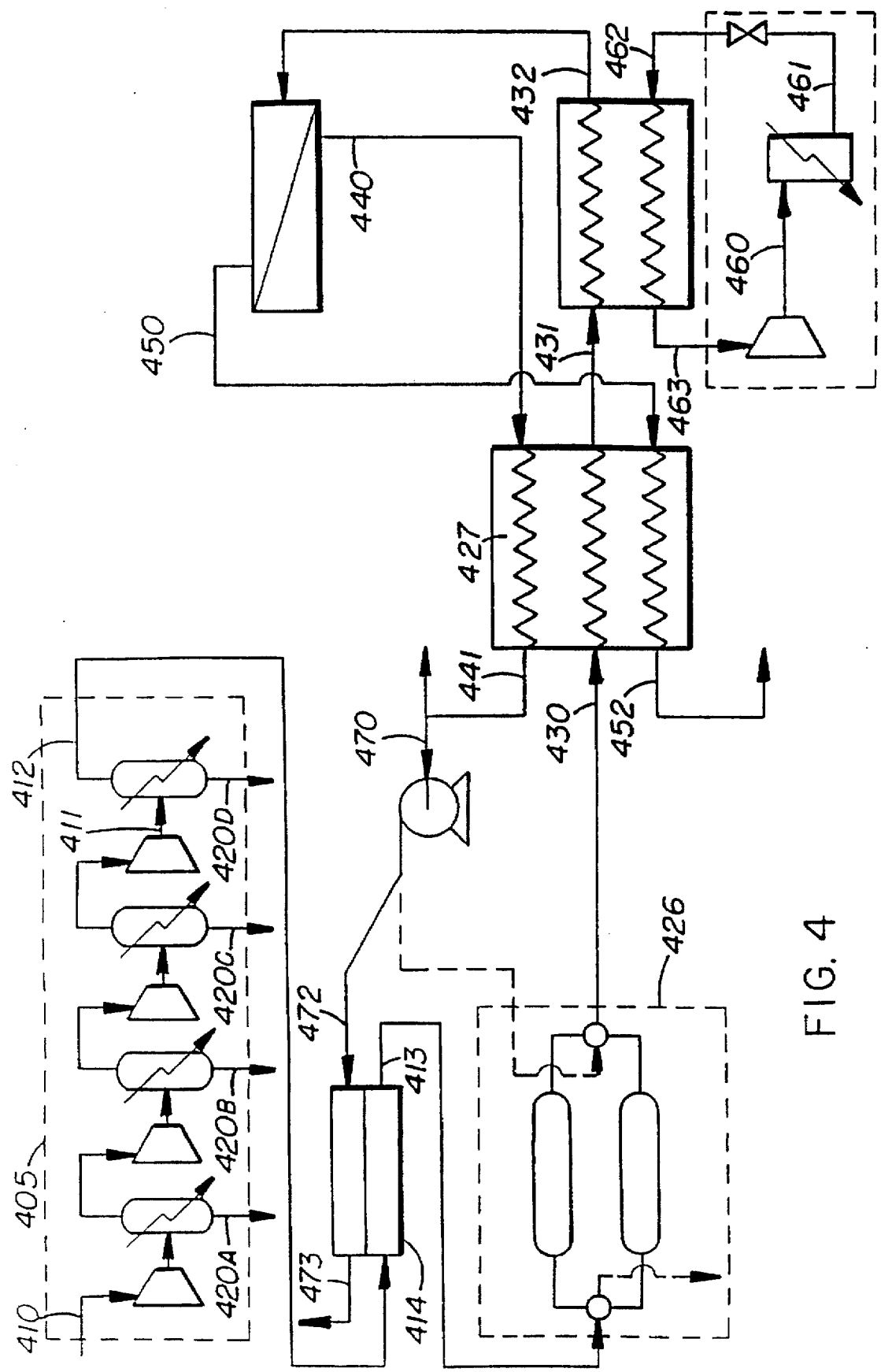
FIG. 4 illustrates in schematic form an apparatus useful for achieving the method of the subject invention which employs an external Freon refrigeration system for cooling and membranes for drying the feed gas mixture.

Example 4 is also a process to produce an enriched nitrogen product stream from air. The nitrogen stream specifications are the same as for Example 1. A simplified flowsheet for this process is shown in FIG. 4. A summary of the major process streams is given in Table 4A, and a summary description list of the major process equipment is given in Table 4B. Definitions of the abbreviations used are given in Table 4C.

This process is similar to that described in Example 3. However, the refrigerated air cooler and separation vessel between the air compressor 405 and the adsorptive air dryer 426 have been replaced with a set of parallel membrane devices 414 that preferentially permeate water, while permeating essentially no other air components. A larger portion of the dry oxygen enriched permeate stream 472 would have to be compressed slightly to act as a sweep gas in the low pressure passages of the dehydration membrane devices 414. Because this device is expected to dry the air to a dewpoint well below 0° C., the adsorptive air dryer 426 would be considerably smaller. However, since the air is no longer cooled at this point, the main heat exchanger 427 would have to be somewhat larger. The rest of the process equipment in this Example will be similar to the process equipment in Example 3.

This Example demonstrates the variety of choices available for removing contaminants from the feed gas stream to the process. It also demonstrates how membrane devices may be operated in series and at different temperatures in a low temperature membrane process.

TABLE 4A

STREAM SUMMARY FOR LOW-TEMPERATURE NITROGEN PROCESS WITH AN EXTERNAL REFRIGERATION SYSTEM AND DEHYDRATION MEMBRANES FOR AIR DRYING

| Stream ID | 410 | 411 | 412 | 413 | 420A | 420B |
|---|---|---|---|---|---|---|
| From: | — | COMPRESS | AFT-COOL | DEHYDRAT | COMPRESS | COMPRESS |
| To: | COMPRESS | AFT-COOL | DEHYDRAT | DRYER | — | — |
| Temperature | | | | | | |
| K. | 293.15 | 387.6752 | 313.15 | 313.15 | n.a. | n.a. |
| C. | 20 | 114.5252 | 40 | 40 | n.a. | n.a. |
| Pressure | | | | | | |
| Pa | 101330 | 1083200 | 1069400 | 1060000 | n.a. | n.a. |
| psia | 14.6959 | 157.1054 | 155.1054 | 153.7443 | n.a. | n.a. |
| Vapor Fraction | 1 | 1 | 1 | 1 | n.a. | n.a. |
| Total Flow: | | | | | | |
| kgmol/s | 0.02561 | 0.02561 | 0.025455 | 0.025274 | 0 | 0 |
| kg/s | 0.7381 | 0.7381 | 0.7353 | 0.732 | 0 | 0 |
| lbmol/hr | 203.2545 | 203.2545 | 202.0272 | 200.5927 | 0 | 0 |
| lb/hr | 5857.835 | 5857.835 | 5835.724 | 5809.881 | 0 | 0 |
| cu m/s | 0.616 | 0.07657 | 0.062094 | 0.062222 | 0 | 0 |
| Mole Fraction | | | | | | |
| $H_2O$ | 0.013223 | 0.013223 | 0.007228 | 0.000129 | 0 | 0 |
| $N_2$ | 0.7705 | 0.7705 | 0.7752 | 0.7808 | 0 | 0 |
| AR | 0.009217 | 0.009217 | 0.009273 | 0.009339 | 0 | 0 |
| $O_2$ | 0.2067 | 0.2067 | 0.2079 | 0.2094 | 0 | 0 |
| $CO_2$ | 0.000326 | 0.000326 | 0.000328 | 0.00033 | 0 | 0 |
| $CCLF_3$ | 0 | 0 | 0 | 0 | 0 | 0 |

| Stream ID | 420C | 420D | 424 | 430 | 431 |
|---|---|---|---|---|---|
| From: | COMPRESS | AFT-COOL | DRYER | DRYER | HTEX |
| To: | — | — | — | HTEX | EVAP |
| Temperature | | | | | |
| K. | n.a. | 313.15 | 313.1027 | 313.1027 | 215.54 |
| C. | n.a. | 40 | 39.9527 | 39.9527 | −57.61 |
| Pressure | | | | | |
| Pa | n.a. | 1069400 | 1032500 | 1032500 | 1011800 |
| psia | n.a. | 155.1054 | 149.7443 | 149.7443 | 146.7443 |
| Vapor Fraction | n.a. | 0 | 0.9948 | 1 | 1 |
| Total Flow: | | | | | |
| kgmol/s | 0 | 0.00015464 | 0.000256 | 0.025018 | 0.025018 |
| kg/s | 0 | 0.0027859 | 0.007378 | 0.7247 | 0.7247 |
| lbmol/hr | 0 | 1.2273 | 2.0313 | 198.5614 | 198.5614 |
| lb/hr | 0 | 22.1107 | 58.5551 | 5751.326 | 5751.326 |
| cu m/s | 0 | 3.7295E-06 | 0.000643 | 0.063224 | 0.043695 |
| Mole Fraction | | | | | |
| $H_2O$ | 0 | 1 | 0.012597 | 0.000001 | 0.000001 |
| $N_2$ | 0 | 5.852E-07 | 0.771 | 0.7809 | 0.7809 |
| AR | 0 | 2.0042E-07 | 0.009222 | 0.00934 | 0.00934 |
| $O_2$ | 0 | 3.8676E-06 | 0.2068 | 0.2095 | 0.2095 |
| $CO_2$ | 0 | 2.7613E-07 | 0.000326 | 0.00033 | 0.00033 |
| $CCLF_3$ | 0 | 0 | 0 | 0 | 0 |

| Stream ID | 432 | 440 | 441 | 442 | 450 | 451 |
|---|---|---|---|---|---|---|
| From: | EVAP | MEMBRANE | HTEX | SPLITTER | MEMBRANE | HLEAK |
| To: | MEMBRANE | HTEX | SPLITTER | — | HLEAK | HTEX |
| Temperature | | | | | | |
| K. | 213.15 | 213.15 | 310.0941 | 310.0941 | 209.2969 | 209.8847 |
| C. | −60 | −60 | 36.9441 | 36.9441 | −63.8531 | −63.2653 |
| Pressure | | | | | | |
| Pa | 997980 | 120660 | 99978 | 99978 | 982550 | 982550 |
| psia | 144.7443 | 17.5006 | 14.5006 | 14.5006 | 142.5066 | 142.5066 |
| Vapor Fraction | 1 | 1 | 1 | 1 | 1 | 1 |
| Total Flow: | | | | | | |
| kgmol/s | 0.025018 | 0.011928 | 0.011928 | 0.008599 | 0.01309 | 0.01309 |
| kg/s | 0.7247 | 0.3573 | 0.3573 | 0.2576 | 0.3673 | 0.3673 |
| lbmol/hr | 198.5614 | 94.6683 | 94.6683 | 68.2452 | 103.8945 | 103.8945 |

TABLE 4A-continued

STREAM SUMMARY FOR LOW-TEMPERATURE NITROGEN PROCESS WITH AN EXTERNAL
REFRIGERATION SYSTEM AND DEHYDRATION MEMBRANES FOR AIR DRYING

|  |  |  |  |  |  |  |
|---|---|---|---|---|---|---|
| lb/hr | 5751.326 | 2836.06 | 2836.06 | 2044.481 | 2915.31 | 2915.31 |
| cu m/s | 0.043778 | 0.1748 | 0.3076 | 0.2218 | 0.022866 | 0.022935 |
| Mole Fraction |  |  |  |  |  |  |
| H2O | 0.000001 | 2.1E-06 | 2.1E-06 | 2.1E-06 | −7.5772 | −7.5772 |
| N2 | 0.7809 | 0.552 | 0.552 | 0.552 | 0.9894 | 0.9894 |
| AR | 0.00934 | 0.018939 | 0.018939 | 0.018939 | 0.000594 | 0.000594 |
| O2 | 0.2095 | 0.4284 | 0.4284 | 0.4284 | 0.009969 | 0.009969 |
| CO2 | 0.00033 | 0.000692 | 0.000692 | 0.000692 | 1.25E-08 | 1.25E-08 |
| CCLF3 | 0 | 0 | 0 | 0 | 0 | 0 |

| Stream ID | 452 | 460 | 461 | 462 | 463 |
|---|---|---|---|---|---|
| From: | HTEX | RCOMPR | RCNDNS | RJT | EVAP |
| To: | — | RCNDNS | RJT | EVAP | RCOMPR |
| Temperature |  |  |  |  |  |
| K. | 310.0941 | 370.5196 | 299.8111 | 207.1504 | 210.6086 |
| C. | 36.9441 | 97.3696 | 26.6611 | −65.9996 | −62.5414 |
| Pressure |  |  |  |  |  |
| Pa | 961860 | 3744400 | 3730600 | 216220 | 202430 |
| psia | 139.5066 | 543.0833 | 541.0833 | 31.3603 | 29.3603 |
| Vapor Fraction | 1 | 1 | 0 | 0.8315 | 1 |
| Total Flow: |  |  |  |  |  |
| kgmol/s | 0.01309 | 0.00064842 | 0.00064842 | 0.00064842 | 0.00064842 |
| kg/s | 0.3673 | 0.067734 | 0.067734 | 0.067734 | 0.067734 |
| lbmol/hr | 103.8945 | 5.1463 | 5.1463 | 5.1463 | 5.1463 |
| lb/hr | 2915.31 | 537.5837 | 537.5837 | 537.5837 | 537.5837 |
| cu m/s | 0.03519 | 0.00045048 | 0.00010836 | 0.0040451 | 0.0053096 |
| Mole Fraction |  |  |  |  |  |
| H2O | −7.5772 | 0 | 0 | 0 | 0 |
| N2 | 0.9894 | 0 | 0 | 0 | 0 |
| AR | 0.000594 | 0 | 0 | 0 | 0 |
| O2 | 0.009969 | 0 | 0 | 0 | 0 |
| CO2 | 1.25E-08 | 0 | 0 | 0 | 0 |
| CCLF3 | 0 | 1 | 1 | 1 | 1 |

| Stream ID | 470 | 471 | 472 | 473 |
|---|---|---|---|---|
| From: | SPLITTER | BLOWER | BCOOLER | DEHYDRAT |
| To: | BLOWER | BCOOLER | DEHYDRAT | — |
| Temperature |  |  |  |  |
| K. | 310.0941 | 347.7666 | 313.15 | 313.15 |
| C. | 36.9441 | 74.6166 | 40 | 14.5051 |
| Pressure |  |  |  |  |
| Pa | 99978 | 137980 | 131090 | 40 |
| psia | 14.5006 | 20.0124 | 19.0124 | 100010 |
| Vapor Fraction | 1 | 1 | 1 | 1 |
| Total Flow: |  |  |  |  |
| kgmol/s | 0.003329 | 0.003329 | 0.003329 | 0.00351 |
| kg/s | 0.099737 | 0.099737 | 0.099737 | 0.103 |
| lbmol/hr | 26.4231 | 26.4231 | 26.4231 | 27.8576 |
| lb/hr | 791.5791 | 791.5791 | 791.5791 | 817.4218 |
| cu m/s | 0.08586 | 0.069793 | 0.066133 | 0.09136 |
| Mole Fraction |  |  |  |  |
| H2O | 2.1E-06 | 2.1E-06 | 2.1E-06 | 0.051496 |
| N2 | 0.552 | 0.552 | 0.552 | 0.5235 |
| AR | 0.018939 | 0.018939 | 0.018939 | 0.017963 |
| O2 | 0.4284 | 0.4284 | 0.4284 | 0.4063 |
| CO2 | 0.000692 | 0.000692 | 0.000692 | 0.0006565 |
| CCLF3 | 0 | 0 | 0 | 0 |

TABLE 4B

Low-Temperature Nitrogen Process with External Refrigeration and Dehydration Membrane Air Dryer: Major Equipment Summary

MAIN AIR COMPRESSOR

4-stage compressor with intercoolers and aftercooler.
Capacity: 0.74 kg/s air at 1070000 Pa discharge pressure.
Minimum stage efficiency: 80 percent isentropic.
Motor capacity: 228 kW brake power.
Cooler capacity: maximum 40° C. outlet at 20° C. ambient temperature.

MEMBRANE MODULES

17.4 Parallel modules containing $1.4 \times 10^6$ PBO A fibers.

| | |
|---|---|
| Fiber ID (m): | $9.5 \times 10^{-5}$ |
| Fiber OD (m): | $1.35 \times 10^{-4}$ |
| Fiber Dense Region Thickness (m): | $7.4 \times 10^{-8}$ |
| Fiber Active Length (m): | 1.5748 |
| Tubesheet Length (m): | 0.2032 |

MAIN HEAT EXCHANGER

Brazed aluminum plate-and-fin heat exchanger with extended-surface-area fins. Three sets of passages in counter-current arrangement.

| | |
|---|---|
| Capacity, stream 1: | 0.73 kg/s at 1032000 Pa from 40° C. to −58° C. |
| stream 2: | 0.37 kg/s at 982500 Pa from −63° C. to 37° C. |
| stream 3: | 0.36 kg/s at 120700 Pa from −60° C. to 37° C. |
| Duty: | 73. 1 kW, maximum 3.0° C. warm-end temperature difference. |

Maximum pressure drop: 20700 Pa each stream-.

DEHYDRATION MEMBRANES

10 spiral-wound modules containing 20 perfluoro sulfonic acid (PFSA) membrane leaves.

| | |
|---|---|
| Leaf length (m): | 0.5 |
| Leaf thickness (m): | $5.08 \times 10^{-5}$ |
| Leaf width (m): | 1.0 |

DEHYDRATION MEMBRANE BLOWER

Centrifugal blower with aftercooler. Motor capacity: 3.6 kW brake power.
Capacity: 0.1 kg/s 43 percent $O_2$ at 131000 Pa discharge pressure, 40° C.

AIR DRYER

Twin-vessel molecular-sieve adsorptive air dryer with Regeneration blower and heater.
Capacity: 0.73 kg/s air at 1101000 Pa, 40° C. with −17° C. dewpoint.
Dewpoint requirement: −70° C. at pressure.
Maximum pressure drop: 27600 Pa.

EXTERNAL REFRIGERATOR COMPRESSOR

Reciprocating Freon-13 compressor with capacity to compress 0.068 kg/s from 202430 Pa to 3745000 Pa. discharge pressure.
Motor capacity: 5.6 kW brake power.

EXTERNAL REFRIGERATOR CONDENSOR

Heat exchanger with capacity to condense 0.068 kg/s Freon-13 vapor at 3745000 Pa, 97° C. to liquid at 27° C. against 20° C. ambient air.
Expected duty: 7.4 kW.

EXTERNAL REFRIGERATOR EVAPORATOR

Evaporative heat exchanger with capacity to cool 0.73 kg/s air at 1012000 Pa from −58° C. to −60° C. against −66° C. boiling Freon-13.
Expected duty: 1.8 kW.

TABLE 4C

Equipment List Key For Table 4A

| | |
|---|---|
| COMPRESS | Main Air Compressor |
| AFT-COOL | Compressor Aftercooler |
| CHILLER | Refrigerated Air Chiller |
| DEHYDRAT | Dehydration Membrane Modules |
| DRYER | Mol-sieve Adsorptive Air Dryer |
| HTEX | Main Heat Exchanger |
| EVAP | External Refrigerator Evaporator |
| MEMBRANE | Parallel Membrane Modules |
| HLEAK | Heat Leak Simulation |
| RCOMPR | External Refrigerator Compressor |
| RCNDNS | External Refrigerator Condensor |
| RJT | External Refrigerator Expansion Valve |
| SPLITTER | Waste Stream Splitter |
| BLOWER | Dehydration Sweep Gas Blower |
| BCOOLER | Blower Aftercooler |

EXAMPLE 5

Oxygen Process With An Expander-Driven Product Compressor.

Figure 5:
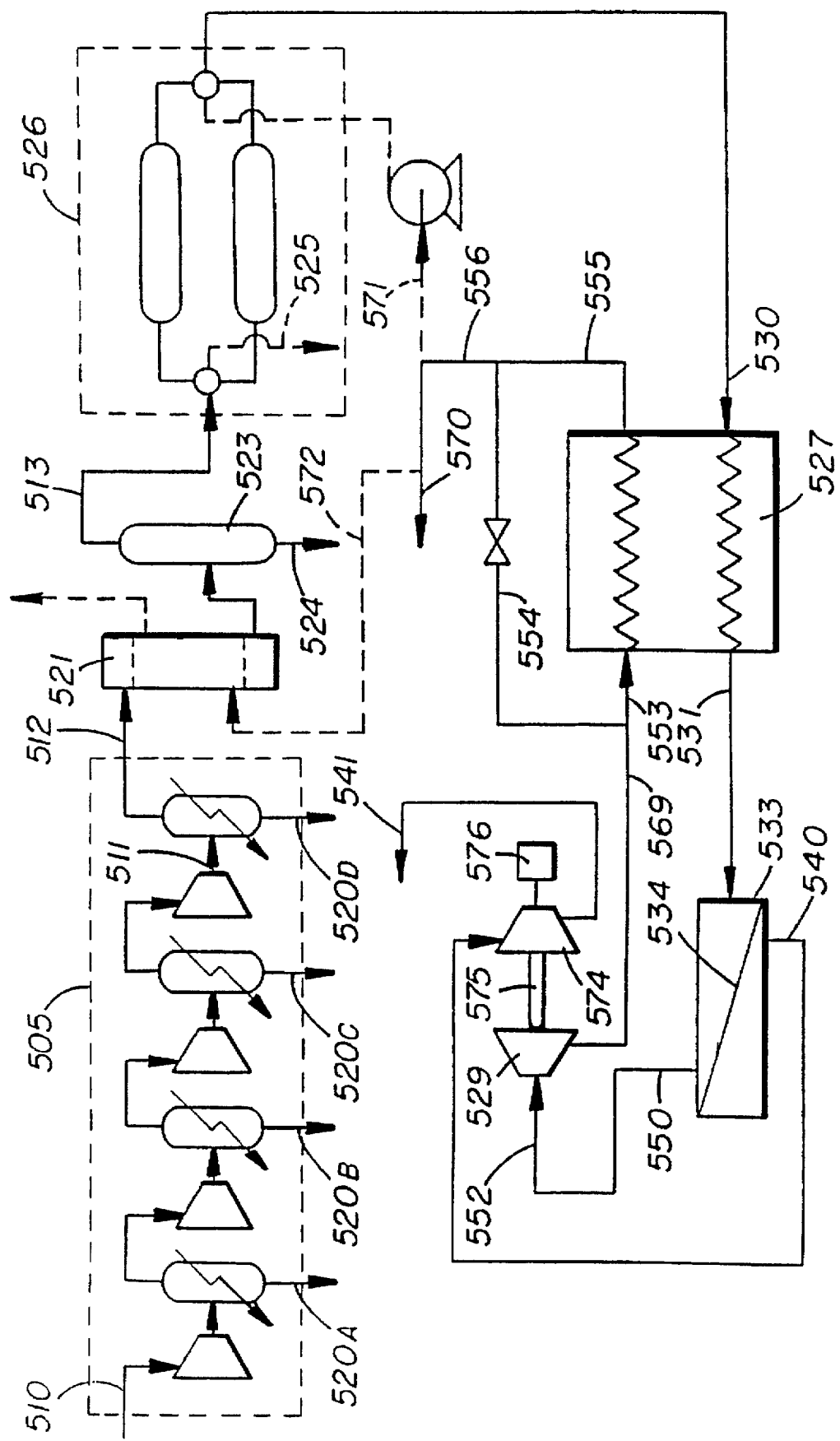
FIG. 5 illustrates in schematic form an apparatus useful for achieving the method of the subject invention which employs all expander driven compressor.

Example 5 is a process to produce an enriched oxygen product stream from air. The oxygen stream specifications are a 10,000 standard cubic feet per hour (SCFH) (283 cubic meters per hour) flowrate at 40 psia pressure (276 kPa) with a 65 percent oxygen concentration on a molar basis. A simplified flowsheet for this process is shown in FIG. 5. A summary of the major process streams is given in Table 5A, and a summary description list of the major process equipment is given in Table 5B. Definitions of abbreviations used are given in Table 5C.

Feed air 510 to the process is available from the atmosphere at ambient pressure, temperature, and humidity, and must be compressed. The air compression and purification section 505, 521, 523, and 526 of this process is similar to that of Example 1. However, a cold waste gas stream 572 is available from this process, and may be used to replace the refrigerant in the air cooler 521 between the feed air compressor 505 and the adsorptive dryer 526. The compressed, decontaminated air stream 530 is fed to a small heat exchanger 527, where it is cooled against a warming portion of the waste non-permeate nitrogen-enriched stream 553. The cooled air 531 is then fed to several parallel membrane devices 533, where separation takes place. The high pressure non-permeate nitrogen-enriched stream leaving the membrane devices 533 via conduit 550/552 is then expanded in expander 529 to near-ambient pressure 569, and a portion of this stream 553 enters a set of passages in the heat exchanger 527, where it is warmed against the cooling feed air stream 530. The stream 555 is recombined with the colder portion 554 that did not pass through the heat exchanger 527, and most of the stream 570 is vented to the atmosphere. A portion of the dry, cold waste non-permeate nitrogen-enriched stream 571 may be used to regenerate one bed of the adsorptive air dryer 526, and another portion 572 may be used to cool the air stream 512 after the feed compressor 505. The low pressure oxygen-enriched permeate product 540 from the membrane device 533 (using membrane 533) is red to a product compressor where it is compressed to the desired product pressure 541. This compressor may be driven by the expander 529 through a shaft or belt drive 575, or the expander may drive an electrical generator 576.

This Example demonstrates the use of a low temperature membrane process to produce an oxygen-enriched permeate product stream, as well as how the permeate product may be recompressed to a higher pressure to be useful. This Example also demonstrates that a process does not need to be carefully designed to reduce the refrigeration requirement. Since 75 percent of the feed flow to this process is available to expand from high pressure to low pressure, a considerable excess of refrigeration is available.

TABLE 5A

STREAM SUMMARY FOR LOW-TEMPERATURE OXYGEN PROCESS WITH AN EXPANDER-DRIVEN OXYGEN COMPRESSOR

| Stream ID | | 510 | 511 | 512 | 513 | 520A |
|---|---|---|---|---|---|---|
| From: | | — | COMPRESS | AFT-COOL | CHILLER | COMPRESS |
| To: | | COMPRESS | AFT-COOL | CHILLER | SEPARATE | — |
| Temperature | K. | 293.15 | 391.2176 | 313.15 | 277.5944 | n.a. |
| | C. | 20 | 118.0676 | 40 | 4.4444 | n.a. |
| Pressure | Pa | 101330 | 1244800 | 1237900 | 124100 | n.a. |
| | psia | 14.6959 | 180.5364 | 179.5364 | 177.5364 | n.a. |
| Vapor Fraction | | 1 | 1 | 1 | 1 | n.a. |
| Total Flow: | | | | | | |
| | kgmol/s | 0.01427 | 0.014245 | 0.014171 | 0.014092 | 0 |
| | kg/s | 0.4113 | 0.4108 | 0.4095 | 0.4081 | 0 |
| | lbmol/hr | 113.2594 | 113.0584 | 112.4711 | 111.8427 | 0 |
| | lb/hr | 3264.159 | 3260.538 | 3249.957 | 3238.636 | 0 |
| | cu m/s | 0.3433 | 0.037434 | 0.029876 | 0.026542 | 0 |
| Mole Fraction | | | | | | |
| $H_2O$ | | 0.013223 | 0.011469 | 0.006306 | 0.000723 | 0 |
| $N_2$ | | 0.7705 | 0.7719 | 0.7759 | 0.7803 | 0 |
| AR | | 0.009217 | 0.009233 | 0.009281 | 0.009333 | 0 |
| $O_2$ | | 0.2067 | 0.2071 | 0.2081 | 0.2093 | 0 |
| $CO_2$ | | 0.000326 | 0.000326 | 0.000328 | 0.00033 | 0 |

| Stream ID | | 520B | 520C | 520D | 524 | 525 |
|---|---|---|---|---|---|---|
| From: | | COMPRESS | COMPRESS | AFT-COOL | CHILLER | SEPARATE |
| To: | | — | — | — | — | — |
| Temperature | K. | n.a. | 313.15 | 313.15 | 277.5944 | 277.4276 |
| | C. | n.a. | 40 | 40 | 4.4444 | 4.2776 |
| Pressure | Pa | n.a. | 657980 | 1237900 | 1224100 | 1155100 |
| | psia | n.a. | 95.4324 | 179.5364 | 177.5364 | 167.5364 |
| Vapor Fraction | | n.a. | 0 | 0 | 0 | 0.9663 |
| Total Flow: | | | | | | |
| | kgmol/s | 0 | 2.5324E-05 | 7.4009E-05 | 7.9174E-05 | 0.00029638 |
| | kg/s | 0 | 0.00045621 | 0.0013333 | 0.0014263 | 0.0085416 |
| | lbmol/hr | 0 | 0.201 | 0.5874 | 0.6284 | 2.3523 |
| | lb/hr | 0 | 3.6208 | 10.5818 | 11.3204 | 67.7912 |
| | cu m/s | 0 | 6.1079E-07 | 1.7848E-06 | 1.8613E-06 | 0.00057118 |
| Mole Fraction | | | | | | |
| $H_2O$ | | 0 | 1 | 1 | 1 | 0.034382 |
| $N_2$ | | 0 | 3.6015E-07 | 6.7675E-07 | 1.5577E-07 | 0.742 |
| AR | | 0 | 1.2352E-07 | 2.3164E-07 | 9.2227E-08 | 0.0088754 |
| $O_2$ | | 0 | 2.3826E-06 | 4.4709E-06 | 1.9321E-06 | 0.199 |
| $CO_2$ | | 0 | 1.7169E-07 | 3.18E-07 | 2.7773E-07 | 0.015679 |

| Stream ID | | 530 | 531 | 540 | 541 | 550 | 552 |
|---|---|---|---|---|---|---|---|
| From: | | SEPARATE | HTEX | MEMBRANE | O2COMPR | MEMBRANE | HLEAK |
| To: | | HTEX | MEMBRANE | O2COMPR | — | HLEAK | EXPAND |
| Temperature | K. | 277.4276 | 193.15 | 193.5 | 269.9725 | 191.191 | 192.5355 |
| | C. | 4.2776 | −80 | −80 | −3.1775 | −81.959 | −80.6145 |
| Pressure | Pa | 1155100 | 1141300 | 103430 | 275790 | 1122400 | 1122400 |
| | psia | 167.5364 | 165.5364 | 15.0005 | 40 | 162.7854 | 162.7854 |
| Vapor Fraction | | 1 | 1 | 1 | 1 | 1 | 1 |
| Total Flow: | | | | | | | |
| | kgmol/s | 0.013796 | 0.013796 | 0.00324 | 0.00324 | 0.010556 | 0.010556 |
| | kg/s | 0.3995 | 0.3995 | 0.1002 | 0.1002 | 0.2993 | 0.2993 |
| | lbmol/hr | 109.4904 | 109.4904 | 25.7129 | 25.7129 | 83.7758 | 83.7758 |
| | lb/hr | 3170.845 | 3170.845 | 795.5051 | 795.5051 | 2375.284 | 2375.284 |
| | cu m/s | 0.027521 | 0.018891 | 0.050154 | 0.026331 | 0.014566 | 0.014681 |
| Mole Fraction | | | | | | | |
| $H_2O$ | | 0 | 0 | 0 | 0 | 0 | 0 |
| $N_2$ | | 0.7811 | 0.7811 | 0.322 | 0.322 | 0.9221 | 0.9221 |
| AR | | 0.009343 | 0.009343 | 0.027973 | 0.027973 | 0.003625 | 0.003625 |
| $O_2$ | | 0.2095 | 0.2095 | 0.6501 | 0.6501 | 0.074307 | 0.074307 |
| $CO_2$ | | 0 | 0 | 0 | 0 | 0 | 0 |

TABLE 5A-continued

STREAM SUMMARY FOR LOW-TEMPERATURE OXYGEN PROCESS WITH AN EXPANDER-DRIVEN OXYGEN COMPRESSOR

| Stream ID | | 553 | 554 | 555 | 556 | 569 |
|---|---|---|---|---|---|---|
| From: | | N2SPLIT | N2SPLIT | HTEX | N2MIX | EXPAND |
| To: | | HTEX | N2MIX | N2MIX | — | N2SPLIT |
| Temperature | K. | 116.0935 | 116.0935 | 267.4007 | 229.7561 | 116.0935 |
| | C. | −157.057 | −157.057 | −5.7493 | −43.3939 | −157.057 |
| Pressure | Pa | 122040 | 122040 | 108250 | 108250 | 122040 |
| | psia | 17.7 | 17.7 | 15.7 | 15.7 | 17.7 |
| Vapor Fraction | | 1 | 1 | 1 | 1 | 1 |
| Total Flow: | | | | | | |
| | kgmol/s | 0.00794 | 0.002616 | 0.00794 | 0.010556 | 0.010556 |
| | kg/s | 0.2251 | 0.074163 | 0.2251 | 0.2993 | 0.2993 |
| | lbmol/hr | 63.0158 | 20.7601 | 63.0158 | 83.7758 | 83.7758 |
| | lb/hr | 178.677 | 588.6069 | 1786.677 | 2375.284 | 2375.284 |
| | cu m/s | 0.061796 | 0.000358 | 0.163 | 0.1861 | 0.082154 |
| Mole Fraction | | | | | | |
| H2O | | 0 | 0 | 0 | 0 | 0 |
| N2 | | 0.9221 | 0.9221 | 0.9221 | 0.9221 | 0.9221 |
| AR | | 0.003625 | 0.003625 | 0.003625 | 0.003625 | 0.003625 |
| O2 | | 0.074307 | 0.074307 | 0.074307 | 0.074307 | 0.074307 |
| CO2 | | 0 | 0 | 0 | 0 | 0 |

TABLE 5B

Low-Temperature Oxygen Process With Expander-Driven Oxygen Compressor: Major Equipment Summary

MAIN AIR COMPRESSOR

4-Stage compressor with intercoolers and aftercooler.
Capacity: 0.41 kg/s air at 1238000 Pa discharge pressure
Minimum stage efficiency: 80 percent isentropic
Motor capacity: 131 kW brake power.
Cooler capacity: maximum 40° C. outlet at 20° C. ambient temperature.

MEMBRANE MODULES

7 parallel modules containing $1.4 \times 10^6$ PBO A fibers.
Fiber ID (m): $9.5 \times 10^{-5}$
Fiber OD (m): $1.35 \times 10^{-4}$
Fiber Dense Region Thickness (m): $7.4 \times 10^{-8}$
Fiber Active Length (m): 1.5748
Tubesheet Length (m): 0.2032

MAIN HEAT EXCHANGER

Brazed aluminum plate-and fin heat exchanger with extended-surface area fins. Two sets of passages in counter-current arrangement.
Capacity, stream 1: 0.40 kg/s at 1155000 Pa from 4.3° C. to −80° C.
stream 2: 0.23 kg/s at 122000 Pa from −157° C. to −5.7° C.
Duty: 35.2 kW, maximum 10° C. warm-end temperature difference
Maximum pressure drop: 13800 Pa each stream.

EXPANDER

Generator-loaded turbo-expander for extraction of 17.6 kW work.
Capacity: 0.30 kg/s, 92 percent nitrogen at 1122000 Pa, −80° C.
Pressure reduction to 122000 pa.
Minimum efficiency: 80 percent isentropic.

CHILLER/DRYER

Heat exchanger cooled by waste nitrogen stream and water-separation vessel.
Capacity stream 1: 0.40 kg/s at 1283000 Pa, from 40° C. to 4.4° C.

TABLE 5B-continued

Low-Temperature Oxygen Process With Expander-Driven Oxygen Compressor: Major Equipment Summary stream 2: 0.30 kg/s at 114000 Pa from −43° C. to 5° C.
Duty: 18.6 kW.
Maximum overall Pressure drop: 13800 Pa.

AIR DRYER

Twin-vessel molecular-sieve adsorptive air dryer with regeneration blower and heater.
Capacity: 0.40 kg/s saturated air at 1224000 Pa, 4.4° C.
Dewpoint requirement: −80° C. at pressure.
Maximum pressure drop: 69000 Pa.

OXYGEN COMPRESSOR

Centrigal compressor with aftercooler.
Capacity: 0.10 kg/s 65 percent oxygen at 276000 Pa discharge pressure.
Minimum stage efficiency: 80 percent isentropic.
Motor capacity: 7.5 kW brake power.
Cooler capacity: maximum 40° C. outlet at 20° C. ambient temperature.

TABLE 5C

Equipment List Key For Table 5A

| | |
|---|---|
| COMPRESS | Main Air Compressor |
| AFT-COOL | Compressor Aftercooler |
| CHILLER | Refrigerated Air Chiller |
| SEPARATE | Mol-sieve Adsorptive Air Dryer |
| HTEX | Main Heat Exchanger |
| MEMBRANE | Parallel Membrane Modules |
| HLEAK | Heat Leak Simulation |
| EXPAND | Expander |
| N2SPLIT | Heat Exchanger Bypass Splitter |
| N2MIX | Heat Exchanger Bypass Mixer |
| O2COMPR | Product Oxygen Compressor |

EXAMPLE 6

Oxygen Process With A Permeate Vacuum Pump.

Figure 6:
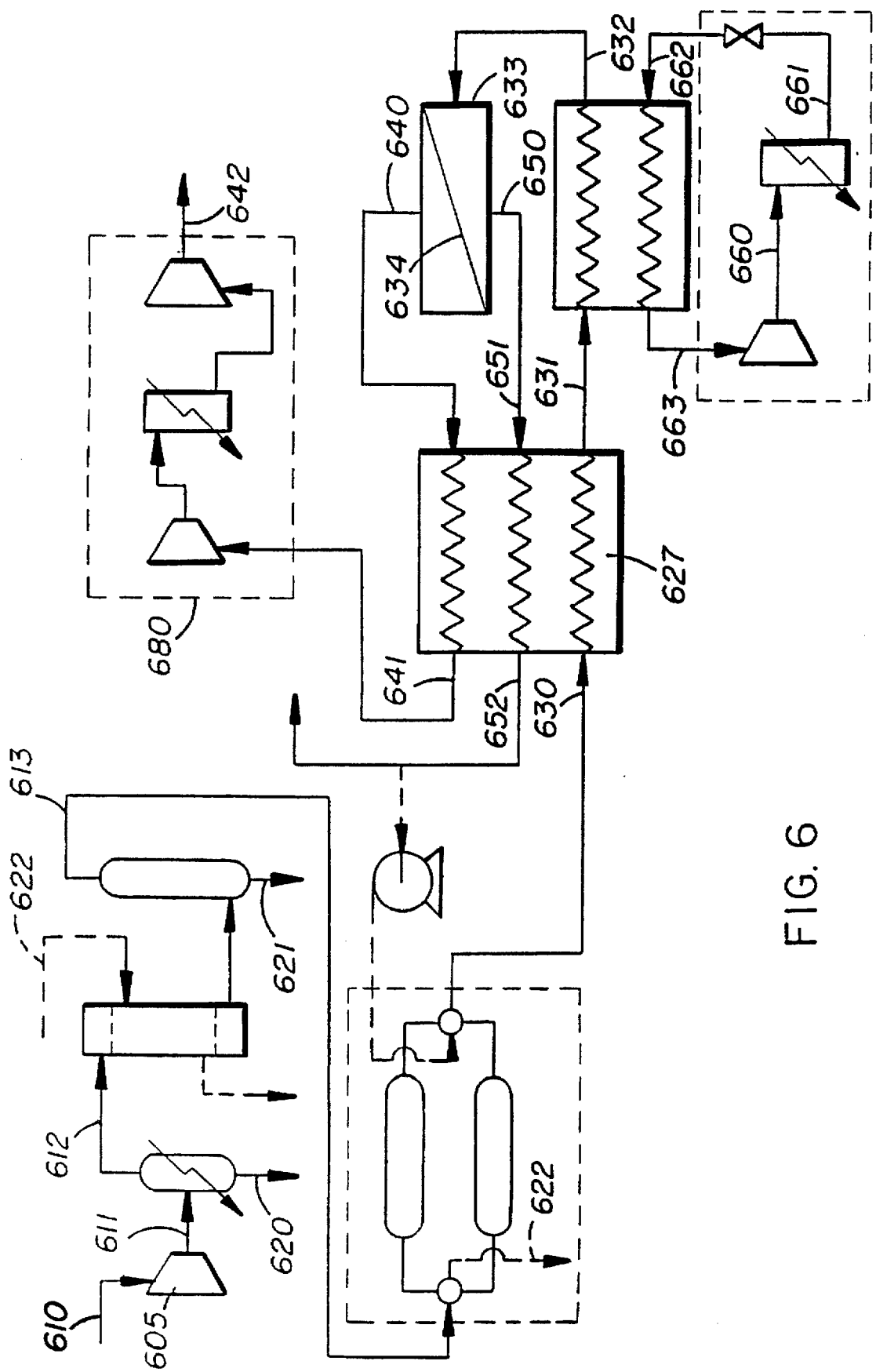
FIG. 6 illustrates in schematic form an apparatus useful for achieving the method of the subject invention which employs a vacuum pump on the permeate stream.

Example 6 is a process to produce an enriched oxygen permeate product stream from air. The oxygen stream specifications are the same as Example 5, except the stream pressure is at 20 psia (138 kPa). A simplified flowsheet for this process is shown in FIG. 6. A summary or the major process streams is given in Table 6A, and a summary description list or the major process equipment is given in Table 6B. Definitions of abbreviations used are given in Table 6C.

The arrangement of equipment in this process is similar to that or Example 3; however, the high pressure passages of the membrane device 633 are maintained at a substantially lower pressure and the low pressure passages of the membrane device are maintained under vacuum. Consequently, the four-stage air compressor or Example 3 is replaced here with a single-stage compressor 605. Also, the permeate stream 641 leaving the main heat exchanger 627 is fed to a vacuum pump 680, which is shown as a two-stage reciprocating type. Because of the lower pressure difference across the membrane 634, a considerably larger number of membrane devices will have to be used in this Example than in Example 5. Also, since lower pressure operation causes a substantially higher pressure drop at the same mass flowrate, much of the process equipment will be considerably larger to keep pressure drops low. This includes the air decontamination equipment, heat exchangers, and piping. Vacuum pumps are normally significantly less efficient than compressors, resulting in higher power costs.

This Example demonstrates the use of a vacuum pump in conjunction with a compressor to maintain a pressure difference across the membrane devices. It also demonstrates the use of a vacuum pump to change the pressure of a product stream. It also demonstrates the use of a membrane device at a lower pressure differential than is commonly preferred.

TABLE 6A

STREAM SUMMARY FOR LOW-TEMPERATURE OXYGEN PROCESS WITH A VACUUM PUMP ON THE PERMEATE PRODUCT STREAM

| Stream ID | | 610 | 611 | 612 | 613 | 620 |
|---|---|---|---|---|---|---|
| From: | | — | BLOWER | COOLER | CHILLER | COOLER |
| To: | | BLOWER | COOLER | CHILLER | SEPARAT | — |
| Temperature | K. | 293.15 | 472.3254 | 316.15 | 277.5944 | n.a. |
| | C. | 20 | 199.1754 | 43 | 4.4444 | n.a. |
| Pressure | Pa | 101330 | 341330 | 334430 | 320640 | 334430 |
| | psia | 14.6959 | 49.5051 | 48.5051 | 46.5051 | n.a. |
| Vapor Fraction | | 1 | 1 | 1 | 1 | n.a. |
| Total Flow: | | | | | | |
| | kgmol/s | 0.024597 | 0.024597 | 0.024597 | 0.024334 | 0 |
| | kg/s | 0.7089 | 0.7089 | 0.7089 | 0.7042 | 0 |
| | lbmol/hr | 195.2182 | 195.2182 | 195.2182 | 193.1312 | 0 |
| | lb/hr | 5626.226 | 5626.226 | 5626.226 | 5588.629 | 0 |
| | cu m/s | 0.5917 | 0.2835 | 0.1934 | 0.1751 | 0 |
| Mole Fraction | | | | | | |
| $H_2O$ | | 0.013223 | 0.013223 | 0.013223 | 0.00256 | 0 |
| $N_2$ | | 0.7705 | 0.7705 | 0.7705 | 0.7789 | 0 |
| AR | | 0.009217 | 0.009217 | 0.009217 | 0.009316 | 0 |
| $O_2$ | | 0.2067 | 0.2067 | 0.2067 | 0.2089 | 0 |
| $CO_2$ | | 0.000326 | 0.000326 | 0.000326 | 0.000329 | 0 |
| $CClF_3$ | | 0 | 0 | 0 | 0 | 0 |

| Stream ID | | 621 | 622 | 630 | 631 | 632 |
|---|---|---|---|---|---|---|
| From: | | CHILLER | SEPARAT | SEPARAT | HTEX | EVAP |
| To: | | — | — | HTEX | EVAP | MEMBRANE |
| Temperature | K. | 277.5944 | 277.5053 | 277.5053 | 217.0246 | 213.15 |
| | C. | 4.4444 | 4.3553 | 4.3553 | −56.1254 | −60 |
| Pressure | Pa | 320640 | 286170 | 286170 | 265480 | 251690 |
| | psia | 46.5051 | 41.5051 | 41.5051 | 38.5051 | 36.5051 |
| Vapor Fraction | | 0 | 0.8904 | 1 | 1 | 1 |
| Total Flow: | | | | | | |
| | kgmol/s | 0.00026295 | 0.00055558 | 0.023779 | 0.023779 | 0.023779 |
| | kg/s | 0.0047371 | 0.015528 | 0.6886 | 0.6886 | 0.6886 |
| | lbmol/hr | 2.0869 | 4.4094 | 188.7218 | 188.7218 | 188.7218 |
| | lb/hr | 37.5968 | 123.2428 | 5465.386 | 5465.386 | 5465.386 |
| | cu m/s | 6.1882E-06 | 0.0039879 | 0.1917 | 0.161 | 0.1668 |
| Mole Fraction | | | | | | |
| $H_2O$ | | 1 | 0.1121 | 0 | 0 | 0 |
| $N_2$ | | 4.1273E-08 | 0.6823 | 0.7811 | 0.7811 | 0.7811 |
| AR | | 2.454E-08 | 0.0081608 | 0.009343 | 0.009343 | 0.009343 |
| $O_2$ | | 5.1356E-07 | 0.183 | 0.2095 | 0.2095 | 0.2095 |
| $CO_2$ | | 7.6026E-08 | 0.014417 | 0 | 0 | 0 |
| $CClF_3$ | | 0 | 0 | 0 | 0 | 0 |

TABLE 6A-continued

STREAM SUMMARY FOR LOW-TEMPERATURE OXYGEN PROCESS WITH A VACUUM PUMP ON THE PERMEATE PRODUCT STREAM

| Steam ID | | 640 | 641 | 642 | 650 | 651 | 652 |
|---|---|---|---|---|---|---|---|
| From: | | MEMBRANE | HTEX | VACPUMP | MEMBRANE | HLEAK | HTEX |
| To: | | HTEX | VACPUMP | — | HLEAK | HTEX | — |
| Temperature | K. | 213.15 | 273.4994 | 313.15 | 212.3715 | 212.7701 | 273.4994 |
| | C. | −60 | 0.3494 | 40 | −60.7785 | −60.3799 | 0.3494 |
| Pressure | Pa | 20685 | 6895.485 | 131000 | 124070 | 124070 | 103390 |
| | psia | 3.0001 | 1.0001 | 19 | 17.9948 | 17.9948 | 14.9948 |
| Vapor Fraction | | 1 | 1 | 1 | 1 | 1 | 1 |
| Total Flow: | | | | | | | |
| | kgmol/s | 0.003243 | 0.003243 | 0.003243 | 0.020535 | 0.020535 | 0.020535 |
| | kg/s | 0.1003 | 0.1003 | 0.1003 | 0.5883 | 0.5883 | 0.5883 |
| | lbmol/hr | 25.7416 | 25.7416 | 25.7416 | 162.9765 | 162.9765 | 162.9765 |
| | lb/hr | 796.2139 | 796.2139 | 796.2139 | 4669.058 | 4669.058 | 4669.058 |
| | cu m/s | 0.2778 | 1.0696 | 0.06446 | 0.2917 | 0.2923 | 0.4516 |
| Mole Fraction | | | | | | | |
| H2O | | 0 | 0 | 0 | 0 | 0 | 0 |
| N2 | | 0.3226 | 0.3226 | 0.3226 | 0.8536 | 0.8536 | 0.8536 |
| AR | | 0.027412 | 0.027412 | 0.027412 | 0.006489 | 0.006489 | 0.006489 |
| O2 | | 0.65 | 0.65 | 0.65 | 0.1399 | 0.1399 | 0.1399 |
| CO2 | | 0 | 0 | 0 | 0 | 0 | 0 |
| CClF3 | | 0 | 0 | 0 | 0 | 0 | 0 |

| Stream ID | | 660 | 661 | 662 | 663 |
|---|---|---|---|---|---|
| From: | | RCOMPR | RCNDNS | RJT | EVAP |
| To: | | RCNDNS | RJT | EVAP | RCOMPR |
| Temperature | K. | 372.108 | 299.8111 | 207.1504 | 211.9597 |
| | C. | 98.958 | 26.6611 | −65.9996 | −61.1903 |
| Pressure | Pa | 3744400 | 3730600 | 216220 | 202430 |
| | psia | 543.0833 | 541.0833 | 31.3603 | 29.3603 |
| Vapor Fraction | | 1 | 0 | 0.8317 | 1 |
| Total Flow: | | | | | |
| | kgmol/s | 0.00095005 | 0.00095005 | 0.00095005 | 0.00095005 |
| | kg/s | 0.099242 | 0.099242 | 0.099242 | 0.099242 |
| | lbmol/hr | 7.5402 | 7.5402 | 7.5402 | 7.5402 |
| | lb/hr | 787.6479 | 787.6479 | 787.6479 | 787.6479 |
| | cu m/s | 0.00066542 | 0.00015876 | 0.0059282 | 0.0078375 |
| Mole Fraction | | | | | |
| H2O | | 0 | 0 | 0 | 0 |
| N2 | | 0 | 0 | 0 | 0 |
| AR | | 0 | 0 | 0 | 0 |
| O2 | | 0 | 0 | 0 | 0 |
| CO2 | | 0 | 0 | 0 | 0 |
| CClF3 | | 1 | 1 | 1 | 1 |

TABLE 6B

Low-Temperature oxygen process with
Permeate Vacuum Pump: Major Equ ment Survey.

MAIN AIR COMPRESSOR

1-Stage compressore with aftercooler.
Capacity: 0.71 kg/s air at 334400 Pa discharge
Minimum stage efficiency: 72 percent isentropic.
Motor capacity: 130 kW brake power.
Cooler capacity: maximum 40° C. outlet at 20° C. ambient temperature.

MEMBRANE MODULES 14 parallel modules containing $1.4 \times 10^6$ PBO A fibers.
Fiber ID (m): $9.5 \times 10^{-5}$
Fiber OD (m): $1.35 \times 10^{-4}$
Fiber Dense Region Thickness (m): $7.4 \times 10^{-8}$
Fiber Active Length (m): 1.5748
Tubesheet Length (m): 0.2032

TABLE 6B-continued

Low-Temperature oxygen process with
Permeate Vacuum Pump: Major Equ ment Survey.

MAIN HEAT COMPRESSOR

Brazed aluminum plate-and-fin heat exchanger with extended-surface area fins. Three sets of passages in counter-current arrangement.
Capacity, stream 1: 0.69 kg/s at 265500 Pa from 4.3° C. to −56° C.
stream 2: 0.59 kg/s at 124,100 Pa from −61° C. to 0.3° C.
stream 3: 0.10 kg/s at 20690 Pa from −60° C to 0.3° C.
Duty: 42.1 kW, maximum 4° C. warm-end temperature difference.
Maximum pressure drop: 20680 Pa stream 1 & 2, 13800 Pa stream 3.

TABLE 6B-continued

Low-Temperature oxygen process with Permeate Vacuum Pump: Major Equipment Survey.

CHILLER/DRYER

Heat exchanger with external freon refrigeration system and water-separation vessel.
capacity: 0.70 kg/s at 334500 Pa from 43° C. to 4.4° C.
Expected refrigeration duty: 40 kW.
Maximum overall pressure drop: 13800 Pa.

AIR DRYER

Twin-vessel molecular-sieve adsorptive air dryer with regeneration blower and heater.
Cbpacity: 0.69 kg/s saturated air at 320700 Pa, 4.4° C.
Dewpoint requirement: −70° C. at pressure.
Maximum pressure drop: 34500 Pa.

VACUUM PUMP

Two-stage reciprocating vacuum pump with intercooler and aftercooler.
Capacity: 0.10 kg/s 65 percent oxygen at 131000 Pa discharge pressure.
Feed pressure: 6900 Pa.
Motor capacity: 50.6 kW brake power assuming 72 percent polytropic efficiency.
Cooler capacity: maximum 40° C. outlet at 20° C. ambient temperature.

EXTERNAL REFRIGERATOR COMPRESSOR

Reciprocating Freon-13 compressor with capacity to compress 0.10 kg/s from 202430 Pa to 3745000 Pa discharge pressure.
Motor capacity: 8.25 kW brake power.

EXTERNAL REFRIGERATOR CONDENSOR

Heat exchanger wah capacity to condense 0.10 kg/s Freon-13 vapor
at 3745000 Pa, 97° C. to liquid at 27° C. against 20° C. ambient air.
Expected duty: 11.0 kW.

EXTERNAL REFRIGERATOR EVAPORATOR

Evaporative heat exchanger with capacity to cool 0.69 kg/s air at 265500 Pa from −58° C. to −60° C. against −66° C. boiling Freon-13.
Expected duty: 2.6 kW.

TABLE 6C

Equipment List Key For Table 6A

| BLOWER | Main Air Blower |
|---|---|
| COOLER | Blower Aftercooler |
| CHILLER | Refrigerated Air Chiller |
| SEPARAT | Mol-sieve Adsorptive Air Dryer |
| HTEX | Main Heat Exchanger |

TABLE 6C-continued

Equipment List Key For Table 6A

| EVAP | External Refrigerator Evaporator |
|---|---|
| MEMBRANE | Parallel Membrane Modules |
| HLEAK | Heat Leak Simulation |
| VACPUMP | Product Oxygen Vacuum Pump |
| RCOMPR | External Refrigerator Compressor |
| RCNDNS | External Refrigerator Condensor |
| RJT | External Refrigerator Expansion Valve |

EXAMPLE 7

Oxygen Process With Cascaded Membrane Devices And A Recycle Stream.

Figure 7:
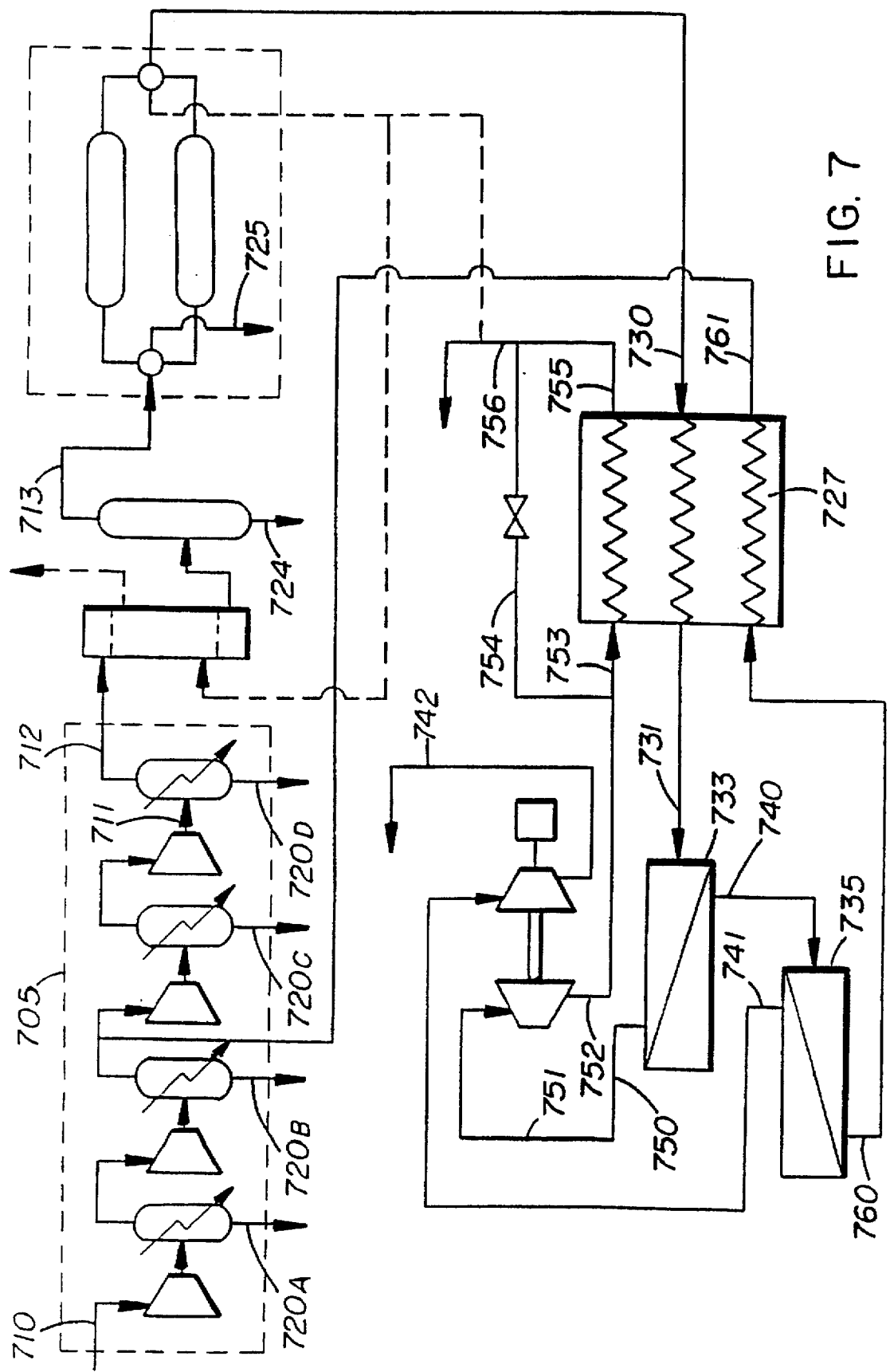
FIG. 7 illustrates in schematic form an apparatus useful for achieving the method of the subject invention which employs cascaded membrane devices and a recycle stream.

Example 7 is a process to produce an enriched oxygen permeate product stream from air. The oxygen stream specifications are the same as Example 5, except that the stream has an oxygen concentration of 85 percent on a molar basis. A simplified flowsheet for this process is shown in FIG. 7. A summary of the major process streams is given in Table 7A, and a summary description list of the major process equipment is given in Table 7B. Definitions of abbreviations used are given in Table 7C.

This process is similar to Example 5. Here, however, the permeate stream 740 from the first set or parallel membrane devices 733 is produced at medium, rather than low, pressure and the permeate stream 740 is used as the feed to a second set of membrane devices 735. The low pressure permeate stream 741 from the second set of membrane devices 735 is the desired product, and the medium pressure non-permeate stream 760 is recycled through the main heat exchanger 727 to the inlet to the third stage of the four-stage air compressor through conduit 761. This cascading of membrane devices allows higher product oxygen concentrations to be achieved than from a single set of devices. The non-permeate stream 760 leaving the second set of membrane devices 735 contains 35 percent oxygen, so recycling the stream to the air compressor 705 helps boost the oxygen content of the feed stream 731 to the first set of membrane devices 733, thus increasing the driving forces for oxygen permeation across the membranes. Recycling a medium pressure stream also helps reduce power consumption.

This Example demonstrates how multiple membrane devices may be used in a cascaded arrangement to achieve higher permeate product purities, and how recycle streams may be used to increase the recovery and energy efficiency of a process. See Table 7D for a summary of the simulated data generated by Examples 5–7 and described in Tables 5A to 7C.

TABLE 7A

STREAM SUMMARY FOR LOW-TEMPERATURE OXYGEN PROCESS WITH CASCADED MEMBRANE DEVICES AND A RECYCLE STREAM

| Stream ID | | 710 | 711 | 712 | 713 | 720A | 720B |
|---|---|---|---|---|---|---|---|
| From: | | — | COMPRESS | AFT-COOL | CHILLER | COMPRESS | COMPRESS |
| To: | | COMPRESS | AFT-COOL | CHILLER | SEPARATE | — | — |
| Temperature | K. | 293.15 | 398.4785 | 313.15 | 277.5944 | n.a | n.a |
| | C. | 20 | 125.3285 | 40 | 4.4444 | n.a | n.a |
| Pressure | Pa | 101330 | 1551300 | 1544400 | 1530600 | n.a | n.a |
| | psia | 14.6959 | 225 | 224 | 222 | n.a | n.a |
| Vapor Fraction | | 1 | 1 | 1 | 1 | n.a | n.a |

TABLE 7A-continued

STREAM SUMMARY FOR LOW-TEMPERATURE OXYGEN PROCESS WITH
CASCADED MEMBRANE DEVICES AND A RECYCLE STREAM

| Total Flow: | | | | | | | |
|---|---|---|---|---|---|---|---|
| | kgmol/s | 0.01575 | 0.024281 | 0.024197 | 0.024087 | 0 | 0 |
| | kg/s | 0.4539 | 0.7056 | 0.7041 | 0.7021 | 0 | 0 |
| | lbmol/hr | 125 | 192.7108 | 192.0467 | 191.1714 | 0 | 0 |
| | lb/hr | 3602.525 | 5600.15 | 5588.186 | 5572.418 | 0 | 0 |
| | cu m/s | 0.3788 | 0.052226 | 0.040905 | 0.036262 | 0 | 0 |
| Mole Fraction | | | | | | | |
| $H_2O$ | | 0.013223 | 0.008577 | 0.005149 | 0.000594 | 0 | 0 |
| $N_2$ | | 0.7705 | 0.7306 | 0.7331 | 0.7365 | 0 | 0 |
| AR | | 0.009217 | 0.011337 | 0.011376 | 0.011428 | 0 | 0 |
| $O_2$ | | 0.2067 | 0.2493 | 0.2501 | 0.2513 | 0 | 0 |
| $CO_2$ | | 0.000326 | 0.000211 | 0.000212 | 0.000213 | 0 | 0 |

| Stream ID | | 720C | 720D | 724 | 725 | 730 | 731 |
|---|---|---|---|---|---|---|---|
| From: | | COMPRESS | AFT-COOL | CHILLER | SEPARATE | SEPARATE | HTEX |
| To: | | — | — | — | — | HTEX | MEMB1 |
| Temperature | K. | n.a | 313.15 | 277.5944 | 277.5944 | 277.4274 | 213.15 |
| | C. | n.a | 40 | 4.4444 | 4.4444 | 4.2774 | −60 |
| Pressure | Pa | n.a | 1544400 | 1530600 | 1461700 | 1461700 | 1447900 |
| | psia | n.a | 224 | 222 | 212 | 212 | 210 |
| Vapor Fraction | | n.a | 0 | 0 | 0.972 | 1 | 1 |
| Total Flow: | | | | | | | |
| | kgmol/s | 0 | 8.37E-05 | 0.00011 | 0.000501 | 0.023586 | 0.023587 |
| | kg/s | 0 | 0.001507 | 0.001987 | 0.014516 | 0.6876 | 0.6876 |
| | lbmol/hr | 0 | 0.6641 | 0.8753 | 3.9745 | 187.1969 | 187.2009 |
| | lb/hr | 0 | 11.9641 | 15.7682 | 115.2076 | 5457.21 | 5457.337 |
| | cu m/s | 0 | 2.02E-06 | 2.59E-06 | 0.000767 | 0.037164 | 0.028249 |
| Mole Fraction | | | | | | | |
| $H_2O$ | | 0 | 1 | 1 | 0.028555 | 0 | 0 |
| $N_2$ | | 0 | 7.95E-07 | 1.83E-07 | 0.7085 | 0.7371 | 0.7371 |
| AR | | 0 | 3.53E-07 | 1.4E-07 | 0.010994 | 0.011437 | 0.011438 |
| $O_2$ | | 0 | 6.68E-06 | 2.88E-06 | 0.2417 | 0.2515 | 0.2515 |
| $CO_2$ | | 0 | 2.54E-07 | 2.21E-07 | 0.010241 | 0 | 0 |

| Stream ID | | 740 | 741 | 742 | 750 | 751 | 752 |
|---|---|---|---|---|---|---|---|
| From: | | MEMB1 | MEMB2 | O2COMPR | MEMB1 | HLEAK | EXPAND |
| To: | | MEMB2 | O2COMPR | — | HLEAK | EXPAND | N2SPLIT |
| Temperature | K. | 213.15 | 213.15 | 297.8803 | 208.2826 | 209.4784 | 120.112 |
| | C. | −60 | −60 | 24.7303 | −64.8674 | −63.6716 | −153.038 |
| Pressure | Pa | 413700 | 103430 | 275790 | 1435700 | 1435700 | 122040 |
| | psia | 60.0021 | 15.0005 | 40 | 208.2328 | 208.2328 | 17.7 |
| Vapor Fraction | | 1 | 1 | 1 | 1 | 1 | 1 |
| Total Flow: | | | | | | | |
| | kgmol/s | 0.011772 | 0.00324 | 0.00324 | 0.011815 | 0.011815 | 0.011815 |
| | kg/s | 0.3541 | 0.1024 | 0.1024 | 0.3335 | 0.3335 | 0.3335 |
| | lbmol/hr | 93.4272 | 25.7111 | 25.7111 | 93.7715 | 93.7715 | 93.7115 |
| | lb/hr | 2810.706 | 812.9119 | 812.9119 | 2646.56 | 2646.56 | 2646.56 |
| | cu m/s | 0.050063 | 0.055389 | 0.029072 | 0.013955 | 0.014044 | 0.095291 |
| Mole Fraction | | | | | | | |
| $H_2O$ | | 0 | 0 | 0 | 0 | 0 | 0 |
| $N_2$ | | 0.5213 | 0.1645 | 0.1645 | 0.952 | 0.952 | 0.952 |
| AR | | 0.020536 | 0.034449 | 0.034449 | 0.002373 | 0.002373 | 0.002373 |
| $O_2$ | | 0.4582 | 0.8011 | 0.8011 | 0.045597 | 0.045597 | 0.045597 |
| $CO_2$ | | 0 | 0 | 0 | 0 | 0 | 0 |

| Stream ID | | 753 | 754 | 755 | 756 | 760 | 761 |
|---|---|---|---|---|---|---|---|
| From: | | N2SPLIT | N2SPLIT | HTEX | N2MIX | MEMB2 | HTEX |
| To: | | HTEX | N2MIX | N2MIX | — | HTEX | COMPRESS |
| Temperature | K. | 120.112 | 120.112 | 267.4021 | 213.2276 | 212.1622 | 267.4021 |
| | C. | −153.038 | −153.038 | −5.7479 | −59.9224 | −60.9878 | −5.7479 |
| Pressure | Pa | 122040 | 1220450 | 108250 | 108250 | 336280 | 322490 |
| | psia | 17.7 | 17.7 | 15.7 | 15.7 | 48.7732 | 46.7732 |
| Vapor Fraction | | 1 | 1 | 1 | 1 | 1 | 1 |
| Total Flow: | | | | | | | |
| | kgmol/s | 0.007486 | 0.004329 | 0.007486 | 0.011815 | 0.008531 | 0.008531 |
| | kg/s | 0.2113 | 0.1222 | 0.2113 | 0.3335 | 0.2517 | 0.2517 |

TABLE 7A-continued

STREAM SUMMARY FOR LOW-TEMPERATURE OXYGEN PROCESS WITH CASCADED MEMBRANE DEVICES AND A RECYCLE STREAM

|  | | | | | | | |
|---|---|---|---|---|---|---|---|
| | lbmol/hr | 59.4105 | 34.361 | 59.4105 | 93.7715 | 67.7108 | 67.7108 |
| | lb/hr | 1676.772 | 969.7886 | 1676.772 | 2646.56 | 1997.626 | 1997.626 |
| | cu m/s | 0.060373 | 0.034918 | 0.1537 | 0.1932 | 0.044504 | 0.058756 |
| Mole Fraction | | | | | | | |
| H2O | | 0 | 0 | 0 | 0 | 0 | 0 |
| N2 | | 0.952 | 0.952 | 0.952 | 0.952 | 0.6568 | 0.6568 |
| AR | | 0.002373 | 0.002373 | 0.002373 | 0.002373 | 0.015251 | 0.015251 |
| O2 | | 0.045597 | 0.045597 | 0.045597 | 0.045597 | 0.3279 | 0.3279 |
| CO2 | | 0 | 0 | 0 | 0 | 0 | 0 |

TABLE 7B

Low-Temperature Oxygen Process with Cascaded Membrane Modules: Major Equipment Summary

MAIN AIR COMPRESSOR

4-Stage compressor with intercoolers and aftercooler.
Capacity: 0.45 kg/s air at 1545000 Pa discharge pressure.
Minimum stage efficiency: 80 percent isentropic.
Motor capacity: 201 kW brake power.
Cooler capacity: maximum 40° C. outlet at 20° C. ambient temperature.

MEMBRANE MODULES

First stage: 14.2 parallel modules containing $1.4 \times 10^6$ PBO A fibers.
Second stage: 5.4 parallel modules containing $1.4 \times 10^6$ PBO A fibers.

| | |
|---|---|
| Fiber ID (m): | $9.5 \times 10^5$ |
| Fiber OD (m): | $1.35 \times 10^{-4}$ |
| Fiber Dense Region Thickness (m): | $7.4 \times 10^{-8}$ |
| Fiber Active Length (m): | 1.5748 |
| Tubesheet Length (m): | 0.2032 |

MAIN HEAT EXCHANGER

Brazed aluminum plate-and-fin heat exchanger with extended-surface area fins. Three sets of passages in counter-current arrangement.
Capacity, stream 1: 0.69 kg/s at 1462000 Pa from 4.3° C. to −60° C.
stream 2: 0.21 kg/s at 122000 Pa from −153° C. to −5.7° C.
stream 3: 0.25 kg/s at 336300 Pa from −60° C. to −5.7° C.
Duty: 46.2 kW, maximum 10° C. warm-end temperature difference.
Maximum pressure drop: 13800 Pa each stream.

EXPANDER

Generator-loaded turbo-expander for extraction of 23.1 kW work.
Capacity: 0.33 kg/s, 95 percent nitrogen at 1436000 Pa, −64° C.
Pressure reduction to 122000 Pa.
Minimum efficiency: 80 percent isentropic.

CHILLER/DRYER

Heat exchanger cooled by waste nitrogen stream and water-separation vessel.
Capacity, stream 1: 0.70 kg/s at 1283000 Pa from 40° C. to 4.4° C.
stream 2: 0.33 kg/s at 114000 Pa from −60° C. to 15° C.
Duty: 30.9 kW.
Maximum overall pressure drop: 13800 Pa.

AIR DRYER

Twin-vessel molecular-sieve adsorptive air dryer with regeneration blower and heater.
Capacity: 0.70 kg/s saturated air at 1531000 Pa, 4.4° C.

TABLE 7B-continued

Low-Temperature Oxygen Process with Cascaded Membrane Modules: Major Equipment Summary Dewpoint requirement: −70° C. at pressure.
Maximum pressure drop: 69000 Pa.

OXYGEN COMPRESSOR

Centrifugal compressor with aftercooler.
Capacity: 0.10 kg/s 80 percent oxygen at 276000 Pa discharge pressure.
Minimum stage efficiency: 80 percent isentropic.
Motor capacity: 8.4 kW brake power.
Cooler capacity: maximum 40° C. outlet at 20° C. ambient temperature.

TABLE 7C

Equipment List Key For Table 7A

| | |
|---|---|
| COMPRESS | Main Air Compressor |
| AFT-COOL | Compressor Aftercooler |
| CHILLER | Refrigerated Air Chiller |
| SEPARATE | Mol-sieve Adsorptive Air Dryer |
| HTEX | Main Heat Exchanger |
| MEMB1 | First Set Of Membrane Modules |
| MEMB2 | Second Set Of Membrane Modules |
| HLEAK | Heat Leak Simulation |
| EXPAND | Expander |
| N2SPLIT | Heat Exchanger Bypass Splitter |
| N2MIX | Heat Exchanger Bypass Mixer |
| O2COMPR | Product Oxygen Compressor |

TABLE 7D

SUMMARY OF OXYGEN MEMBRANE PROCESSES

| | Example 5 | Example 6 | Example 7 |
|---|---|---|---|
| Product Purity (Mole percent oxygen) | 65 | 65 | 85 |
| Number of Modules Required | 7.0 | 14.0 | 19.6 (14.2/5.4) |
| Recovery (Percent of feed air) | 22.7 | 13.2 | 20.6 |
| Productivity (SCFH Product/module) | 1430 | 715 | Equivalent to 510 |
| Power (kWh/100 SCF Product) | 1.21 | 1.89 | 1.87 |

EXAMPLE 8

Methane Purification Process With An Expander On The Non-Permeate Product Stream.

Figure 8:
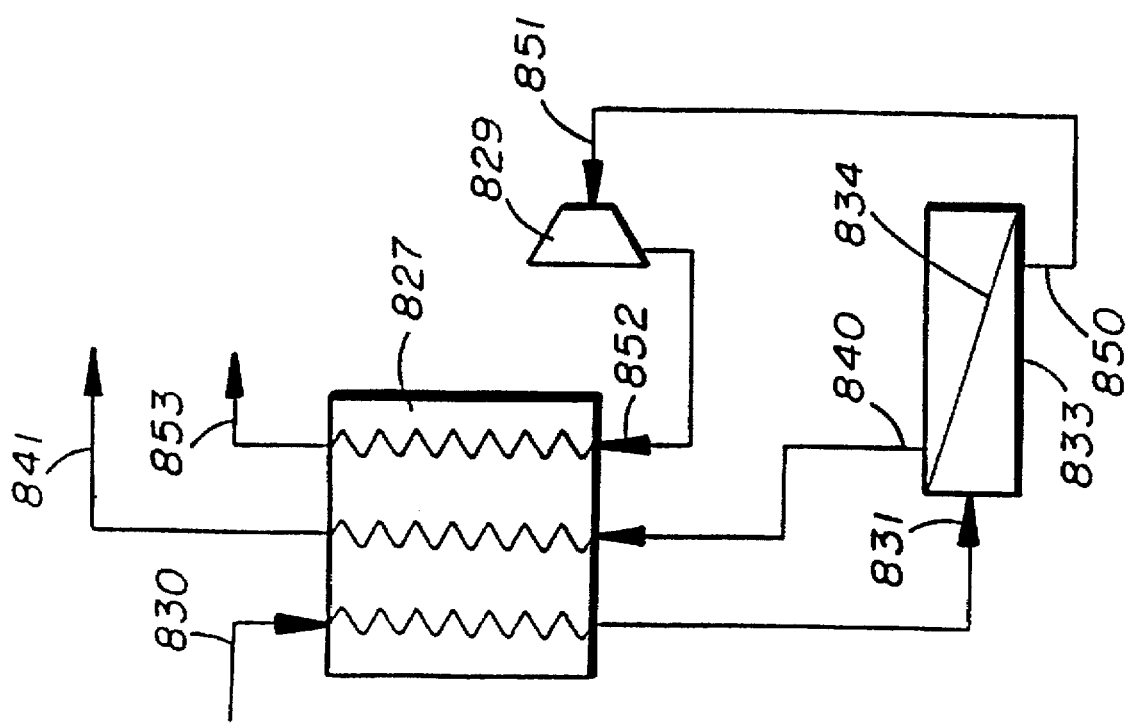
FIG. 8 illustrates in schematic form an apparatus useful for achieving an alternate embodiment of the method of the invention which employs an expander on the non-permeate stream.

Example 8 is a process to produce an enriched methane non-permeate product stream from methane/carbon dioxide mixtures. The feed gas stream is assumed to contain 95 percent methane and 5 percent carbon dioxide on a molar basis, and to be available at 1,000 psia (6900 kPa) pressure and ambient temperature. A non-permeate product stream containing a minimum of 98 percent methane on a molar basis is desired, with as high of a recovery of the methane as is possible. The enriched non-permeate product stream will enter a pipeline for later compression to higher pressures, so it is desirable to minimize the total pressure drop through the membrane process. This separation is often encountered in the natural gas industry, where impure natural gas streams must be purified to meet pipeline specifications. A simplified flowsheet for a process to accomplish this separation is shown in FIG. 8. A summary of the major process streams is given in Table 8A, and the major process equipment is summarized in Table 8B. Definitions of abbreviations used are given in Table 8C.

The feed gas stream 830 is assumed to be available at high pressure, so no compressive equipment is shown. The feed gas stream 830 is also assumed to have been scrubbed, with substantially all particulate, condensable, and corrosive components removed, before entering the process. The high pressure, scrubbed feed gas stream 830 then enters main heat exchanger 827, where it is cooled against warming product streams 840 and 852. The cooled feed gas stream 831 then enters the high pressure passages of the membrane device 833, and the carbon dioxide in the feed gas mixture preferentially permeates through the membrane 834 to the low pressure passages of the membrane device 833. This leaves the high pressure non-permeate product stream 850 exiting the membrane device 833 enriched in methane, while the low pressure permeate product stream 840 exiting the membrane device is enriched in carbon dioxide. The high pressure non-permeate product stream 851 enters the expander 829, which extracts some power from the stream, lowering its pressure and temperature as it exits the expander 829 via conduit 852. This removal of energy compensates for the heat entering the cold equipment through heat transfer with the surroundings and other sources, thus maintaining the equipment and process streams at the desired low temperature. The product streams 840 and 852 then enter the main heat exchanger 827, where they are warmed against the cooling feed stream 830. The high pressure non-permeate methane enriched product stream 853 then enters the product pipeline. The low pressure permeate carbon dioxide enriched product stream 841 is typically sent to a burner, where the heating value of the residual methane in the permeate stream is recovered.

This Example demonstrates some of the characteristics of a low temperature membrane process. Only a single membrane device is required to achieve the desired separation at the given pressures. Since the feed gas stream is available at much higher than ambient pressure, the inlet pressure of the feed gas stream is all that is required to maintain the pressure difference across the membrane. The cold process equipment and piping would be well-insulated to minimize heat leakage into the system. An expander is used to supply refrigeration and maintain the cold process equipment at the desired temperature. A heat exchanger is used to cool the feed stream and warm the product streams. By exchanging heat between these streams, the refrigeration required from the expander can be minimized, thus minimizing the pressure drop that has to be taken across the expander. No product recompression is necessary in this process, since the non-permeate methane-enriched product enters a pipeline to an existing compressor.

TABLE 8A

STREAM SUMMARY FOR METHANE PURIFICATION PROCESS WITH AN EXPANDER ON THE NON-PERMEATE PRODUCT STREAM

| Stream ID: | 830 | 831 | 840 | 841 | 850 |
|---|---|---|---|---|---|
| From: | — | HTEX | MEMBRANE | HTEX | MEMBRANE |
| To: | HTEX | MEMBRANE | HTEX | — | HLEAK |
| Temp | | | | | |
| K. | 293.15 | 251.15 | 251.15 | 289.1488 | 247.3781 |
| C. | 20 | −22 | −22 | 15.9988 | −25.7719 |
| Pres | | | | | |
| Pa | 6894800 | 6874100 | 158590 | 137900 | 6818200 |
| psia | 1000 | 997 | 23.0008 | 20.0008 | 988.8919 |
| Vapor Fraction | 1 | 1 | 1 | 1 | 1 |
| Total Flow: | | | | | |
| kgmol/s | 0.126 | 0.126 | 0.0053098 | 0.0053098 | 0.1207 |
| kg/s | 2.1975 | 2.1975 | 0.1939 | 0.1939 | 2.0037 |
| lbmol/hr | 1000 | 1000 | 42.1417 | 42.1417 | 957.8606 |
| lb/hr | 17441 | 17441 | 1538.5539 | 1538.5539 | 15903 |
| cu m/s | 0.039896 | 0.029908 | 0.069161 | 0.092017 | 0.028427 |
| Mole Fraction: | | | | | |
| CO2 | 0.05 | 0.05 | 0.7318 | 0.7318 | 0.020002 |
| CH4 | 0.95 | 0.95 | 0.2682 | 0.2682 | 0.98 |

| | Stream ID: | 851 | 852 | 653 |
|---|---|---|---|---|
| | From: | HLEAK | EXPAND | HTEX |
| | To: | EXPAND | HTEX | — |
| | Temp | | | |
| | K. | 247.8946 | 246.1832 | 289.1488 |
| | C. | −25.2554 | −26.9668 | 15.9988 |

TABLE 8A-continued

STREAM SUMMARY FOR METHANE PURIFICATION PROCESS WITH AN EXPANDER ON THE NON-PERMEATE PRODUCT STREAM

| Pres | | | |
|---|---|---|---|
| Pa | 6818200 | 6633200 | 6612600 |
| psia | 988.8919 | 962.07 | 959.07 |
| Vapor Fraction | 1 | 1 | |
| Total Flow: | | | 0.1207 |
| kgmol/s | 0.1207 | 0.1207 | 2.0037 |
| kg/s | 2.0037 | 2.0037 | 957.8606 |
| lbmol/hr | 957.8606 | 957.8606 | 15903 |
| lb/hr | 15903 | 15903 | 0.039431 |
| cu m/s | 0.028563 | 0.029098 | 1 |
| Mole Fraction: | | | |
| CO2 | 0.020002 | 0.020002 | 0.020002 |
| CH4 | 0.98 | 0.98 | 0.98 |

TABLE 8B

Low-Temperature Methane Purification Process with Expander: Major Equipment Summary

MEMBRANE MODULES

1 Module containing $1.4 \times 10^6$ TCHF BA PC fibers.

| | |
|---|---|
| Fiber ID (m): | $9.5 \times 10^{-5}$ |
| Fiber OD (m): | $1.35 \times 10^{-4}$ |
| Fiber Dense Region Thickness (m): | $7.4 \times 10^{-8}$ |
| Fiber Active Length (m): | 0.246 |
| Tubesheet Length (m): | 0.2032 |

MAIN HEAT EXCHANGER

Plate-and-fin heat exchanger with extended-surface-area fins.

Three sets of passages in counter-current arrangement.

Capacity, stream 1: 2.2 kg/s at 6895000 Pa from 20° C. to −22° C.

stream 2: 2.0 kg/s at 6633000 Pa from −27° C. to 16° C.

stream 3: 0.2 kg/s at 158600 Pa from −22° C. to 16° C.

Duty: 260 kW, maximum 4.0° C. warm-end temperature difference.

Maximum pressure drop: 20700 Pa each stream.

EXPANDER

Brake-loaded turbo-expander for extraction of 4.37 kW work.

Capacity: 2.0 kg/sec, 98 percent methane at 6818000 Pa, −25° C.

Pressure reduction to 6633000 Pa.

Minimum efficiency: 80 percent isentropic.

TABLE 8C

Equipment List Key For Table 8A

| | |
|---|---|
| HTEX | Main Heat Exchanger |
| MEMBRANE | Parallel Membrane Modules |
| HLEAK | Heat Leak Simulation |
| EXPAND | Expander |

EXAMPLE 9

Methane Purification Process With An External Refrigeration System.

Figure 9:
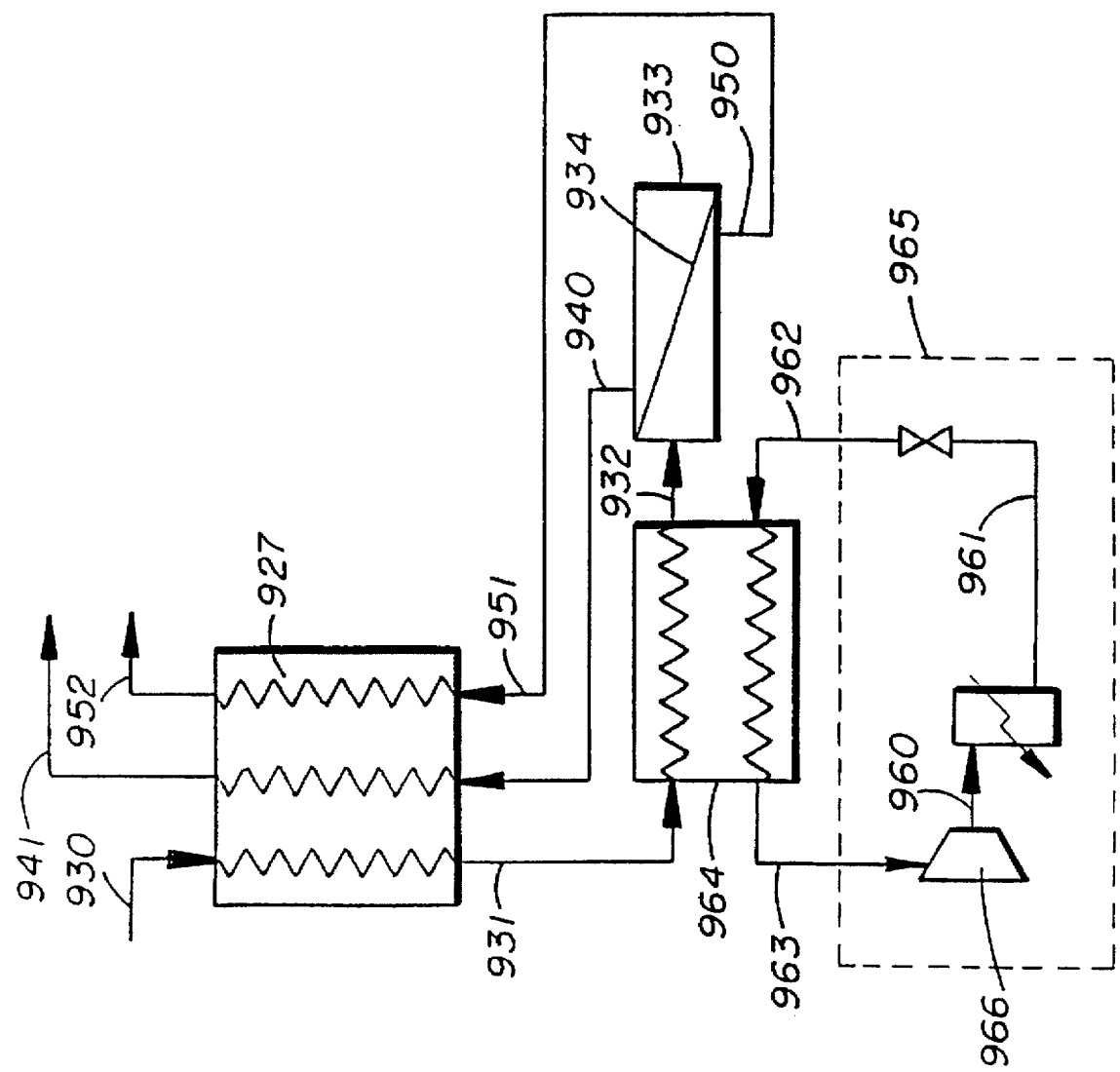
FIG. 9 illustrates in schematic form an apparatus useful for achieving an alternate embodiment of the method of the invention which employs an external Freon refrigeration system for cooling the feed gas mixture.

Example 9 is also a process to produce an enriched methane non-permeate product stream from methane/carbon dioxide mixtures. The feed gas stream and desired product specification for this Example is the same as in Example 8. A simplified flowsheet for a process to accomplish this separation is shown in FIG. 9. A summary of the major process streams is given in Table 9A, and the major process equipment is summarized in Table 9B. Definitions of abbreviations used are given in Table 9C.

This process is similar to that of Example 8, except that an external refrigeration system 965 is used in place of the expander to maintain the process equipment and streams at the desired operating temperature. The feed gas stream 930 for this Example is also assumed to be scrubbed and available at high pressure. The feed gas stream 930 enters a main heat exchanger 927, where it is cooled against warming product streams 940 and 951. The feed gas stream 931 then enters an evaporative heat exchanger 964, where it is cooled further against a boiling refrigerant in conduit 962. The liquid refrigerant is supplied by a simple single-stage refrigeration system 965, which operates in the same manner as the external refrigeration system described in Example 3. However, since the process operates at a warmer temperature than Example 3, a different refrigerant is used, and the refrigerant in conduit 960 leaves the refrigerator compressor 966 at a considerably higher temperature than in Example 3. The cold feed gas stream 932 leaving the evaporator 964 then enters the high pressure passages of the membrane device 933, and the carbon dioxide in the feed preferentially permeates through the membrane 934 to the low pressure passages of the membrane device 933. This leaves the high pressure non-permeate stream 950 exiting the membrane device 933 enriched in methane, while the low pressure permeate stream 940 exiting the membrane device 933 is enriched in carbon dioxide. The product streams 940 and 951 then enter the main heat exchanger 927, where they are warmed against the cooling feed gas stream 930. The high pressure methane-enriched permeate product stream 952 then enters the product pipeline. The low pressure carbon dioxide-enriched permeate product stream 941 is typically sent to a burner, where the heating value of the residual methane in the permeate stream is recovered.

This process demonstrates most of the same characteristics as Example 8. It also demonstrates the how the expander may be replaced with an external refrigeration system to maintain the process equipment at the desired temperature.

TABLE 9A

STREAM SUMMARY FOR METHANE PURIFICATION PROCESS WITH AN EXTERNAL REFRIGERATION SYSTEM

| Stream ID: | 930 | 931 | 932 | 940 | 941 |
|---|---|---|---|---|---|
| From: | — | HTEX | EVAP | MEMBRANE | HTEX |
| To: | HTEX | EVAP | MEMBRANE | HTEX | — |
| Temp | | | | | |
| K. | 293.15 | 252.43 | 251.15 | 251.15 | 289.1378 |
| C. | 20 | −20.72 | −22 | −22 | 15.9878 |
| Pres | | | | | |
| Pa | 6894800 | 6874100 | 6860300 | 158590 | 137900 |
| psia | 1000 | 997 | 995 | 23.0008 | 20.0008 |
| Vapor Fraction | 1 | 1 | 1 | 1 | |
| Total Flow: | | | | | |
| kgmol/s | 0.126 | 0.126 | 0.126 | 0.0053123 | 0.0053123 |
| kg/s | 2.1975 | 2.1975 | 2.1975 | 0.1939 | 0.1939 |
| lbmol/hr | 1000 | 1000 | 1000 | 42.1621 | 42.1621 |
| lb/hr | 17441 | 17441 | 17441 | 1538.959 | 1538.959 |
| cu m/s | 0.039896 | 0.030257 | 0.029983 | 0.069195 | 0.092058 |
| Mole Fraction: | | | | | |
| $CO_2$ | 0.05 | 0.05 | 0.05 | 0.7315 | 0.7315 |
| $CH_4$ | 0.95 | 0.95 | 0.95 | 0.2685 | 0.2685 |
| $CClF_2$ | 0 | 0 | 0 | 0 | 0 |

| Stream ID: | 950 | 951 | 952 | 960 | 961 |
|---|---|---|---|---|---|
| From: | MEMBRANE | HLEAK | HTEX | RCOMPR | RCNDNS |
| To: | HLEAK | HTEX | — | RCNDNS | RJT |
| Temp | | | | | |
| K. | 247.372 | 247.8943 | 289.1378 | 375.1013 | 299.814 |
| C. | −25.778 | −25.2557 | 15.9878 | 101.9513 | 26.664 |
| Pres | | | | | |
| Pa | 6804200 | 6804200 | 6783500 | 1103100 | 1089300 |
| psia | 986.8617 | 986.8617 | 983.8617 | 159.9844 | 157.9844 |
| Vapor Fraction | 1 | 1 | 1 | 1 | 0 |
| Total Flow: | | | | | |
| kgmol/s | 0.1207 | 0.1207 | 0.1207 | 0.00058576 | 0.00058576 |
| kg/s | 2.0036 | 2.0036 | 2.0036 | 0.05065 | 0.05065 |
| lbmol/hr | 957.8399 | 957.8399 | 957.8399 | 4.649 | 4.649 |
| lb/hr | 15902 | 15902 | 15902 | 401.993 | 401.993 |
| cu m/s | 0.028498 | 0.028636 | 0.038345 | 0.001532 | 4.8377E-05 |
| Mole Fraction: | | | | | |
| $CO_2$ | 0.019999 | 0.019999 | 0.019999 | 0 | 0 |
| $CH_4$ | 0.98 | 0.98 | 0.98 | 0 | 0 |
| $CClF_2$ | 0 | 0 | 0 | 1 | 1 |

| Stream ID: | 962 | 963 |
|---|---|---|
| From: | RJT | EVAP |
| To: | EVAP | RCOMPR |
| Temp | | |
| K. | 243.15 | 247.4367 |
| C. | −30 | −25.7133 |
| Pres | | |
| Pa | 164100 | 150310 |
| psia | 23.8011 | 21.8011 |
| Vapor Fraction | 0.2972 | 1 |
| Total Flow: | | |
| kgmol/s | 0.00058576 | 0.0058576 |
| kg/s | 0.05065 | 0.05065 |
| lbmol/hr | 4.649 | 4.649 |
| lb/hr | 401.993 | 401.993 |
| cu m/s | 0.0020867 | 0.0077362 |
| Mole Fraction: | | |
| $CO_2$ | 0 | 0 |
| $CH_4$ | 0 | 0 |
| $CClF_2$ | 1 | 1 |

TABLE 9B

Low-Temperature Methane Purification Process
with External Refrigeration: Major Equipment Summary

MEMBRANE MODULES

1 Module containing 1.4 × 10⁶ TCHF BA PC fibers.
| | |
|---|---|
| Fiber ID (m): | $9.5 \times 10^{-5}$ |
| Fiber OD (m): | $1.35 \times 10^{-4}$ |
| Fiber Dense Region Thickness (m): | $7.4 \times 10^{-8}$ |
| Fiber Active Length (m): | 0.247 |
| Tubesheet Length (m): | 0.2032 |

MAIN HEAT EXCHANGER

Plate-and-fin heat exchanger with extended-surface-area fins.
Three sets of passages in counter-current arrangement.

| Capacity, | stream 1: | 2.2 kg/s at 6895000 Pa from 20° C. to −20.7° C. |
|---|---|---|
| | stream 2: | 2.0 kg/s at 6804000 Pa from −25° C. to 16° C. |
| | stream 3: | 0.2 kg/s at 137900 Pa from −22° C. to 16° C. |

Duty: 251 kW, maximum 4.0° C. warm-end temperature difference.
Maximum pressure drop: 20700 Pa each stream.

EXTERNAL REFRIGERATOR COMPRESSOR

Reciprocating Freon-22 compressor with capacity to compress 0.051 kg/s from 150310 Pa to 1103000 Pa discharge pressure.
Motor capacity: 4.0 kW brake power.

EXTERNAL REFRIGERATOR CONDENSOR

Heat exchanger with capacity to condense 0.051 kg/s Freon-22 vapor at 1103000 Pa, 102° C. to liquid at 27° C. against 20° C. ambient air.
Expected duty: 12.2 kW.

EXTERNAL REFRIGERATOR EVAPORATOR

Evaporative heat exchanger with capacity to cool 2.2. kg/s methane at 6874000 Pa from −20.7° C. to −22° C. against −30° C. boiling Freon-22.
Expected duty: 8.3 kW.

TABLE 9C

Equipment List Key For TABLE 9A

| | |
|---|---|
| HTEX | Main Heat Exchanger |
| EVAP | External Refrigerator Evaporator |
| MEMBRANE | Parallel Membrane Modules |
| HLEAK | Heat Leak Simulation |
| RCOMPR | External Refrigerator Compressor |
| RCNDNS | External Refrigerator Condensor |
| RJT | External Refrigerator Expansion Valve |

EXAMPLE 10

Carbon Dioxide Recovery Process Without Expander Or External Refrigeration.

Figure 10:
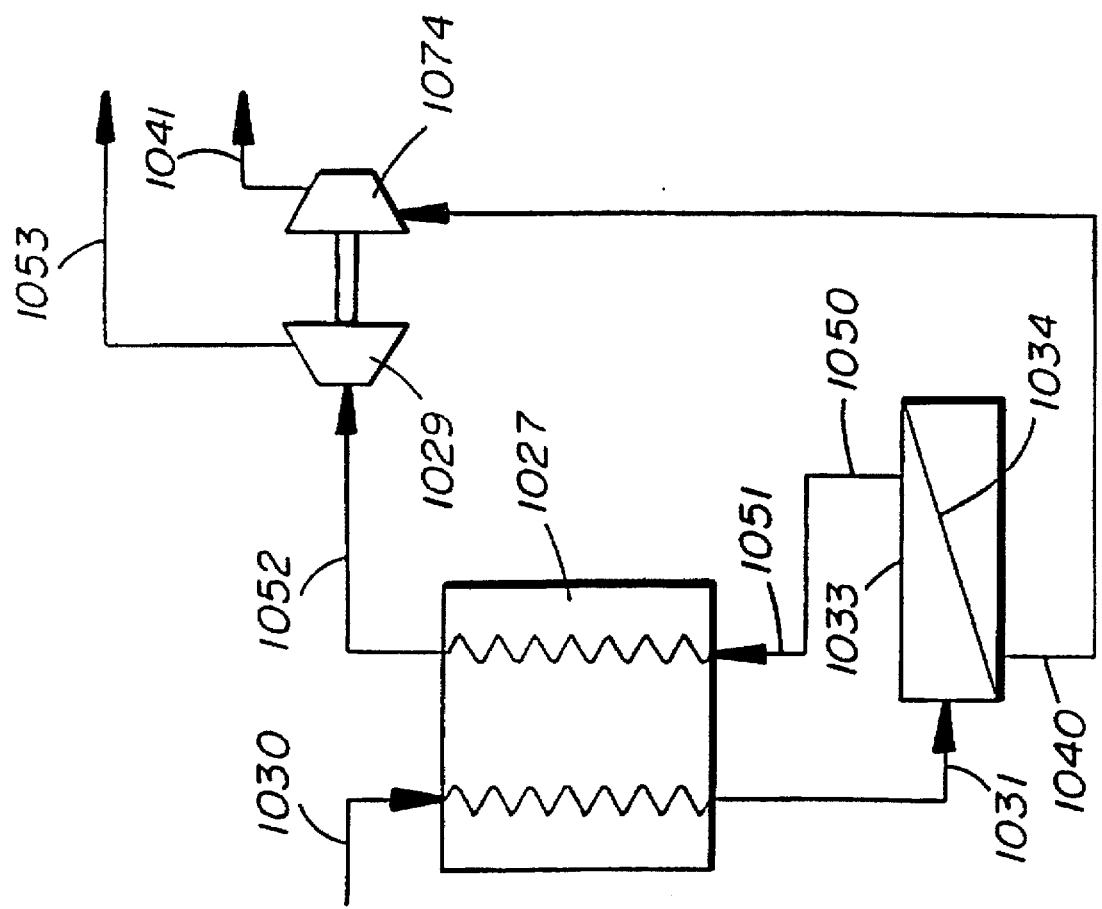
FIG. 10 illustrates in schematic form an apparatus for achieving an alternate embodiment of the invention which uses Joule-Thomson expansion of gas permeating through the membrane for cooling.

Example 10 is a process to produce an enriched carbon dioxide permeate product stream from methane/carbon dioxide mixtures. Similar separations are often encountered in the petroleum industry, where carbon dioxide is recovered from the gas products of enhanced oil recovery operations for reinjection. The feed gas stream is assumed to contain 40 percent methane and 60 percent carbon dioxide on a molar basis and to be available at 500 psia (3,450 kPa) pressure and ambient temperature. A product permeate stream containing a minimum concentration of 92 percent carbon dioxide on a molar basis is desired, with as high of a recovery of the carbon dioxide in the feed gas as is possible. The carbon dioxide-enriched permeate product stream will enter a pipeline for later compression to higher pressures, so it is desirable to use any available energy from the process to compress the permeate product stream to an intermediate pressure. A simplified flowsheet for a process to accomplish this separation is shown in FIG. 10. A summary of the major process streams is given in Table 10A, and the major process equipment is summarized in Table 10B. Definitions of abbreviations used are given in Table 10C.

The feed gas stream 1030 is assumed to be available at high pressure, so no compressive equipment is shown. The feed gas stream 1030 is also assumed to have been scrubbed, with all particulate, condensable, and corrosive components removed before entering the process. Product gases from enhanced recovery operations often contain higher hydrocarbons than methane, which are potentially condensable at low temperatures. These are assumed to have been removed before entering the process described here. The high pressure, scrubbed feed gas stream 1030 enters a main heat exchanger 1027, where it is cooled to −5° C. against the warming high pressure non-permeate product stream 1051. The cooled feed gas stream 1031 then enters the high pressure passages of the membrane device 1033, and the carbon dioxide in the feed preferentially permeates through the membrane 1034 to the low pressure passages of the membrane device 1033. This leaves the high pressure non-permeate stream 1050 exiting the membrane device 1033 enriched in methane, while the low pressure permeate stream 1040 exiting the membrane device 1033 is enriched in carbon dioxide. The high pressure methane-enriched non-permeate product stream 1051 from the membrane device 1033 then enters the main heat exchanger 1027, where it is warmed against the cooling feed gas stream 1030. The warm high pressure methane-enriched non-permeate product stream 1052 enters the expander 1029, which extracts some power from the stream, while lowering its pressure to near the ambient pressure. This methane-enriched non-permeate product stream 1053 is then typically sent to a burner, where the heating value of the residual methane is recovered. The cold carbon dioxide-enriched permeate product stream 1040 from the membrane device 1033 is sent directly to a compressor 1074, which uses the power extracted by the expander 1029 to compress the stream to an intermediate pressure. The carbon dioxide-enriched permeate product stream 1041 leaving the compressor 1074 then enters a pipeline, where it is sent to be reused for enhanced recovery operations.

This process demonstrates many of the same characteristics as Examples 8 and 9. Here, however, the low pressure permeate stream enriched in carbon dioxide is the desired product, rather than the high pressure non-permeate stream enriched in methane. Also, no process equipment is necessary to provide refrigeration to compensate for heat leaking into the process. The expander in this process is merely used to extract power from the high pressure product stream to recompress the low pressure product stream. No refrigerative process equipment is necessary here because of the magnitude of the self-refrigerative properties of carbon dioxide. The Joule-Thomson effect for carbon dioxide results in a considerable decrease in temperature associated with the decrease in pressure as the carbon dioxide permeates across the membrane. The magnitude of the Joule-Thomson effect is sufficient to maintain the process equipment at the desired operating temperature.

Table 10D contains a summary of Examples 8–10. Examples 8–9 illustrate the extremely low loss of methane in the carbon dioxide-enriched permeate stream. The BTU value of the permeate stream is high enough to justify burning the permeate stream to recover its heat value. The quantity of methane in the permeate stream, even if lost due to flaring, is still lower than the quantity of methane consumed to regenerate absorbent, if conventional absorption technology is to be used to remove the carbon dioxide, since conventional absorption technology uses as much as a cubic foot (CF) of methane per 1 CF or carbon dioxide removed. The methane is used to regenerate the absorbent. Example 10 illustrates a typical carbon dioxide recovery process for reinjection in an enhanced oil recovery process. Example 10 shows that almost 97 percent of the carbon dioxide is recovered for reinjection. Example 10 illustrates the advantage of the low temperature process over ambient temperature carbon dioxide recovery processes, which may recover only 50 percent of the carbon dioxide in the feed gas for reinjection.

TABLE 10B

Low-Temperature Membrane Carbon Dioxide Recovery Process: Major Equipment Summary

MEMBRANE MODULES

1 Module containing $1.4 \times 10^6$ TCHF BA PC fibers.

| | |
|---|---|
| Fiber ID (m): | $9.5 \times 10^{-5}$ |
| Fiber OD (m): | $1.35 \times 10^{-4}$ |
| Fiber Dense Region Thickness (m): | $7.4 \times 10^{-8}$ |
| Fiber Active Length (m): | 1.27 |
| Tubesheet Length (m): | 0.2032 |

TABLE 10A

STREAM SUMMARY FOR CARBON DIOXIDE RECOVERY PROCESS WITHOUT EXPANDER OR EXTERNAL REFRIGERATION

| Stream ID: | 1030 | 1031 | 1040 | 1041 | 1050 |
|---|---|---|---|---|---|
| From: | — | MAIN | MEMBRANE | COMPRESS | MEMBRANE |
| To: | MAIN | MEMBRANE | COMPRESS | — | HLEAK |
| Temp | | | | | |
| K. | 293.15 | 268.15 | 268.15 | 337.7619 | 198.2139 |
| C. | 20 | −5 | −5 | 64.6119 | −74.9361 |
| Pres | | | | | |
| Pa | 3447400 | 3426700 | 330960 | 726210 | 3238700 |
| psia | 500 | 497 | 48.0017 | 105.3279 | 469.7359 |
| Vapor Fraction | 1 | 1 | 1 | 1 | 1 |
| Total Flow: | | | | | |
| kgmol/s | 0.126 | 0.126 | 0.07676 | 0.07676 | 0.049238 |
| kg/s | 4.1356 | 4.1356 | 3.2755 | 3.2755 | 0.8601 |
| lbmol/hr | 1000 | 1000 | 609.2182 | 609.2182 | 390.7813 |
| lb/hr | 32823 | 32823 | 25997 | 25997 | 6826.1901 |
| cu m/s | 0.77401 | 0.066609 | 0.5055 | 0.2902 | 0.018135 |
| Mole Fraction: | | | | | |
| CO2 | 0.6 | 0.6 | 0.9522 | 0.9522 | 0.050964 |
| CH4 | 0.4 | 0.4 | 0.047822 | 0.047822 | 0.949 |

| | Stream ID: | 1051 | 1052 | 1053 |
|---|---|---|---|---|
| | From: | HLEAK | MAIN | EXPAND |
| | To: | MAIN | EXPAND | — |
| | Temp | | | |
| | K. | 206.5017 | 274.7477 | 140.1794 |
| | C. | −66.6483 | 1.5977 | −132.9706 |
| | Pres | | | |
| | Pa | 3238700 | 3218000 | 115140 |
| | psia | 469.7359 | 466.7359 | 16.7 |
| | Vapor Fraction | 1 | 1 | 1 |
| | Total Flow: | | | |
| | kgmol/s | 0.049238 | 0.049238 | 0.049238 |
| | kg/s | 0.8601 | 0.8601 | 0.8601 |
| | lbmol/hr | 390.7813 | 390.7813 | 390.7813 |
| | lb/hr | 6826.1901 | 6826.1901 | 6826.1901 |
| | cu m/s | 0.020062 | 0.03245 | 0.4878 |
| | Mole Fraction: | | | |
| | CO2 | 0.050964 | 0.050964 | 0.050964 |
| | CH4 | 0.949 | 0.949 | 0.949 |

TABLE 10B-continued

Low-Temperature Membrane Carbon Dioxide Recovery Process: Major Equipment Summary

MAIN HEAT EXCHANGER

Plate-and-fin heat exchanger with extended-surface-area fins.
Two sets of passages in counter-current arrangement.

| | |
|---|---|
| Capacity, stream 1: | 4.14 kg/s at 3448000 Pa from 20° C. to −5° C. |
| stream 2: | 0.86 kg/s at 3239000 Pa from −67° C. to 1.6° C. |

Duty: 145 kW, maximum 4.0° C. warm-end temperature difference.
Maximum pressure drop: 20700 Pa each stream.

EXPANDER

Brake-loaded turbo-expander for extraction of 192 kW work.
Capacity: 0.86 kg/sec, 95 percent methane at 3218000 Pa, 1.6° C.
Pressure reduction to 115200 Pa.
Minimum efficiency: 80 percent isentropic.

CO₂ COMPRESSOR

Expander-driven single-stage centrifugal compressor.
Capacity: 3.28 kg/s 95 percent $CO_2$ at 726200 Pa discharge pressure.
Feed conditions: 330960 Pa, −5° C.
Minimum stage efficiency: 80 percent isentropic.

TABLE 10C

Equipment List Key For Table 10A

| | |
|---|---|
| HTEX | Main Heat Exchanger |
| MEMBRANE | Parallel Membrane Modules |
| HLEAK | Heat Leak Simulation |
| EXPAND | Expander |
| COMPRESS | Product Carbon Dioxide Compressor |

TABLE 10D

SUMMARY OF CARBON DIOXIDE/METHAME MEMBRANE PROCESSES

| Description | Example 8 | Example 9 | Example 10 |
|---|---|---|---|
| | Methane Purification | Methane Purification | Carbon Dioxide Recovery |
| Size Module Required (Active Fiber Length (m)) | 0.246 | 0.247 | 1.27 |
| Desired Product Purity (Mole percent methane) | <98.0 | 98.0 | <5.0 |
| Methane Recovery (Percent of feed methane) | 98.8 | 98.8 | N.A. |
| Carbon Dioxide Recovery (Percent of feed carbon dioxide) | N.A. | N.A. | 96.7 |

EXAMPLE 11

Low Temperature Membrane Process Designs: Comparative Example.

This Example is intended to compare the productivity and power costs for nitrogen production using a commercial membrane material not within the scope of this invention and the low temperature membrane material PBO A of this invention. Four process simulations, using commercially available software for process engineering, were completed. The first two processes use hollow fibers operated at 20° C. The third process uses PBO A hollow fibers operated at −60° C. using an expander on the non-permeate stream, as described in Example 1. The fourth process uses PBO A hollow fibers operating at −60° C. using an external refrigeration system to cool the feed gas stream to the operating temperature, as described in Example 3 without the main heat exchangers. The last process is included to demonstrate the power savings associated with the use of the main heat exchangers.

The calculations were done using a membrane device containing 1,400,000 fibers with a 1.5748 meter (m) active length and 0.2032 m tubesheet thickness. The fibers were assumed to have an outside diameter of $1.35 \times 10^{-4}$ m, an inside diameter of $9.5 \times 10^{-5}$ m, and an internal discriminating region with a 740 Angstrom thickness. The commercial membrane performance characteristics used for the comparison were an oxygen/nitrogen separation factor of 7.4 and an oxygen permeability of 0.85. The desired gas product was specified to be at 125 psig (965 kPa) pressure and to contain no more than 1.0 percent oxygen. Table 11 lists the process recovery, productivity of each membrane module, and power cost to produce a specified amount of product. This Table demonstrates that a module containing PBO A membranes is significantly more productive than a module containing the commercial membranes not within the scope of this invention, and that the process described in Example 1 produces nitrogen at a significantly lower power cost.

TABLE 11

Comparison of Membrane Processes

| Membrane Material | Commercial Membrane | PBO A | |
|---|---|---|---|
| Operating Temperature (° C.) | 20 | 20 | −60 | α |
| Operation | | | Example 1 | Example 3 without main heat exchangers |
| Recovery (percent of feed air) | 38.3 | 32.8 | 52.0 | 50.1 |
| Productivity (SCFH N₂/module) | 811 | 16150 | 2930 | 2250 |
| Power Cost (kW/100 SCF N₂) | 0.73 | 0.93 | 0.60 | 0.97 |

General Method of Preparation of Membrane Samples and Evaluation in Examples 12–22.

Films for transport testing were generally fabricated by preparing a solution of from about 1 to about 10 percent of a polymer using the solvent indicated for each polymer, filtering the solution using a 5 micron filter, and casting the solution onto a clean glass plate. The solvent was allowed to evaporate at a slow rate by partially covering the plate with a watch glass, which was supported a few millimeters above the surface of the solution. After the solvent evaporated to dryness, the films were removed from the plate. Residual solvent was removed by placing the film in a vacuum oven at temperatures slightly below the softening temperature of the film (typically 160° C. for polycarbonates and 300° C. for the PBO materials) for at least 24 hours.

From the dried films, circular samples were cut for testing. These samples varied in size, but generally were between 3 centimeters (cm) and 6 cm in diameter. The thickness of the film specimens was measured by means of a film dial micrometer. These specimens were then mounted in cells which sealed against the film to produce a feed and non-permeate chamber in contact with the first side of the membrane and a permeate chamber in contact with the second side of the membrane. The feed chamber was pressurized with a flowing stream of the feed gas mixture, and the permeate chamber was maintained near zero psi absolute (psia) by the testing system. The feed chamber was designed in such a manner as to insure that all areas of the membrane specimen were exposed to the same feed gas mixture composition.

The analysis of the permeating gas stream consisted of the determination of both identity and quantity of each gas in the stream using a mass spectrometer. Calibration of the spectrometer was carried out periodically during the experiments by substituting a gas supply of known composition and flow rate for the unknown gas stream from the membrane cell. The feed gas stream gas a binary mixture having one of the following compositions.

| Feed Gas | Composition (Mole Percent) |
|---|---|
| oxygen | 20 |
| nitrogen | 80 |
| carbon dioxide | 5 |
| methane | 95 |
| helium | 5 |
| methane | 95 |

Feed gas pressures were generally maintained at about 20 to 45 psia (135 to 305 kPa) with a flow rate of about 25 cubic centimeters per minute (cc/min) through the feed chamber. Transport property measurements were carried out over a wide range of temperatures by controlling the temperature of the cell holder through the circulation of a heat transfer fluid for temperatures between –5° C. and 90° C. Measurements at temperatures as low as –30° C. were made by circulating liquid nitrogen through the coils in the cell holder. Measurements at still colder temperatures were made by mounting the permeation cell on the cold finger of a variable temperature, closed cycle, helium refrigerator cryostat (Janis Corp.).

The results of the gas transport characterization measurements are expressed in terms of the permeability of the highest permeability gas in units of barrers, where 1 barrer=$1.0 \times 10^{-10} (cm^3(STP)cm)/(cm^2 \; sec \; cmHg)$ and selectivity, $\alpha$, which is defined as the ratio of the higher permeability gas to the lower permeability gas. The results for the examples are summarized in the tables hereafter.

In each example, membrane characteristics of a polymer film were evaluated using the procedures described hereinabove. Data for Examples 12 to 21 are reported respectively in Tables 12A to 22.

In Example 12, poly-4-methylpentene (PMP), available from Mitsui Petrochemical Industries Ltd. as "TPX Grade DX-810", was melt-extruded to form a 30 micron thick film, which was used as a membrane.

In Example 13, tetrachlorohexafluoro bisphenol A polycarbonate (TCHF BA PC) was evaluated as a membrane. The TCHF BA PC was prepared as follows. A four necked 1.0 liter round bottom flask equipped with a thermometer, condenser, phosgene/nitrogen inlet, and a paddle stirrer connected to a Cole Parmer servodyne was charged with about 500 cubic centimeters of methylene chloride, 47.39 grams (0.1 moles) of tetrachlorohexafluoro bisphenol A, and 23.7 grams (0.3 moles) of pyridine. The resultant clear solution was stirred under a nitrogen atmosphere for ten minutes. Moderate stirring was continued and about 9.9 grams (0.1 moles) of phosgene were bubbled into the reaction mixture over a period of 27 minutes. The reaction mixture was then scavenged with methanol, neutralized with dilute hydrochloric acid, and washed a second time with dilute hydrochloric acid. The solution was then passed through DOWEX NSC-1 cation exchange resin (available from the Dow Chemical Company) and the polymer was isolated by precipitation using hexane. The precipitated polymer was dried under vacuum at about 120° C. for 48 hours. The resultant polycarbonate was found to have an inherent viscosity of about 0.29 dL/g at 25° C. in methylene chloride. a homogeneous thin film was cast from a methylene chloride solution containing about 10 weight percent of the polymer.

In Example 14, tetrabromohexafluoro bisphenol A isophthlate ester (TBHF BA IE) was evaluated as a membrane. The TBHF BA IE was prepared as follows. A four necked 1.0 liter round bottom flask equipped with a thermometer, condenser, phosgene/nitrogen inlet, and a paddle stirrer connected to a Cole Parmer servodyne was charged with about 500 cubic centimeters of methylene chloride, 41.68 grams (0.064 moles) of tetrabromohexafluoro bisphenol A, and 19.1 grams (0.241 moles) of pyridine. The resultant clear solution was stirred under a nitrogen atmosphere for ten minutes. Moderate stirring was continued and about 12.98 grams (0.064 moles) of isophthaloyl chloride was added to the solution over a period of 20 minutes. The reaction mixture was then scavenged with methanol, neutralized with dilute hydrochloric acid, and washed a second time with dilute hydrochloric acid. The solution was then passed through a DOWEX MSC-1 cation exchange resin and the polymer was isolated by precipitation using hexane. The precipitated polymer was dried under vacuum at about 120° C. for 48 hours. The resultant polyisophthalate was found to have an inherent viscosity of about 0.16 dL/g at 25° C. in methylene chloride. A homogeneous thin film was cast from a methylene chloride solution containing about 10 weight percent or the polymer.

In Example 15, a polybenzoxazole having the formula of PBO A was evaluated as a membrane. The PBO A was prepared as follows. A mixture of about 258 grams of 81 percent polyphosphoric acid (PPA) and 10.00 grams of diaminoresorcinol dihydrochloride (DAR) was placed in a 500 milliliter resin kettle. The resin kettle was equipped with a nitrogen inlet, silicone oil heating bath, stainless-steel stirring shaft, and a high-torque stirrer. The mixture was heated at about 110° C. for 16 hours. At this time about 89 grams of phosphorous pentoxide ($P_2O_5$) and 15.23 grams of 1,1,3-trimethyl-3-phenylindan-4,5'-dicarboxylic acid (PIDA) were added. The reactants were heated according to the following schedule: about 7 hours at 110° C., 16 hours at 150° C., 24 hours at 180° C., and 24 hours at 190° C. The crude polymer was isolated by precipitating into water, vacuum filtrating, washing with hot water and methanol, and finally drying in a vacuum oven. The polymer was soluble in m-cresol, trifluoroacetic acid, and methane sulfonic acid. A homogeneous thin film was cast from a m-cresol solution containing about 8 weight percent of the polymer.

In Example 16, a polybenzoxazole having the formula of PBO B was tested. The PBO B was prepared as follows. A mixture of about 55 grams of 81 percent polyphosphoric acid, 5.33 grams of 2,2-bis(3-amino-4-hydroxyphenyl)-1,1, 1,3,3,3-hexafluoropropane, 20 grams of phosphorous pentoxide ($P_2O_5$), and 3.76 grams of diphenylether-4,4'-dicarboxylic acid were placed in a 500 ml resin kettle. The resin kettle was equipped with a nitrogen inlet, silicone oil heating bath, stainless-steel stirring shaft, and a high-torque stirrer. The reactants were heated according to the following schedule: about 2 hours at 70° C., 2 hours at 140° C., 2 hours at 160° C., 8 hours at 180° C., and 3 hours at 200° C. The crude polymer was isolated by precipitating into water, vacuum filtrating, washing with hot water and methanol, and finally drying in a vacuum oven. The polymer was soluble in m-cresol, trifluoroacetic acid, and methane sulfonic acid. A homogeneous thin film was cast from a m-cresol solution containing about 10 weight percent of the polymer.

In Example 17, polyphenylene oxide (PPO) was evaluated as a membrane. The PPO was obtained as a commercial polymer from Aldrich Chemical Company. A film about 25 microns thick was compression molded at about 300° C.

In Example 18, a polymer formed by the condensation of hexafluoro bisphenol A and decafluoro bisphenyl (HFBA/DFBP) was evaluated as a membrane. The HFBA/DFBP was synthesized by the following procedure. Hexafluoro bisphenol A, about 25.15 grams (0.748 mol), decafluoro bisphenyl, about 25.00 grams (0.0748 mol), potassium carbonate, about 41.37 grams (0.299 mol), and dimethylacetamide, 275 milliliters, were added to a 500 milliliter three necked round bottom flask fitted with a mechanical stirrer, thermometer, and a nitrogen inlet. The mixture was stirred and heated to approximately 60° C. under a nitrogen atmosphere for approximately 12 hours. The mixture was then poured into 6 liters of water with stirring. The white solid that formed was isolated by filtration and allowed to stand in 3 liters of water overnight. The solid was then isolated by filtration. The solid was dissolved in approximately 400 milliliters of methylene chloride, dried with magnesium sulfate, filtered through filter aid, and precipitated with stirring into 2 liters of methanol. The solid was isolated by filtration, then allowed to stand in 1 liter of methanol overnight. The solid was isolated by filtration and dried in a vacuum oven at about 30° C. to give about 36.00 grams of a white solid, representing a 76 percent yield. The inherent viscosity of the material was determined in chloroform to be about 1.064. Analysis by Differential Scanning Calorimetry (DSC) indicated a glass transition temperature of approximately 180° C. Proton NMR analysis of the product was consistent with the structure of the desired product. A membrane was prepared by casting a film from a solution containing about 10 weight percent of the polymer in methylene chloride.

In Example 19, an indan-containing polyimide derived from the condensation of pyromellitic dianhydride and 1,1,3-trimethyl-3-phenylindan-4',5-diamine (PMDA/PIDA) was evaluated as a membrane. To form the monomer, about 100 grams (0.308 mol) of 1,1,3-trimethyl-3-phenylindan-4,5'-dicarboxylic acid, available from Amoco, was added to about 375 milliliters of concentrated sulfuric acid in a 4 liter beaker. About 2,500 milliliters of chloroform was added to the beaker to form a two phase mixture. The mixture was stirred at about 40° C. to 45° C. Over a period of about 45 minutes, sodium azide, about 48.8 grams (0.751 mol), was added slowly. The temperature was maintained below about 45° C. during the addition of sodium azide. The temperature was then raised to about 55° C. for about one hour and the mixture was subsequently cooled to room temperature. The solution was made basic by the careful addition of sodium hydroxide, which caused some of the diamine to precipitate as a paste. The paste was collected, dissolved in methylene chloride and combined with the organic fraction. The organic solutions were washed with water and dried with anhydrous potassium carbonate. The solvent was removed by rotary evaporation, and the resulting semi-solid was crystallized from a mixture of ether/hexane. The monomer product yield of about 52.5 grams was about 64 percent. The monomer product had a melting point of about 94° C. to 95° C. To form the polymer, into a 100 milliliter round bottom flask was added about 2.000 grams (7.508 mmols) of 5-amino-1,1,3-trimethyl-3-(4-aminophenyl)indan, about 1.638 grams (7.508 mmols) of 1,2,4,5-benzenetetracarboxylic dianhydride, about 0.75 grams (5.8 mmols) of isoquinoline, and about 36 milliliters of m-cresol. The flask was fitted with a condenser, sparged with dry nitrogen, and stirred with a magnetic stir bar while being refluxed for about one hour at about 200° C. The solution was cooled to about 80° C. and the viscous solution was poured into about 200 milliliters of methanol. After breaking up the fibrous solids in a blender, the resulting yellow solid was washed with methanol and dried under vacuum at about 100° C. for about 12 hours. About a 5 percent solution of the indan-containing polyimide in hot m-cresol was prepared. The solution was cast onto a clean glass plate using a 20 mil casting knife. The solvent was removed from the film under a nitrogen purge in about a 100° C. oven over a period of about three hours. The plate and film were removed from the oven and allowed to cool. The film was removed from the plate by immersion in water. The film was dried under vacuum at about 300° C. for about 30 minutes.

In Example 20, a polymer derived from the condensation of 1,4-diaminobenzene-2,5-dithiol dihydrochloride and 1,1,3-trimethyl-3-phenylindan-4',5-dicarboxylic acid (DABT/PIDA) was evaluated as a membrane. DABT/PIDA was synthesized by adding to a 1 liter resin kettle about 5.00 grams (0.0204 mole) of 1,4-diaminobenzene-2,5-dithiol dihydrochloride, about 6.615 grams (0.0304 mol) of 1,1,3-trimethyl-3-phenylindan-4'5-dicarboxylic acid (PIDA), and about 184 grams of 85 percent polyphosphoric acid. The vessel was continuously sparged with nitrogen and an air-driven stainless steel stirrer was used for mixing. The reaction mixture was heated according to the following schedule: about 16 hours at about 50° C., about 8 hours at about 90° C., and about 20 hours at about 110° C. About 8 grams of phosphorous pentoxide ($P_2O_5$) was added, and the mixture heated at about 135° C. for about 24 hours, about 150° C. for about 8 hours, and finally at about 190° C. for about 24 hours. The extremely viscous solution was coagulated using a blender and 2 liters of water, filtered, washed with water, washed with methanol, and dried under vacuum at about 150° C. This yielded about 8.5 grams of a light green polymer having an intrinsic viscosity of about 18 dL/gram in methane sulfonic acid/methane sulfonic anhydride. To prepare a film from the polymer, about 0.5 grams of the polymer and 12 grams or m-cresol were placed in a small vial. The contents of the vial were heated and stirred to dissolve the polymer in the solvent. The viscous brown solution was pressure-filtered through a 10 micron teflon filter; the solution was cast on a clean glass plate and placed in a 50° C. oven under a nitrogen stream for about 3 hours. A vacuum was applied to the oven for about 3 hours, and the temperature then raised to about 110° C. for about 2 hours. The cooled plate and film were placed in a tray or distilled water to aid in the removal of the film from the plate. The film was dried for about 1 hour under vacuum at about 300° C.

In Example 21, 9,9-bis(3,5-dibromo-4-hydroxyphenyl) fluorene polycarbonate (TBF PC) was evaluated as a membrane. The TBF PC was prepared as follows. A three necked 0.5 liter round bottom flask equipped with a condenser, phosgene/nitrogen inlet, and a paddle stirrer connected to a Cole Parmer servodyne was charged with about 237 cubic centimeters of methylene chloride, 30.80 grams (0.046 moles) of 9,9-bis(3,5-dibromo-4-hydroxyphenyl)fluorene, and 10.9 grams (0.138 moles) of pyridine. The resultant clear solution was starred under a nitrogen atmosphere and about 4.6 grams (0.046 moles) or phosgene were bubbled into the reaction mixture over a period of about 7 minutes. An additional quantity or about 1.0 gram (0.010 moles) of phosgene was bubbled in over about 18 minutes and the reaction mixture was stirred for about 16 hours. The reaction mixture was then scavenged with methanol, diluted with about 50 cubic centimeters or methylene chloride, washed twice with dilute hydrochloric acid, and then passed through DOWEX MSC-1 ion exchange resin. The polymer was isolated by adding the methylene chloride solution of polymer to a mixture of hexane/acetone. The precipitated polymer was dried under vacuum at about 120° C. for about 48 hours. The resultant polycarbonate was found to have an inherent viscosity of about 0.48 dL/g at 25° C. in methylene chloride. A homogeneous thin film was east from a methylene chloride solution containing about 10 weight percent of the polymer (labelled TBF PC #1 in Table 21).

A larger scale preparation of TBF PC was conducted as follows. A four necked 2.0 liter round bottom flask equipped with a thermometer, condenser, phosgene/nitrogen inlet, and a paddle stirrer connected to a Cole Parmer servodyne was charged with about 1.0 liter of methylene chloride, 129.95 grams (0.194 moles) of 9,9-bis(3,5-dibromo-4-hydroxyphenyl)fluorene, and 46.0 grams (0.582 moles) of pyridine. The resultant clear solution was stirred under a nitrogen atmosphere and about 20.2 grams (0.204 moles) of phosgene were bubbled into the reaction mixture over a period of about 36 minutes. The reaction mixture was stirred for about 18 hours, 1.0 gram of 9,9-bis(3,5-dibromo-4-hydroxyphenyl)fluorene was added, the reaction mixture was stirred for about 50 minutes, and about 0.1 gram of phosgene was added. The reaction mixture was stirred for about 30 minutes, was diluted with about 200 cubic centimeters methylene chloride, and was then scavenged with methanol. The reaction mixture was washed twice with dilute hydrochloric acid and then passed through DOWEX MSC-1 ion exchange resin. The polymer was isolated by adding the methylene chloride solution of polymer to a mixture of hexane/acetone. The precipitated polymer was dried under vacuum at about 120° C. for about 72 hours. The resultant polycarbonate was found to have an inherent viscosity of about 0.81 dL/g at 25° C. in methylene chloride. A homogeneous thin film was cast from a methylene chloride solution containing about 10 weight percent of the polymer (labelled TBF PC #2 in Table 21).

In Example 22, 9,9-bis(3,5-dichloro-4-hydroxyphenyl)fluorene polycarbonate (TCF PC) was evaluated as a membrane. The TCF PC was prepared as follows. A three necked 0.5 liter round bottom flask equipped with a condenser, phosgene/nitrogen inlet, and a paddle stirrer connected to a Cole Parmer servodyne was charged with about 150 cubic centimeters of methylene chloride, 19.00 grams (0.039 moles) of 9,9-bis(3,5-dichloro-4-hydroxyphenyl)fluorene, and 9.25 grams (0.117 moles) of pyridine. The resultant clear solution was stirred under a nitrogen atmosphere and about 4.0 grams (0.040 moles) of phosgene were bubbled into the reaction mixture over a period of about 12 minutes. The reaction mixture was stirred for about 1 hour and was then scavenged with methanol. The reaction mixture was washed twice with dilute hydrochloric acid, then with water, and then passed through DOWEX MSC-1 ion exchange resin. The polymer was isolated by adding the methylene chloride solution of polymer to a mixture of hexane/acetone. The precipitated polymer was dried under vacuum at about 120° C. for about 48 hours. The resultant polycarbonate was found to have an inherent viscosity of about 0.55 dL/g at 25° C. in methylene chloride. A homogeneous thin film was east from a methylene chloride solution containing about 10 weight percent of the polymer.

The results for each example are tabulated hereafter in tables identified by the example number. Although relatively low transmembrane pressures were employed in most of the examples, evaluations at a transmembrane pressure of 165 psia (1140 kPa) produced results similar to those at lower pressure for oxygen/nitrogen.

TABLE 12A

EXAMPLE 12 - PMP

| Temperature (°C.) | Oxygen Permeability (Barrers) | Nitrogen Permeability (Barrers) | Selectivity |
|---|---|---|---|
| −44.0 | 7.2 | 1.1 | 6.5 |
| −37.0 | 6.4 | 1.0 | 6.4 |
| −13.0 | 10.5 | 1.9 | 5.5 |
| −6.0 | 13.6 | 2.2 | 6.2 |
| −6.0 | 13.9 | 2.2 | 6.3 |
| −4.0 | 12.1 | 2.4 | 5.0 |
| 5.0 | 18.3 | 3.4 | 5.4 |
| 5.0 | 19.0 | 3.5 | 5.4 |
| 12.0 | 20.9 | 4.1 | 5.1 |
| 12.0 | 21.8 | 4.3 | 5.1 |
| 21.0 | 26.2 | 5.4 | 4.9 |
| 21.0 | 27.5 | 5.7 | 4.8 |
| 31.0 | 32.9 | 7.2 | 4.6 |
| 31.0 | 34.7 | 7.6 | 4.6 |
| 39.0 | 36.5 | 8.8 | 4.1 |
| 39.0 | 39.2 | 9.3 | 4.2 |
| 46.0 | 41.3 | 10.3 | 4.0 |
| 46.0 | 45.9 | 11.4 | 4.0 |

TABLE 13

EXAMPLE 13 - TCHF BA PC

A

| Temperature (°C.) | Oxygen Permeability (Barrers) | Nitrogen Permeability (Barrers) | Selectivity |
|---|---|---|---|
| −71 | 4.7 | 0.3 | 15.3 |
| −52 | 6.0 | 0.6 | 10.9 |
| −39 | 4.4 | 0.4 | 10.7 |
| −39 | 4.5 | 0.5 | 10.0 |
| −39 | 3.4 | 0.3 | 12.0 |
| −38 | 3.8 | 0.3 | 11.4 |
| −38 | 3.2 | 0.3 | 12.7 |
| −32 | 4.3 | 0.5 | 9.7 |
| −29 | 7.7 | 0.8 | 9.3 |
| −29 | 5.6 | 0.6 | 10.0 |
| −27 | 3.8 | 0.4 | 8.6 |
| −21 | 8.0 | 1.0 | 8.0 |
| −20 | 6.6 | 0.7 | 9.4 |
| −18 | 4.6 | 0.7 | 6.9 |
| −10 | 5.2 | 0.8 | 6.6 |
| −7 | 8.0 | 1.1 | 7.5 |
| −6 | 6.6 | 1.0 | 7.0 |
| −1 | 6.1 | 0.9 | 6.6 |
| 1 | 9.1 | 1.3 | 7.0 |
| 8 | 7.1 | 1.3 | 5.6 |
| 10 | 9.1 | 1.5 | 6.3 |
| 22 | 6.0 | 1.1 | 5.5 |
| 22 | 5.6 | 1.1 | 5.3 |
| 22 | 5.6 | 1.0 | 5.6 |
| 23 | 6.3 | 1.1 | 5.6 |
| 23 | 7.3 | 1.3 | 5.5 |
| 23 | 15.9 | 4.2 | 3.7 |
| 23 | 7.3 | — | — |
| 30 | 12.8 | 2.5 | 5.1 |
| 30 | 13.5 | 2.7 | 5.0 |
| 30 | 11.0 | 2.1 | 5.2 |
| 30 | 13.9 | 2.7 | 5.1 |
| 30 | 8.6 | 2.0 | 4.2 |
| 30 | 9.2 | 1.9 | 4.8 |
| 50 | 14.7 | 3.1 | 4.7 |
| 50 | 6.6 | 3.4 | 4.9 |
| 50 | 10.2 | 2.3 | 4.5 |
| 50 | 10.8 | 2.4 | 4.5 |

TABLE 13-continued

EXAMPLE 13 - TCHF BA PC

| | | | |
|---|---|---|---|
| 75 | 20.1 | 5.4 | 3.7 |
| 75 | 19.5 | 4.8 | 4.1 |
| 75 | 13.8 | 3.5 | 4.0 |
| 90 | 16.3 | 4.6 | 3.5 |
| 100 | 24.4 | 6.7 | 3.7 |
| 100 | 39.0 | 9.3 | 4.2 |
| 100 | 24.0 | 6.7 | 3.6 |

B

| Temperature (°C.) | Carbon Dioxide Permeability (Barrers) | Methane Permeability (Barrers) | Selectivity $CO_2/CH_4$ |
|---|---|---|---|
| −34 | 23.3 | 0.08 | 280 |
| −34 | 35.1 | 0.18 | 196 |
| −34 | 23.8 | 0.07 | 339 |
| −31 | 27.4 | 0.08 | 338 |
| −31 | 23.1 | 0.09 | 254 |
| −23 | 24.4 | 0.14 | 176 |
| −22 | 33.1 | 0.19 | 172 |
| −22 | 25.8 | 0.17 | 157 |
| −13 | 25.4 | 0.22 | 116 |
| −11 | 28.8 | 0.49 | 58.4 |
| −10 | 11.4 | — | — |
| −6 | 20.0 | 0.11 | 178 |
| −5 | 15.4 | — | — |
| −5 | 23.9 | 0.24 | 99.9 |
| −2 | 28.7 | 0.33 | 87.8 |
| −1 | 37.5 | 0.38 | 100 |
| 0 | 32.5 | 0.13 | 260 |
| 8 | 37.8 | 0.51 | 74.0 |
| 12 | 16.1 | — | — |
| 30 | 12.9 | 1.56 | 8.3 |
| 30 | 43.6 | 1.00 | 43.6 |
| 37 | 37.3 | 1.09 | 34.3 |
| 50 | 33.1 | 1.02 | 32.6 |
| 50 | 38.4 | 0.89 | 43.3 |
| 50 | 45.9 | 1.46 | 31.5 |
| 75 | 78.2 | 2.42 | 32.4 |
| 95 | 55.1 | 3.50 | 15.7 |

C

| Temperature (°C.) | Helium Permeability (Barrers) | Methane Permeability (Barrers) | Selectivity $He/CH_4$ |
|---|---|---|---|
| −33 | 36.1 | — | — |
| −33 | 39.5 | 0.13 | 304 |
| −33 | 31.6 | 0.11 | 290 |
| −30 | 22.2 | — | — |
| −29 | 24.0 | 0.14 | 177 |
| −23 | 34.8 | 0.14 | 244 |
| −22 | 27.2 | 0.17 | 158 |
| −20 | — | 0.23 | — |
| −20 | 45.3 | 0.26 | 176 |
| −15 | 49.6 | — | — |
| −12 | 38.1 | 0.28 | 138 |
| −11 | 32.6 | 0.22 | 151 |
| −9 | 75.0 | 0.41 | 183 |
| −4 | 94.5 | 0.54 | — |
| −4 | 94.5 | — | — |
| −1 | 73.0 | 0.30 | 241 |
| 2 | 91.9 | 0.48 | 193 |
| 4 | 39.0 | 0.33 | 120 |
| 6 | 66.7 | 0.47 | 143 |
| 7 | 43.5 | 0.41 | 105 |
| 15 | 80.5 | 0.76 | 106 |
| 30 | 105 | 0.90 | 116 |
| 30 | 78.1 | 0.78 | 99.6 |
| 30 | 78.5 | 1.00 | 98.8 |
| 30 | 98.1 | 0.97 | 101 |
| 30 | 71.4 | 1.02 | 69.8 |
| 30 | 57.2 | 1.02 | 55.9 |
| 30 | 143 | 1.09 | 131 |

TABLE 13-continued

EXAMPLE 13 - TCHF BA PC

| | | | |
|---|---|---|---|
| 30 | 160 | 1.11 | 144 |
| 50 | 80.0 | 1.46 | 55.1 |
| 50 | 86.3 | 1.47 | 58.7 |
| 50 | 157 | 1.61 | 97.5 |
| 50 | 207 | 1.69 | 122 |
| 75 | 154 | — | — |
| 95 | 236 | 3.71 | 63.6 |
| 95 | 248 | 3.28 | 75.5 |
| 50 | 191 | 1.34 | 142 |
| 50 | 131 | 1.16 | 113 |
| 75 | 151 | 1.76 | 85.5 |
| 75 | 176 | 2.29 | 76.9 |
| 95 | 147 | 3.48 | 42.3 |

TABLE 14A

EXAMPLE 14 - TBHF BA IE

| Temperature (°C.) | Oxygen Permeability (Barrers) | Nitrogen Permeability (Barrers) | Selectivity |
|---|---|---|---|
| 8 | 3.7 | 0.45 | 8.2 |
| 30 | 6.1 | 0.95 | 6.4 |
| 30 | 5.1 | 0.76 | 6.7 |
| 30 | 4.9 | 0.67 | 7.3 |
| 30 | 4.8 | 0.83 | 7.0 |
| 30 | 5.0 | 0.87 | 6.9 |
| 40 | 6.5 | 0.99 | 6.5 |
| 40 | 6.3 | 0.96 | 6.6 |
| 50 | 6.5 | 1.12 | 5.8 |
| 50 | 7.1 | 1.27 | 5.6 |
| 50 | 7.3 | 1.18 | 6.2 |

TABLE 15

EXAMPLE 15 - PBO A

A

| Temperature (°C.) | Oxygen Permeability (Barrers) | Nitrogen Permeability (Barrers) | Selectivity $O_2/N_2$ |
|---|---|---|---|
| −81 | 2.56 | 0.13 | 20.16 |
| −50 | 7.38 | 0.56 | 13.11 |
| −50 | 5.75 | .44 | 12.95 |
| −39 | 4.78 | 0.34 | 14.00 |
| −38 | 4.95 | 0.36 | 13.79 |
| −31 | 10.20 | 1.10 | 9.27 |
| −28 | 5.34 | 0.54 | 11.68 |
| −21 | 7.60 | 0.90 | 8.48 |
| −17 | 8.52 | 1.07 | 7.96 |
| −9 | 9.98 | 1.39 | 7.21 |
| 3 | 10.80 | 1.85 | 5.84 |
| 24 | 15.86 | 2.82 | 5.61 |
| 29 | 31.20 | 5.43 | 5.75 |
| 29 | 31.40 | 5.33 | 5.89 |
| 30 | 24.00 | 4.62 | 5.20 |
| 30 | 24.51 | 4.86 | 5.04 |
| 50 | 29.39 | 6.50 | 4.52 |
| 75 | 35.08 | 8.93 | 3.93 |
| 75 | 40.75 | 9.84 | 4.14 |
| 100 | 47.04 | 12.48 | 3.77 |

B

| Temperature (°C.) | Carbon Dioxide Permeability (Barrers) | Methane Permeability (Barrers) | Selectivity $CO_2/CH_4$ |
|---|---|---|---|
| −31 | 24 | 0.23 | 104 |
| −31 | 16 | 0.13 | 123 |

TABLE 15-continued

EXAMPLE 15 - PBO A

| | | | |
|---|---|---|---|
| −30 | 16 | 0.12 | 142 |
| −17 | 26 | 0.27 | 94.3 |
| −9 | 24 | 0.57 | 42.3 |
| 0 | 34 | 0.59 | 57.7 |
| 5 | 32 | — | — |
| 8 | 37 | 0.87 | 42.5 |
| 10 | 37 | 0.93 | 39.8 |
| 30 | 60 | — | — |
| 30 | 56 | 2.34 | 23.7 |
| 30 | 55 | — | — |
| 30 | 42 | 1.63 | 26.0 |
| 31 | 16 | 0.13 | 123 |
| 50 | 108 | 3.51 | 21.2 |
| 50 | 81 | — | — |
| 50 | 78 | 3.08 | 25.4 |
| 50 | 67 | 3.94 | 17.0 |
| 70 | 137 | 6.0 | 15.3 |
| 70 | 91 | 6.00 | 15.3 |
| 75 | 143 | 7.69 | 18.7 |
| 85 | 73 | 7.84 | 9.3 |
| 94 | 92 | 10.30 | 8.9 |
| 95 | 115 | 12.38 | 9.3 |
| 97 | 124 | — | — |

C

| Temperature (°C.) | Helium Permeability (Barrers) | Methane Permeability (Barrers) | Selectivity He/CH$_4$ |
|---|---|---|---|
| −31 | 16.2 | 0.14 | 113 |
| −29 | 17.0 | 0.16 | 104 |
| −29 | 8.1 | 0.12 | 68.3 |
| −28 | 10.6 | — | — |
| −28 | 14.5 | 0.13 | 115 |
| −20 | 13.7 | 0.14 | 96.7 |
| −16 | 25.0 | 0.19 | 132 |
| −10 | 27.6 | 0.24 | 114 |
| −9 | 19.6 | 0.24 | 81.7 |
| −3 | 23.3 | 0.33 | 71.6 |
| −2 | 57.3 | 0.70 | 81.8 |
| 2 | 23.6 | 0.36 | 64.8 |
| 8 | 34.4 | 0.57 | 60.4 |
| 8 | 29.9 | 0.53 | 56.3 |
| 15 | 47.6 | 1.67 | 28.5 |
| 30 | 81.4 | 1.96 | 41.5 |
| 30 | 71.2 | 1.76 | 40.5 |
| 30 | 53.7 | 1.83 | 29.3 |
| 30 | 53.8 | 1.56 | 34.5 |
| 40 | 40.1 | 0.38 | 33.5 |
| 50 | 94.3 | 2.82 | 33.5 |
| 50 | 129.3 | 3.17 | 40.8 |
| 50 | 101.4 | 2.86 | 35.5 |
| 75 | 179 | 6.22 | 28.7 |
| 75 | 131 | 6.66 | 19.6 |
| 95 | 124 | 8.24 | 15.1 |

TABLE 16

EXAMPLE 16 - PBO B

A

| Temperature (°C.) | Oxygen Permeability (Barrers) | Nitrogen Permeability (Barrers) | Selectivity O$_2$/N$_2$ |
|---|---|---|---|
| −38 | 2.96 | 0.23 | 12.69 |
| −37 | 2.92 | 0.19 | 15.37 |
| −28 | 2.82 | 0.26 | 10.74 |
| −18 | 2.81 | 0.30 | 9.38 |
| −6 | 3.36 | 0.45 | 7.53 |
| 1 | 3.87 | 0.53 | 7.33 |
| 10 | 4.07 | 0.59 | 6.89 |
| 30 | 6.57 | 1.13 | 5.81 |

TABLE 16-continued

EXAMPLE 16 - PBO B

| | | | |
|---|---|---|---|
| 50 | 7.71 | 1.46 | 5.27 |
| 75 | 10.41 | 2.24 | 4.66 |
| 100 | 12.19 | 2.94 | 4.14 |
| 100 | 13.49 | 3.25 | 4.15 |

B

| Temperature (°C.) | Carbon Dioxide Permeability (Barrers) | Methane Permeability (Barrers) | Selectivity CO$_2$/CH$_4$ |
|---|---|---|---|
| −28 | 18.79 | 0.04 | 437 |
| −19 | 18.32 | 0.10 | 183 |
| −4 | 17.06 | 0.13 | 137 |
| 5 | 17.29 | — | — |
| 5 | 26.74 | — | — |
| 10 | 21.01 | 0.17 | 121 |
| 10 | 31.14 | 0.41 | 76.0 |
| 30 | 14.30 | — | — |
| 30 | 15.03 | 0.32 | 47.0 |
| 30 | 20.70 | — | — |
| 30 | 25.60 | — | — |
| 30 | 28.13 | 0.61 | 46.1 |
| 30 | 33.60 | — | — |
| 37 | 26.50 | 0.63 | 41.8 |
| 50 | 21.33 | — | — |
| 50 | 24.78 | 0.55 | 44.7 |
| 50 | 26.99 | — | — |
| 50 | 35.80 | — | — |
| 50 | 39.53 | — | — |
| 50 | 40.48 | 0.86 | 47.1 |
| 70 | 23.93 | 0.97 | 24.7 |
| 70 | 38.37 | 1.56 | 24.6 |
| 70 | 42.80 | — | — |
| 72 | 28.65 | — | — |
| 85 | 28.26 | 1.34 | 21.0 |
| 85 | 37.30 | 2.01 | 18.6 |
| 94 | 34.71 | 1.61 | 21.5 |
| 94 | 56.41 | 2.23 | 25.3 |
| 97 | 33.79 | — | — |
| 97 | 47.17 | — | — |

C

| Temperature (°C.) | Helium Permeability (Barrers) | Methane Permeability (Barrers) | Selectivity He/CH4 |
|---|---|---|---|
| −27 | 17.2 | 0.12 | 138 |
| −17 | 41.7 | 0.16 | 261 |
| −7 | 30.1 | 0.16 | 185 |
| −3 | 36.7 | 0.23 | 160 |
| 6 | 34.4 | 0.24 | 145 |
| 8 | 52.4 | 0.29 | 182 |
| 30 | 84.0 | 0.67 | 126 |
| 30 | 87.4 | 0.76 | 116 |
| 40 | 47.5 | — | — |
| 50 | — | 0.90 | — |
| 50 | 97.7 | 0.90 | 108 |
| 50 | 96.1 | 0.92 | 105 |
| 75 | 117 | 1.68 | 69.7 |
| 75 | 126 | 1.42 | 88.8 |
| 95 | 149 | 1.73 | 86.0 |
| 100 | 136 | 2.43 | 55.8 |

TABLE 17A

EXAMPLE 17 - PPO

| Temperature (°C.) | Oxygen Permeability (Barrers) | Nitrogen Permeability (Barrers) | Selectivity O$_2$/N$_2$ |
|---|---|---|---|
| 8 | 11.35 | 1.85 | 6.15 |
| 8 | 10.52 | 1.73 | 6.08 |
| 14 | 11.49 | 1.97 | 5.84 |
| 21 | 13.02 | 2.35 | 5.55 |
| 30 | 10.99 | 2.09 | 5.25 |
| 30 | 10.51 | 2.00 | 5.27 |
| 30 | 12.49 | 2.36 | 5.28 |
| 30 | 11.73 | 2.20 | 5.33 |
| 30 | 10.54 | 1.94 | 5.44 |
| 30 | 15.29 | 2.92 | 5.23 |
| 31 | 11.94 | 2.23 | 5.36 |
| 37 | 14.46 | 2.82 | 5.12 |
| 38 | 13.01 | 2.54 | 5.13 |
| 40 | 16.08 | 3.21 | 5.01 |
| 40 | 14.34 | 2.81 | 5.11 |
| 45 | 12.23 | 2.21 | 5.54 |
| 46 | 15.88 | 3.25 | 4.89 |
| 49 | 17.02 | 3.55 | 4.80 |
| 50 | 13.70 | 2.83 | 4.84 |

TABLE 18C

EXAMPLE 18 - HFBA/DFBP

| Temperature (°C.) | Helium Permeability (Barrers) | Methane Permeability (Barrers) | Selectivity He/CH$_4$ |
|---|---|---|---|
| -27 | 53.3 | 0.59 | 90.72 |
| -18 | 61.4 | 0.94 | 65.41 |
| -6 | 65.2 | 1.47 | 44.25 |
| 1 | 91.2 | 1.90 | 47.91 |
| 9 | 104 | 2.08 | 50.19 |
| 30 | 121 | 3.09 | 39.09 |
| 30 | 144 | 3.99 | 36.04 |
| 50 | 159 | 4.48 | 35.48 |
| 50 | 186 | 5.58 | 33.29 |

EXAMPLE 19 - PMDA/PIDA

TABLE 19A

| Temperature (°C.) | Oxygen Permeability (Barrers) | Nitrogen Permeability (Barrers) | Selectivity O$_2$/N$_2$ |
|---|---|---|---|
| -35 | 12.2 | 1.6 | 7.4 |
| -27 | 12.0 | 2.0 | 6.1 |
| -9 | 15.7 | 3.0 | 5.2 |
| 0 | 18.6 | 3.8 | 4.9 |
| 8 | 19.6 | 4.2 | 4.6 |
| 30 | 24.7 | 5.3 | 4.6 |
| 50 | 35.9 | 7.7 | 4.6 |
| 75 | 33.1 | 9.5 | 3.5 |
| 90 | 37.2 | 10.8 | 3.5 |

TABLE 19B

| Temperature (°C.) | Carbon Dioxide Permeability (Barrers) | Methane Permeability (Barrers) | Selectivity CO$_2$/CH$_4$ |
|---|---|---|---|
| -26 | 71.2 | 0.68 | 105 |
| -16 | 84.8 | 1.11 | 76.4 |
| -8 | 109 | 1.49 | 73.0 |
| 1 | 123 | 2.34 | 52.6 |
| 8 | 136 | 3.18 | 42.6 |
| 20 | 171 | 3.14 | 54.4 |
| 20 | 140 | 3.83 | 36.6 |
| 30 | 124 | 5.63 | 22.1 |
| 30 | 133 | 4.80 | 27.8 |
| 50 | 140 | 7.42 | 18.8 |
| 75 | 176 | 10.81 | 16.3 |
| 95 | 156 | 12.77 | 12.3 |

TABLE 19C

| Temperature (°C.) | Helium Permeability (Barrers) | Methane Permeability (Barrers) | Selectivity He/CH$_4$ |
|---|---|---|---|
| -30 | — | 0.36 | — |
| -29 | 19.8 | 0.26 | 77.23 |
| -28 | 21.6 | 0.61 | 35.52 |
| -28 | 25.9 | 0.42 | 62.3 |
| -28 | 46.3 | — | — |
| -26 | 38.9 | — | — |
| -16 | 84.8 | 1.11 | 76.36 |
| -5 | 51.2 | 1.77 | 28.91 |
| -1 | 57.5 | 2.45 | 23.48 |
| 20 | 69.5 | 7.57 | 9.18 |
| 30 | 102 | 6.04 | 16.95 |
| 50 | 159 | 9.25 | 17.19 |
| 95 | 105 | 16.19 | 6.48 |

EXAMPLE 20 - DABT/PIDA

TABLE 20B

| Temperature (°C.) | Carbon Dioxide Permeability (Barrers) | Methane Permeability (Barrers) | Selectivity CO$_2$/CH$_4$ |
|---|---|---|---|
| -25 | 26.6 | 0.33 | 81.51 |
| -14 | 32.7 | 0.57 | 57.81 |
| -8 | 30.0 | 0.73 | 40.83 |
| 2 | 45.5 | 1.02 | 44.57 |
| 9 | 53.1 | 1.48 | 35.80 |
| 20 | 59.5 | 2.12 | 28.05 |
| 30 | 82.7 | 4.22 | 19.62 |
| 30 | 64.8 | 2.84 | 22.67 |
| 50 | 101 | 5.87 | 17.20 |
| 50 | 88.4 | 3.38 | 26.16 |
| 75 | 88.6 | 6.16 | 14.38 |
| 95 | 98.5 | 9.63 | 10.23 |

TABLE 20C

| Temperature (°C.) | Helium Permeability (Barrers) | Methane Permeability (Barrers) | Selectivity He/CH$_4$ |
|---|---|---|---|
| -29 | 19.6 | 0.28 | 69.3 |
| -29 | 29.0 | — | — |
| -28 | 37.2 | — | — |
| -14 | 32.7 | 0.57 | 57.8 |
| -5 | 42.2 | 0.84 | 50.5 |
| -2 | 46.4 | 1.19 | 39.0 |
| 20 | 62.8 | 3.6 | 17.1 |
| 20 | 70.2 | 1.90 | 36.9 |
| 30 | 95.6 | 3.50 | 27.3 |
| 30 | 92.1 | 2.19 | 42.1 |

-continued

EXAMPLE 20 - DABT/PIDA

| | | | |
|---|---|---|---|
| 50 | 155 | 5.82 | 26.70 |
| 75 | 167 | 9.06 | 18.48 |
| 95 | 107 | 11.68 | 9.15 |

TABLE 21A

| Temperature (°C.) | Oxygen Permeability (Barrers) | Nitrogen Permeability (Barrers) | Selectivity $O_2/N_2$ |
|---|---|---|---|
| \multicolumn{4}{c}{EXAMPLE 21 - TBF PC #1} | | | |
| −43 | 2.17 | 0.16 | 13.4 |
| −42 | 2.14 | 0.16 | 13.3 |
| −26 | 2.79 | 0.27 | 10.5 |
| −19 | 3.08 | 0.30 | 10.4 |
| −9 | 3.17 | 0.33 | 9.5 |
| −2 | 3.98 | 0.47 | 8.6 |
| 9 | 4.90 | 0.61 | 8.1 |
| 13 | 5.28 | 0.68 | 7.8 |
| 25 | 6.84 | 1.00 | 6.9 |
| 25 | 7.01 | 1.04 | 6.8 |
| 25 | 7.07 | 0.98 | 7.2 |
| 25 | 7.43 | 1.06 | 7.0 |
| 25 | 8.85 | 1.31 | 6.8 |
| 25 | 7.35 | 1.06 | 6.9 |
| 29 | 7.67 | 1.13 | 6.8 |
| 30 | 7.29 | 1.05 | 7.0 |
| 30 | 8.38 | 1.30 | 6.4 |
| 30 | 7.15 | 1.11 | 6.5 |
| 47 | 8.81 | 1.51 | 5.8 |
| 50 | 10.5 | 1.82 | 5.8 |
| 50 | 9.94 | 1.69 | 5.9 |
| 72 | 11.4 | 2.27 | 5.0 |
| 75 | 13.2 | 2.63 | 5.0 |
| 90 | 16.7 | 3.66 | 4.6 |
| 96 | 14.5 | 3.28 | 4.4 |
| 120 | 18.6 | 4.7 | 4.0 |
| 145 | 22.7 | 6.4 | 3.5 |
| \multicolumn{4}{c}{EXAMPLE 21 - TBF PC #2} | | | |
| −22 | 3.68 | 0.38 | 9.7 |
| −6 | 3.77 | 0.42 | 8.9 |
| 0 | 4.56 | 0.54 | 8.4 |
| 11 | 5.21 | 0.65 | 8.1 |
| 14 | 6.00 | 0.81 | 7.4 |
| 30 | 6.63 | 0.92 | 7.2 |
| 50 | 8.15 | 1.27 | 6.4 |
| 75 | 10.6 | 1.87 | 5.7 |
| 90 | 13.9 | 2.70 | 5.1 |

TABLE 22A

EXAMPLE 22 - TCF PC

| Temperature (°C.) | Oxygen Permeability (Barrers) | Nitrogen Permeability (Barrers) | Selectivity $O_2/N_2$ |
|---|---|---|---|
| −1 | 5.53 | 0.78 | 7.1 |
| 20 | 7.55 | 1.18 | 6.4 |
| 30 | 8.02 | 1.32 | 6.1 |
| 50 | 8.80 | 1.64 | 5.4 |
| 75 | 12.2 | 2.40 | 5.1 |
| 95 | 14.4 | 3.09 | 4.7 |

EXAMPLE 23

Mixed Gas Temperature And Pressure Effects in TCHF BA PC.

The TCHF BA PC membrane of Example 13 was used to evaluate the temperature and pressure effects on membrane performance, using mixed gas feeds. The apparatus previously described was used to evaluate the membrane's performance at various temperatures and pressures using as a feed gas a mixture of 2 mole percent hydrogen and 98 mole percent methane, a mixture of 50 mole percent hydrogen and 98 mole percent a mixture of 2 mole percent hydrogen and 98 mole percent ethane, and a mixture of 50 mole percent $CO_2$ and 50 mole percent methane. Data are reported in Tables 23A–C. For the hydrogen/hydrocarbon experiments, the permeation rate for hydrogen reached the steady state rate almost immediately compared to the permeation rate for the hydrocarbon gases. Such behavior enabled an estimate to be made of the pure gas permeabilities. In almost all cases, the presence of hydrocarbon gas resulted in a decrease in hydrogen permeability compared to the estimated pure gas values. This effect was more pronounced at lower temperatures, higher pressures, and/or for hydrocarbon gases which were more soluble in the membrane material.

In the carbon dioxide/methane experiments, loss in selectivity which was larger at lower temperatures and/or higher pressures.

TABLE 23A1

EXAMPLE 23 - TCHF BA PC

| Feed Pressure (Psi) | Temperature (°C.) | Single Gas Hydrogen Permeability (Barrers) | Single Gas $H_2/CH_4$ Selectivity | Mixed Gas Hydrogen Permeability (Barrers) | Mixed Gas $H_2/CH_4$ Selectivity |
|---|---|---|---|---|---|
| \multicolumn{6}{c}{(Feed = 2 mole percent $H_2$ and 98 mole percent $CH_4$)} | | | | | |
| 20 | −22 | 59.6 | 120 | 58.4 | 118 |
| 20 | −42 | 40.1 | 169 | 33.5 | 141 |
| 19 | −62 | 38.3 | 379 | 19.6 | 195 |
| 4 | −81 | 30.6 | 712 | 11.5 | 268 |
| 173 | 27 | 112 | 67.7 | 106 | 64.2 |
| 35 | −22 | 59.7 | 121 | 58.4 | 118 |
| 166 | −22 | 55.9 | 99.0 | 43.5 | 76.7 |
| 293 | −22 | 65.0 | 144 | 35.7 | 79.4 |
| \multicolumn{6}{c}{(Feed = 50 mole percent $H_2$ and 50 mole percent $CH_4$)} | | | | | |
| 198 | 29 | 119 | 57.4 | 119 | 51.4 |

TABLE 23B

EXAMPLE 23 - TCHF BA PC

| Feed Pressure (Psi) | Temperature (°C.) | Single Gas Hydrogen Permeability (Barrers) | Single Gas $H_2/C_2H_6$ Selectivity | Mixed Gas Hydrogen Permeability (Barrers) | Mixed Gas $H_2/C_2H_6$ Selectivity |
|---|---|---|---|---|---|
| 21 | 27 | 96.1 | 96.2 | 78.5 | 78.6 |
| 21 | −22 | 59.4 | 205 | 20.9 | 72.0 |
| 146 | −21 | 44.5 | — | 31.7 | 25 |

TABLE 23C

EXAMPLE 23 - TCHF BA PC

| Feed Pressure (Psi) | Temperature (°C.) | Mixed Gas Carbon Dioxide Permeability (Barrers) | Mixed Gas $CO_2/CH_4$ Selectivity |
|---|---|---|---|
| 21 | 29 | 83.9 | 50.9 |
| 142 | 29 | 76.2 | 42.4 |
| 21 | −22 | 67.3 | 176 |
| 140 | −22 | 80.0 | 110 |
| 279 | −22 | 87.9 | 38.1 |

EXAMPLE 24

Mixed Gas Temperature and Pressure Effects in TBF PC.

The TBF PC membranes of Example 21 were tested at higher and lower feed pressures at −42° C. to evaluate the potential for mixed gas effects at elevated pressure and low temperature. A feed mixture of 80 mole percent nitrogen and 20 mole percent oxygen was used. Data are reported in Table 24.

As feed pressure was increased from 2.5 to 157 psi., the oxygen and nitrogen permeabilities decreased by about 17 percent while selectivity remained essentially unchanged.

Single gas measurements of oxygen and nitrogen permeability were made at about −42° C., using an oxygen feed pressure of 20.0 psi. and a nitrogen feed pressure of 124.0 psi. The oxygen permeability was 2.08 Barrers, and the nitrogen permeability was 0.130 Barrers. The oxygen/nitrogen selectivity for these single gas measurements was 16.0. The single gas selectivity is about 20 percent higher than the mixed gas selectivities.

EXAMPLE 25

Figure Of Merit.

Figures of Merit values are reported in Table 25 for oxygen/nitrogen, carbon dioxide/methane, and helium/methane separation, as calculated using Equations III, IV, and V previously defined herein for membranes prepared from the following polymers: a polybenzoxazole (PBO A), the condensation polymer of pyromellitic dianhydride and 1,1,3-trimethyl-3-phenyl indan-4',5-diamine (PMDA/PIDA), poly-4-methylpentene-1 (PMP), tetrachlorohexafluoro bisphenol A polycarbonate (TCHF BA PC), a copolymer of 50 percent tetrabromo bisphenol A polycarbonate and 50 percent hexafluoro bisphenol A (TBBA/HFBA), polyphenylene oxide (PPO), a polybenzoxazole (PBO B), tetrabromohexafluoro bisphenol A polycarbonate (TBHF BA PC), the condensation polymer of hexafluoro bisphenol A and decafluoro bisphenyl (HFBA/DFBP), the condensation polymer 1,4-diamino benzene-2,5-dithiol and 1,1,3-trimethyl-3-phenylindan-4',5-dicarboxylic acid (DABT/PIDA), 9,9-bis(3,5-dibromo-4-hydroxyphenyl) fluorene polycarbonate (TBF PC), 9,9-bis(3,5-dichloro-4-hydroxyphenyl)fluorene polycarbonate (TCF PC), tetrabromo bisphenol A polycarbonate (TBBA PC), TRYCITE polystyrene cellulose triacetate (CTA), and unsubstituted polysulfone (PSF). Data for TBBA PC, CTA, PST, and PSF are presented for comparative purposes only and are not illustrative of the present invention.

TABLE 25

| | FIGURE OF MERIT[1] | | |
|---|---|---|---|
| Polymer | $O_2/N_2$ | $CO_2/CH_4$ | $He/CH_4$ |
| TBF PC | 2.43 | — | — |
| PBO A | 3.36 | 23.77 | 12.91 |
| DMDA/PIDA | 3.28 | 29.27 | 17.01 |
| PMP | 3.26 | — | — |
| TCHF BA PC | 3.17 | — | — |
| TCHF BA PC | 2.66 | 25.86 | 22.48 |
| TBBA/HFBA | 3.16 | — | — |
| PPO | 2.86 | — | — |
| PBO B | 2.70 | 28.36 | 17.64 |
| TBHF BA PC | 1.46 | — | — |
| HFBA/DFBP | — | 25.53 | 12.84 |
| DABT/PIDA | — | 20.20 | 14.50 |
| TBBA PC 10 | 0.71 | 9.44 | −18.47 |

TABLE 25-continued

| | FIGURE OF MERIT[1] | | |
|---|---|---|---|
| Polymer | $O_2/N_2$ | $CO_2/CH_4$ | $He/CH_4$ |
| CTA | −2.03 | 14.99 | 2.76 |
| PST | −1.41 | 13.96 | −11.36 |
| PSF | — | 13.91 | — |

[1]As calculated by Equations III, IV, and V at 30° C.

What is claimed is:

1. A method of separating component gases in a gas mixture comprising:

A. contacting a first side of a gas separation membrane, the membrane comprising a discriminating layer or region of a glassy polymer, wherein for said polymer cellulose triacetate is excluded, with the gas mixture while maintaining a difference in chemical potential from the first side of the membrane to a second side of the membrane, such that at least one first component gas of the gas mixture selectively permeates relative to at least one second component gas in the gas mixture from the first side of the membrane through the membrane to the second side of the membrane, said contacting occurring at a temperature of −5° C. or lower, wherein the membrane having a glassy region is selected so that, when using a mixture of 80 mole percent nitrogen and 20 mole percent oxygen as a feed at 30° C. with a pressure of 30 psia on the first side of the membrane and a vacuum of less than 1 mm Hg on the second side of the membrane, the permeability of oxygen in barriers is less than 2000 and has the following relationship to oxygen/nitrogen selectivity:

$$\text{Permeability} > \frac{2000}{(\text{Selectivity})^{7/2}} \text{ ; and}$$

B. recovering at least one of the permeate gas or rejected non-permeate gas.

2. The method as described in claim 1 wherein at least one of the first component gas or the second component gas is selected from the group consisting of hydrogen, helium, oxygen, nitrogen, argon, carbon monoxide, carbon dioxide, hydrogen sulfide, nitrogen oxides, sulfur oxides, ammonia, water vapor, and light hydrocarbons.

3. The method as described in claim 2 wherein the first component gas is oxygen and the second component gas is nitrogen.

4. The method as described in claim 3 wherein the membrane has a Figure of Merit for oxygen/nitrogen separation of at least about 1.0.

5. The method as described in claim 4 wherein the glassy polymer comprises a polyimide, a polyphenylene oxide, a polyamide, a polycarbonate, a polyester, a polyestercarbonate, a polyarylate, a polytriazole, a polyoxadiazole, a polyether, a polyolefin, a polysulfone, a polyethersulfone, a polybenzoxazole, or a copolymer or physical blend thereof.

6. The method as described in claim 5 wherein the membrane is an asymmetric, anisotropic, composite, or surface treated membrane.

7. The method as described in claim 6 wherein the glassy polymer comprises an indan-containing polybenzoxazole or indan-containing polyimide.

8. The method as described in claim 6 wherein the glassy polymer comprises a polymer having the recurring units:

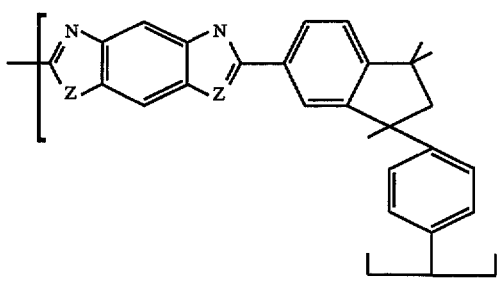

or

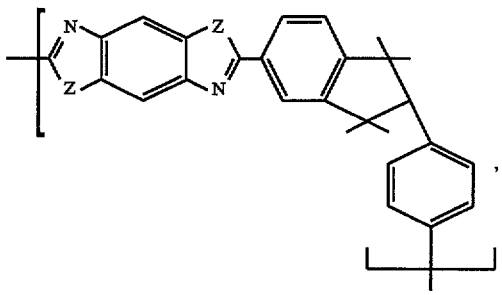

wherein Z is oxygen.

9. The method as described in claim 6 wherein the glassy polymer comprises a polymer containing 9,9-bis(dibromo-4-hydroxyphenyl)fluorene, 9,9-bis(dichloro-4-hydroxyphenyl)fluorene, hexafluoro bisphenol A, tetrahalo hexafluoro bisphenol A, or tetraalkyl hexafluoro bisphenol A moieties selected from the group consisting of polycarbonate, polyimide, polyether, polysulfone, polyethersulfone, polyarylate, polyester, polyestercarbonate, or a copolymer or physical blend thereof.

10. The method as described in claim 9 wherein the glassy polymer comprises tetrabromohexafluoro bisphenol A polycarbonate or tetrachlorohexafluoro bisphenol A polycarbonate.

11. The method as described in claim 9 wherein the glassy polymer comprises 9,9-bis(dibromo-4-hydroxyphenyl) fluorene polycarbonate or 9,9-bis(3,5-dichloro-4-hydroxyphenyl)fluorene polycarbonate.

12. The method as described in claim 3 wherein the membrane exhibits at a temperature of 5° C. or less a selectivity for oxygen/nitrogen of at least about 10 and an oxygen permeability of at least about 1 barrer, as measured using a mixture of 80 mole percent nitrogen and 20 mole percent oxygen as a feed with a pressure of 30 psia on the first side of the membrane and a vacuum of less than 1 mm Hg on the second side of the membrane.

13. The method as described in claim 2 wherein the first component gas is carbon dioxide and the second component gas is a light hydrocarbon.

14. The method as described in claim 13 wherein the temperature for separation is in the range from about –40° C. to about –5° C.

15. The method as described in claim 13 wherein the membrane has a Figure of Merit for carbon dioxide/methane separation of at least about 20.

16. The method as described in claim 15 wherein the glassy polymer comprises a polybenzoazole, a polycarbonate, a polyester, a polyestercarbonate, a polysulfone, a polyethersulfone, a polyimide, a polyether, a polyarylate, or a copolymer or physical blend thereof.

17. The method as described in claim 16 wherein the membrane is an asymmetric, anisotropic, or composite, or surface treated membrane.

18. The method as described in claim 17 wherein the glassy polymer comprises a polymer having the recurring units:

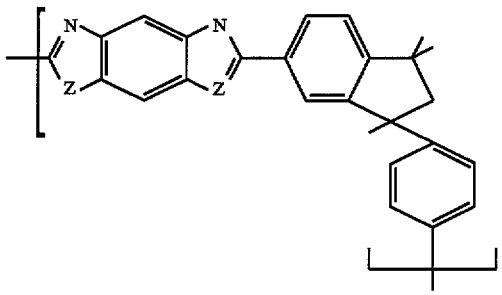

or

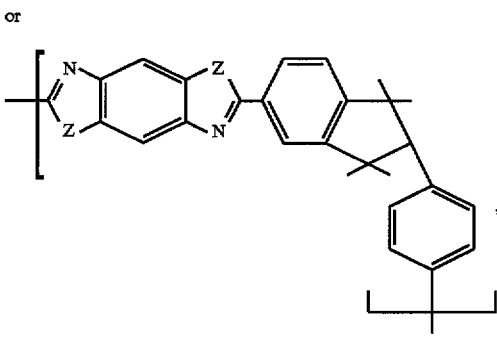

wherein Z is oxygen.

19. The method as described in claim 17 wherein the glassy polymer comprises a polymer containing 9,9-bis (dibromo-4-hydroxyphenyl)fluorene, 9,9-bis(dichloro-4-hydroxyphenyl)fluorene, hexafluoro bisphenol A, tetrahalo hexafluoro bisphenol A, or tetraalkyl hexafluoro bisphenol A moieties selected from the group consisting or polycarbonate, polyimide, polyether, polysulfone, polyethersulfone, polyarylate, polyester, polyestercarbonate, or a copolymer or physical blend thereof.

20. The method as described in claim 13 wherein the membrane exhibits at a temperature of 5° C. or less a selectivity for carbon dioxide/methane of at least about 40 and a carbon dioxide permeability of at least about 10 barrers, as measured using a mixture or 5 mole percent carbon dioxide and 95 mole percent methane as a feed with a pressure of 30 psia on the first side of the membrane and a vacuum or less than 1 mm Hg on the second side of the membrane.

21. The method as described in claim 2 wherein the first component gas is hydrogen or helium and the second component gas is a light hydrocarbon.

22. The method as described in claim 21 wherein the membrane has a Figure of Merit for helium/methane separation of at least about 5.

23. The method as described in claim 2 wherein the first component gas is ethylene and the second component gas is ethane.

24. The method as described in claim 2 wherein the temperature for separation is in the range from about –30° C. to about –5° C.

25. The method as described in claim 2 wherein the membrane is in the form of a plurality of hollow fibers.

26. The method as described in claim 25 wherein the gas mixture is introduced into the bores of the hollow fibers and the gas which has permeated through the fibers generally flows countercurrent to the gas in the bores of the hollow fibers.

27. The method as described in claim 25 wherein the hollow fibers comprise a discriminating layer or region at or near the internal surface of the hollow fibers and a generally porous region extending from the discriminating layer or region to the external surface of the hollow fibers.

28. The method as described in claim 25 wherein the hollow fibers comprise a generally porous region at or near the external surface of the hollow fibers, a generally porous region at or near the internal surface the of the hollow fibers, and a discriminating layer or region generally situated between the two porous surface regions.

29. The method as described in claim 2 wherein the membrane is an asymmetric, anisotropic, composite, or surface treated membrane.

30. The method as described in claim 29 wherein the membrane has a Permselectivity Index of at least about 0.25 for oxygen/nitrogen separation.

31. The method as described in claim 29 wherein the membrane exhibits a Figure of Merit for oxygen/nitrogen of at least about 3.0.

32. The method as described in claim 29 wherein the membrane exhibits a Figure of Merit for carbon dioxide/methane separation of at least about 25.

33. The method as described in claim 29 wherein the membrane exhibits a Figure of Merit for helium/methane separation of at least about 15.

34. The method as described in claim 29 wherein the membrane exhibits at a temperature of 5° C. or less a selectivity for oxygen/nitrogen of at least about 12 and an oxygen permeability of at least about 1 barrer, as measured using a mixture of 80 mole percent nitrogen and 20 mole percent oxygen as a feed with a pressure of 30 psia on the first side of the membrane and a vacuum of less than 1 mm Hg on the second side or the membrane.

35. The method as described in claim 2 wherein said glassy polymer exhibits a glass transition temperature of at least about 100° C.

36. The method as described in claim 2 wherein the membrane is in the form of a flat sheet or film.

37. A method of separating component gases in a gas mixture comprising:

A. contacting a first side of a gas separation membrane, the membrane comprising a discriminating layer or region of a glassy polymer, wherein for said polymer celulose triacetate is excluded, with the gas mixture while maintaining a difference in chemical potential from the first side of the membrane to a second side of the membrane, such that at least one first component gas of the gas mixture selectively permeates relative to at least one second component gas in the gas mixture from the first side of the membrane through the membrane to the second side of the membrane, said contact and separation occurring in the temperature range from about −150° C. to about −5° C., wherein the membrane having a glassy region is selected so that, when using a mixture of 80 mole percent nitrogen and 20 mole percent oxygen as a feed at 30° C. with a pressure of 30 psia on the first side of the membrane and a vacuum of less than 1 mm Hg on the second side of the membrane, the permeability of oxygen in barriers is less than 2000 and has the following relationship to oxygen/nitrogen selectivity:

$$\text{Permeability} > \frac{2000}{(\text{Selectivity})^{7/2}} \text{; and}$$

B. recovering at least one of the permeate gas or rejected non-permeate gas, wherein at least one of the first component gas or the second component gas is selected from the group consisting of hydrogen, helium, oxygen, nitrogen, argon, carbon monoxide, carbon dioxide, hydrogen sulfide, nitrogen oxides, sulfur oxides, ammonia, water vapor, and light hydrocarbons.

38. The method as described in claim 37 wherein the temperature for separation is in the range from about −125° C. to about −25° C.

39. A process for separating component gases in a gas mixture comprising:

A. contacting a first side of a gas separation membrane comprising a discriminating layer or region of a glassy polymer with the gas mixture under pressure and at a temperature of −5° C. or less;

B. maintaining a difference in pressure from the first side of the membrane to a second side of the membrane, under conditions such that at least one first component gas of the gas mixture selectively permeates relative to at least one second component gas through the membrane from the higher pressure first side of the membrane to the lower pressure second side of the membrane; and C. recovering at least one of the rejected non-permeate gas from the first side or the membrane or the permeate gas from the second side of the membrane;

wherein the membrane is selected so that, when using a mixture of 80 mole percent nitrogen and 20 mole percent oxygen as a feed at 30° C. with a pressure of 30 psia on the first side of the membrane and a vacuum of less than 1 mm Hg on the second side of the membrane, the permeability of oxygen in barrers is less than 2000 and has the following relationship to oxygen/nitrogen selectivity:

$$\text{Permeability} > \frac{2000}{(\text{Selectivity})^{7/2}} .$$

40. The process as described in claim 39 wherein the glassy polymer comprises a polyphenylene oxide, a polyimide, a polycarbonate, a polyamide, a polyether, a polyestercarbonate, a polyarylate, a polyester, a polyacetylene, a polytriazole, a polyoxadiazole, a polyolefin, a polysulfone, a polyethersulfone, polyamideimide, a polyvinylsilane, a polybenzoazole, or a copolymer or physical blend thereof.

41. The process as described in claim 40 comprising the additional step of altering the temperature of the gas mixture to a temperature of −5° C. or less.

42. The process as described in claim 41 wherein the temperature of the gas mixture is altered by cooling the gas mixture using at least one of an external refrigeration system, an adsorptive refrigeration system, an expansion device, or the self-refrigerating capacity of the permeate gas.

43. The process or claim 41 comprising the additional step of passing the cooled gas through a means for exchanging heat with the gas mixture to be introduced into the membrane so as to cool the gas mixture.

44. The process as described in claim 41 comprising the additional step of recycling at least a portion of either the non-permeate gas or the permeate gas.

45. The process as described in claim 44 wherein the temperature of one device at about −5° C. or less is different from the temperature of at least one other device also at which is about −5° C. or less.

46. The process as described in claim 41 operated with two or more membrane devices arranged in series or cascade configuration, or a combination thereof.

47. The process as described in claim 46 comprising the additional step of compression of gas between devices.

48. The process as described in claim 46 wherein the composition of the membrane used in at least one device is different than the composition of the membrane used in at least one other device.

49. The process as described in claim 41 comprising the additional separation step of at least one of pressure-swing adsorption, temperature-swing adsorption, vacuum-swing adsorption, fractionation, distillation, rectification, chemical absorption, chemical reaction, or extraction.

50. The process as described in claim 40 comprising the additional step of expanding at least a portion of either the feed gas mixture, the non-permeate gas, or the permeate gas to cool the gas.

51. The process as described in claim 50 wherein the gas is expanded and cooled using a turbine expander.

52. The process as described in claim 40 comprising the additional step of pretreating the gas mixture to substantially remove one or more contaminants having a deleterious impact on the performance or physical integrity of the membrane or system components.

53. The process as described in claim 52 wherein the contaminants comprise solid particulates or liquid droplets larger than 1 micron, hydrocarbons, glycols, oil field additives, surfactants, mercury, oils, hydrogen sulfide, water vapor, nitrogen oxides, sulfur oxides, hydrogen chloride, chlorine, mercaptans, carbonyl sulfide, or a combination thereof.

54. The process as described in claim 52 comprising the additional step of using at least a portion of either the non-permeate gas or the permeate gas to purge or regenerate pretreatment equipment.

* * * * *